(12) United States Patent
Okamoto et al.

(10) Patent No.: US 8,260,714 B2
(45) Date of Patent: Sep. 4, 2012

(54) TERMINAL APPARATUS AND SYSTEM THEREOF

(75) Inventors: Ryuichi Okamoto, Osaka (JP); Tohru Nakahara, Kanagawa (JP); Akihiro Tanaka, Osaka (JP); Shinya Kemi, Hyogo (JP); Koji Miura, Osaka (JP); Atsunori Sakurai, Osaka (JP); Tohru Wakabayashi, Hyogo (JP); Hiroki Murakami, Osaka (JP)

(73) Assignee: Panasonic Corporation, Osaka (JP)

( * ) Notice: Subject to any disclaimer, the term of this patent is extended or adjusted under 35 U.S.C. 154(b) by 650 days.

(21) Appl. No.: 12/444,880

(22) PCT Filed: Aug. 8, 2008

(86) PCT No.: PCT/JP2008/002189
§ 371 (c)(1),
(2), (4) Date: Apr. 9, 2009

(87) PCT Pub. No.: WO2009/019895
PCT Pub. Date: Feb. 12, 2009

(65) Prior Publication Data
US 2010/0088750 A1    Apr. 8, 2010

(30) Foreign Application Priority Data

Aug. 9, 2007 (JP) ................................ 2007-208450
Oct. 26, 2007 (JP) ................................ 2007-279120

(51) Int. Cl.
*G06F 21/00* (2006.01)
(52) U.S. Cl. ................ 705/59; 726/27; 726/30; 705/51; 705/902

(58) Field of Classification Search ..................... 705/59
See application file for complete search history.

(56) References Cited

U.S. PATENT DOCUMENTS 5,579,509 A * 11/1996 Furtney et al. .................. 703/27
5,634,114 A *  5/1997 Shipley .......................... 717/170
(Continued)

FOREIGN PATENT DOCUMENTS

JP    2000-048076    2/2000
(Continued)

OTHER PUBLICATIONS

International Search Report issued Oct. 21, 2008 in the International (PCT) Application of which the present application is the U.S. National Stage.

*Primary Examiner* — Jacob C. Coppola
(74) *Attorney, Agent, or Firm* — Wenderoth, Lind & Ponack, L.L.P.

(57) ABSTRACT

A terminal apparatus is provided which guarantees operation of a use condition bytecode while securing a degree of freedom for a service provider generating the use condition bytecode. A terminal apparatus (300), in which a license (1200) includes a use condition determining logic code (1204) and a version number (1202), includes a license obtainment unit (304) obtaining the license (1200), a use condition verification unit (302) determining, based on the version number (1202), whether or not an operation of the use condition determining logic code (1204) has been confirmed, a use condition bytecode execution unit (303) executing the use condition determining logic code (1204) when the operation of the use condition determining logic code (1204) has been determined to have been confirmed, and a content playback unit (306) playing back content based on the use condition determining logic code (1204).

7 Claims, 37 Drawing Sheets

U.S. PATENT DOCUMENTS

| | | | | |
|---|---|---|---|---|
| 5,748,960 | A * | 5/1998 | Fischer | 719/316 |
| 5,951,639 | A * | 9/1999 | MacInnis | 725/70 |
| 6,016,394 | A * | 1/2000 | Walker | 717/104 |
| 6,363,402 | B1 * | 3/2002 | Matsuura | 1/1 |
| 6,519,767 | B1 * | 2/2003 | Carter et al. | 717/140 |
| 6,658,659 | B2 * | 12/2003 | Hiller et al. | 717/170 |
| 6,678,888 | B1 * | 1/2004 | Sakanishi | 717/172 |
| 6,754,717 | B1 * | 6/2004 | Day et al. | 717/171 |
| 6,826,750 | B1 * | 11/2004 | Curtis et al. | 717/170 |
| 6,857,071 | B1 | 2/2005 | Nakae | |
| 7,080,371 | B1 * | 7/2006 | Arnaiz et al. | 717/170 |
| 7,425,992 | B2 * | 9/2008 | Feeler et al. | 717/168 |
| 7,506,336 | B1 * | 3/2009 | Ninan | 717/175 |
| 7,653,911 | B2 * | 1/2010 | Doshi et al. | 717/170 |
| 7,689,983 | B2 * | 3/2010 | Kitayama | 717/170 |
| 7,761,543 | B2 * | 7/2010 | Hyndman et al. | 717/168 |
| 7,865,891 | B2 * | 1/2011 | Saito | 717/170 |
| 2001/0002914 | A1 * | 6/2001 | Aramoto | 370/535 |
| 2001/0008024 | A1 * | 7/2001 | Inaba | 717/11 |
| 2001/0044935 | A1 * | 11/2001 | Kitayama | 717/11 |
| 2002/0072928 | A1 * | 6/2002 | Sundararajan | 705/1 |
| 2002/0157002 | A1 * | 10/2002 | Messerges et al. | 713/155 |
| 2003/0014470 | A1 * | 1/2003 | Iijima | 709/106 |
| 2003/0103528 | A1 * | 6/2003 | Kawaguchi et al. | 370/468 |
| 2003/0159135 | A1 * | 8/2003 | Hiller et al. | 717/170 |
| 2004/0057067 | A1 * | 3/2004 | Ohishi et al. | 358/1.13 |
| 2004/0255138 | A1 | 12/2004 | Nakae | |
| 2005/0074022 | A1 * | 4/2005 | Kato et al. | 370/432 |
| 2005/0144141 | A1 | 6/2005 | Nagao | |
| 2005/0262496 | A1 | 11/2005 | Seki et al. | |
| 2005/0268343 | A1 * | 12/2005 | Onoda et al. | 726/26 |
| 2006/0082801 | A1 | 4/2006 | Ohishi | |
| 2007/0100701 | A1 * | 5/2007 | Boccon-Gibod et al. | 705/21 |
| 2008/0028386 | A1 * | 1/2008 | Nagamine et al. | 717/170 |
| 2010/0088750 | A1 * | 4/2010 | Okamoto et al. | 726/4 |

FOREIGN PATENT DOCUMENTS

| | | |
|---|---|---|
| JP | 2002-342290 | 11/2002 |
| JP | 2004-246693 | 9/2004 |
| JP | 2005-141413 | 6/2005 |
| JP | 2005-338959 | 12/2005 |
| JP | 2006-148876 | 6/2006 |

* cited by examiner

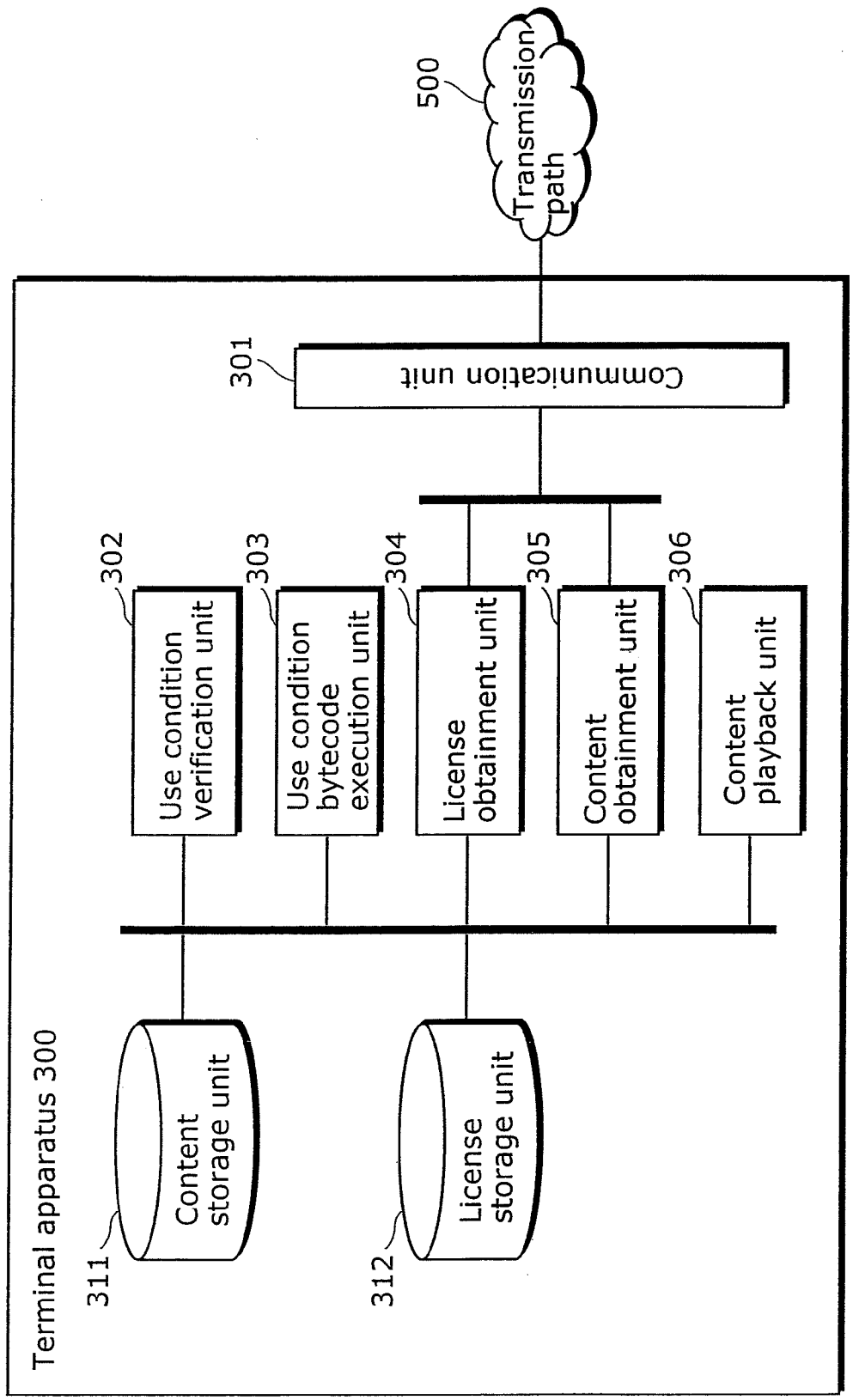

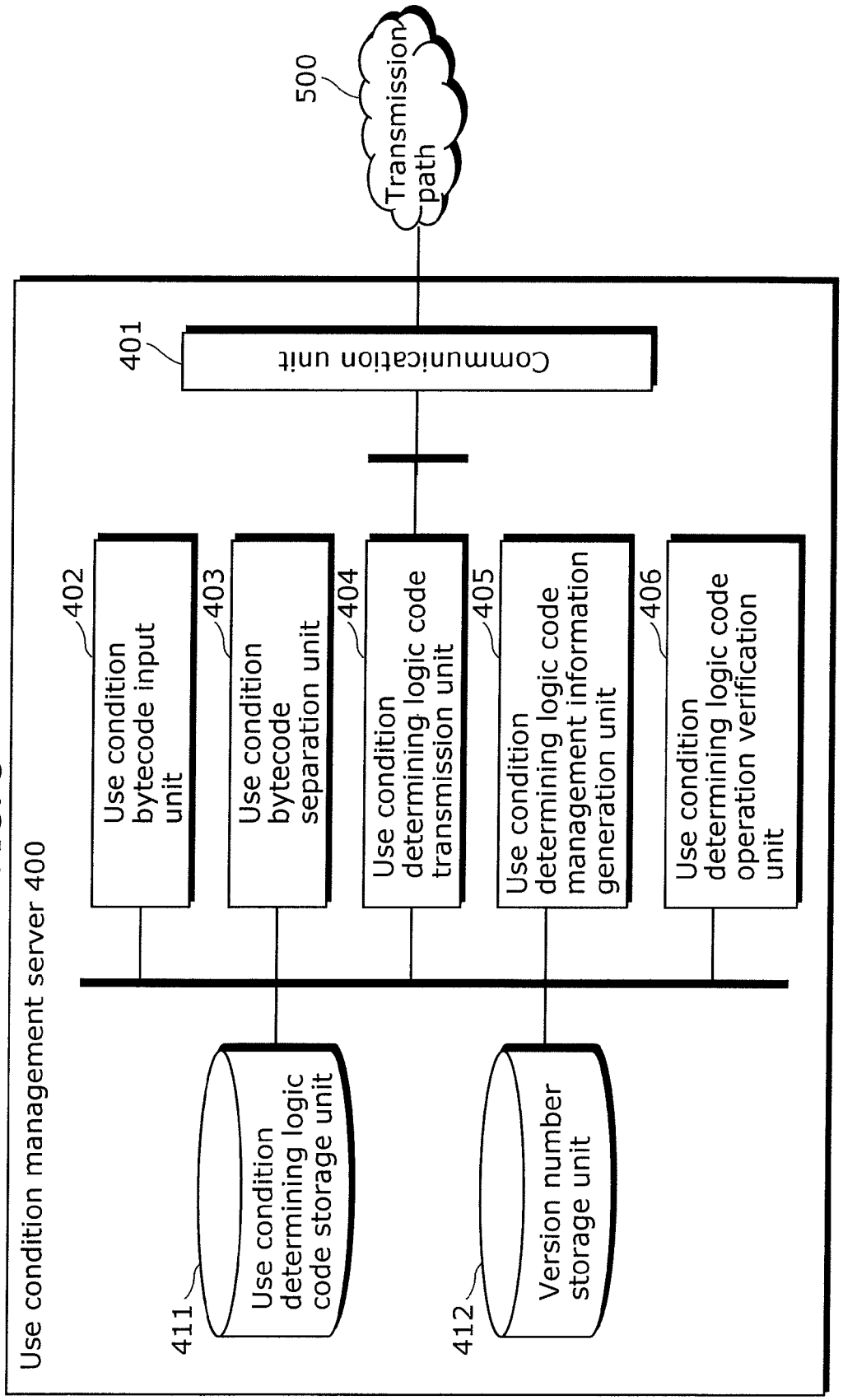

FIG. 6A

| Logic identifier | Version number | Logic code | Signature |
|---|---|---|---|
| LOGIC-ID-0001 | 1.0 | Current time < parameter | 323bf3bbc |
| LOGIC-ID-0002 | 1.0 | Current time < parameter + time of first use | 6985623a |
| LOGIC-ID-0003 | 2.0 | Current time < parameter + time of first use | 3544ffda8 |
| LOGIC-ID-0004 | 2.0 | Number of playbacks < parameter | 4353432a |
| ... | ... | ... | ... |

Use condition determining logic code management table D600a

| Logic identifier | Version number | Logic code | Signature | Use function identifier | Provider identifier |
|---|---|---|---|---|---|
| LOGIC-ID-0001 | 1.0 | Current time < parameter | 323af3bba | Secure clock | SP1 |
| LOGIC-ID-0002 | 1.0 | Current time < parameter + time of first use | 6985623a | Secure clock Nonvolatile memory | SP1 |
| LOGIC-ID-0003 | 2.0 | Current time < parameter + time of first use | 3544ffda8 | Secure clock | SP1 |
| LOGIC-ID-0004 | 2.0 | Number of playbacks < parameter | 4353432a | None | SP3 |
| ... | ... | ... | ... | ... | ... |

Use condition determining logic code management table D600b

| User identifier D701 | Content identifier D702 | Logic identifier D703 | Parameter D704 |
|---|---|---|---|
| USER-ID-0001 | CONTENT-ID-0001 | LOGIC-ID-0001 | ~2007/8/15 |
| USER-ID-0002 | CONTENT-ID-0002 | LOGIC-ID-0002 | 3 days |
| USER-ID-0002 | CONTENT-ID-0003 | LOGIC-ID-0003 | 5 times |
| USER-ID-0003 | CONTENT-ID-0004 | LOGIC-ID-0001 | Unrestricted |
| ... | ... | ... | ... |

Use condition determining parameter management table D700a

FIG. 7B

| User identifier D701 | Content identifier D702 | Logic identifier D703 | Parameter 1 D704 | Parameter 2 D705 | Priority order D706 |
|---|---|---|---|---|---|
| USER-ID-0001 | CONTENT-ID-0001 | LOGIC-ID-0001 | ~2007/8/15 | — | — |
| USER-ID-0002 | CONTENT-ID-0002 | LOGIC-ID-0002 LOGIC-ID-0003 | 3 days | 20 times | Parameter 1 |
| USER-ID-0002 | CONTENT-ID-0003 | LOGIC-ID-0003 | 5 times | — | — |
| USER-ID-0003 | CONTENT-ID-0004 | LOGIC-ID-0001 | Unrestricted | — | — |
| ... | ... | ... | ... | ... | ... |

Use condition determining parameter management table D700b

Content key management table D800

Content management table D900

License management table D1000

Version number management table D1100

FIG. 27

| Logic code ID 2201 | Profile 2202 | Version 2203 | Use condition determining logic code 2204 | Operation verification status information 2205 |
|---|---|---|---|---|
| 0001 | Valid period | 1.0 | Current date and time < parameter | — |
| 0002 | Valid period | 2.0 | Current time < time of first use + parameter | 00010000 |
| 0003 | Number of times | 1.0 | Number of playbacks < parameter | 00010001<br>00020001 |
| ... | ... | ... | ... | ... |

Use condition determining logic code management information 2200

FIG. 29

| Terminal ID | Usage right ID | Logic code ID | Use condition parameter | Content key |
|---|---|---|---|---|
| 00010001 | 0011 | 0001 | March 31, 2008 24:00 | 111111 |
|  | 0012 | 0002 | 1 day | 222222 |
| 00010002 | 0021 | 0003 | 1 time | 333333 |
| ... | ... | ... | ... | ... |

Usage right management database 2303

2401 — Terminal ID
2402 — Usage right ID
2403 — Logic code ID
2404 — Use condition parameter
2405 — Content key License request message 2700

License request response message 2800

FIG. 43

| Mask bit value | Comparison ID |
|---|---|
| 7 | 00011110 |
| 4 | 00010000 |
| ⋮ | ⋮ |

Operation verification status information 3800

3801
3802

TERMINAL APPARATUS AND SYSTEM THEREOF

TECHNICAL FIELD

The present invention relates to a content use control in a copyrighted content distribution system.

BACKGROUND ART

In recent years, content distribution systems have been developed which distribute content that are digital copyrighted works such as music, images, and games, using the Internet or digital broadcasting. Some of the systems have been in practical use (see patent document 1, for example). In connection with the distribution of such content, from the viewpoint of copyright protection, methods for controlling use of the content have also been considered to restrict the number of playbacks, playback permitted period, transfers, duplicates, and writing of the distributed content.

A conventional system is modeled in such a manner that a server distributes information (hereinafter referred to as "license") that is necessary for using the content and includes content use conditions, a content key and the like, and a terminal apparatus at home playbacks or writes the content based on the license distributed by the server. Further, the license distributed by the server is held by individual terminal apparatuses, and the respective terminal apparatuses use the content based on the license held individually. More specifically, the terminal apparatus interprets the use condition included in the license using a secure module and the like that implements a use condition determining logic such as control for the number of uses and valid period, determines whether or not use of the content is permitted, and uses the content under the use condition.

On the other hand, in a model where use condition is determined by the module that implements only the static use condition determining logic as described above, there is a problem in that versatility of use condition control is lost. In order to solve the problem, the following model has been proposed. A server distributes to a terminal apparatus a program including a use condition determining logic and use conditions. Upon receiving the program, the terminal apparatus executes the program so as to achieve a versatile control of the use condition. For example, the server distributes to the terminal apparatus a bytecode which is a program representation executable in a virtual machine (hereinafter referred to as "VM"). The terminal apparatus executes the bytecode on the VM of the terminal apparatus, which allows versatile control of use condition to be performed. Here, the bytecode is an intermediate program which is described in set of instructions defined not to depend on a certain operation system (OS) and hardware, and which can be interpreted or executed by the VM. More specifically, the bytecode is a program which executes a use condition such as "if current time is earlier than Aug. 8, 2008, use is permitted", and a use condition determining logic.

Next, a problem in a use condition control using the bytecode is described. The use condition control using the bytecode increases versatility of use condition determination. Whereas, it is considered that such cases where the operation of the bytecode in the terminal apparatus cannot be guaranteed will increase relatively, compared to the cases where use condition is determined using a static use condition determining logic. Specific examples of such cases include the case where a defect in a use condition determining logic described in a bytecode causes processing to go into an infinite loop on the VM of the terminal apparatus, which results in not terminating the processing, that is, not enabling playback of the content.

Conventionally, such problems have been solved as follows: in order to generate and distribute the bytecode which are reliable, the license distribution server generates the bytecode with proficient in the technical specification and performs several tests on the generated bytecode, which result in increase in cost.

As described, there is a need for a content distribution system which is capable of performing use condition determination which is reliable and versatile.

Patent Reference 1: Japanese Unexamined Patent Application Publication No. 2000-48076

DISCLOSURE OF INVENTION

Problems that Invention is to Solve

However, there are the following problems in a conventional content distribution system.

In general, for a service provider (hereinafter referred to as "SP") which places a license distribution server and provides content distribution service, it is considered that such a content distribution system is desirable that has a higher degree of freedom for use condition determination, that is, higher degree of freedom for use condition setting, and that is capable of generating a reliable bytecode.

However, the conventional techniques have a problem in that generation of the reliable bytecode requires enormous cost. Further, for a manufacturer of the terminal apparatus, there is a problem in that quality assurance of the terminal apparatus with respect to the bytecode generated freely by the SP cannot be provided. In other words, the operation of the bytecode cannot be guaranteed because performing an operation test on an arbitrary bytecode is difficult.

The present invention has been conceived in consideration of the conventional problems above, and has an object to provide a terminal apparatus, a server, and a system which enable the SP to generate a reliable bytecode at low cost, while securing the degree of freedom of use condition setting. The terminal apparatus, server, and system of the present invention also enable the manufacturer of the terminal apparatus to define the range of quality assurance with respect to execution of the bytecode in the terminal apparatus.

Means to Solve the Problems

In order to solve the above problems, the terminal apparatus according to the present invention is a terminal apparatus which uses, based on a license, content that is a digital copyrighted work. The license includes a use condition determining code that is a program for determining whether or not use of the content is permitted, and determination information for determining whether or not operation of the use condition determining code has been confirmed. The terminal apparatus includes a license obtainment unit which obtains the license, an operation confirmation determination unit which determines, based on the determination information included in the obtained license, whether or not the operation of the use condition determining code has been confirmed, a use condition determining code execution unit which executes the use condition determining code when the operation of the use condition determining code has been determined to have been confirmed, and a content playback unit which determines whether or not the use of the content is permitted based on the executed use condition determining code and playbacks the content when the use of the content has been determined to be permitted.

With this, the terminal apparatus can execute the use condition determining code, after determining, using the determination information, whether the operation of the use condition determining code of the bytecode has been confirmed. In other words, when determined that the operation of the use condition determining code has not been confirmed, quality of the terminal apparatus can be improved by not executing the use condition determining code. For this reason, it is possible for the SP to generate a reliable bytecode at low cost, while securing the degree of freedom of use condition setting. Further, it is possible for the manufacturer of the terminal apparatus to define the range of quality assurance with respect to execution of the bytecode in the terminal apparatus.

Further, preferably, the determination information includes version information that is information which indicates a version of the use condition determining code included in the obtained license. The terminal apparatus further includes an operable version management unit which manages operable version information that is information which indicates the version of the use condition determining code that is operable in the terminal apparatus. The operation confirmation determination unit determines whether or not the operation of the use condition determining code has been confirmed by comparing the version information and the operable version information. The version information is information which indicates a version number of the use condition determining code, and the operable version information is information which indicates a version number of the use condition determining code that is operable. The operation confirmation determination unit determines that the operation of the use condition determining code has been confirmed when the version number indicated by the version information is equal to or less than the version number indicated by the operable version information, and determines that the operation of the use condition determining code has not been confirmed when the version number indicated by the version information is greater than the version number indicated by the operable version information.

With this, the determination of whether or not the operation of the use condition determining code of the bytecode has been confirmed is performed by the version number. Therefore, the terminal apparatus can easily determine whether or not the use condition determining code is executed.

It should be noted that the present invention can be realized not only such a terminal apparatus, but also as: a server for generating determination information included in the license to be distributed to the terminal apparatus; a system including the terminal apparatus and the server; or a method having the processing units included in the terminal apparatus, the server and the system as steps. Furthermore, the present invention can be realized as: a program that causes a computer to execute these steps; a computer-readable recording medium storing the program, such as a CD-ROM; or information, data or signal which indicates the program. Such programs, information, data and signal may be distributed via a communication network such as the Internet.

Effects of the Invention

According to the present invention, a server can generate a reliable bytecode at low cost by generating a use condition using a use condition determining code to which determination information is added, and also can freely set the use condition. In addition, with determination using determination information added to the use condition determining code, a terminal apparatus can distinguish the use condition determining code of which the operation in a terminal apparatus has not been confirmed. As a result, the quality of the terminal apparatus can be improved by controlling the bytecode including the use condition determining code not to be executed in the terminal apparatus.

BRIEF DESCRIPTION OF DRAWINGS

FIG. 4 is a functional block diagram showing a structure of a terminal apparatus according to the embodiment 1 of the present invention.

FIG. 5 is a functional block diagram showing a structure of a use condition management server according to the embodiment 1 of the present invention.

FIG. 6A is a diagram showing a table structure of a use condition determining logic code storage unit according to the embodiment 1 of the present invention.

FIG. 6B is a diagram showing a table structure of the use condition determining logic code storage unit according to the embodiment 1 of the present invention.

FIG. 7A is a diagram showing a table structure of a use condition determining parameter storage unit according to the embodiment 1 of the present invention.

FIG. 7B is a diagram showing a table structure of the use condition determining parameter storage unit according to the embodiment 1 of the present invention.

FIG. 27 is a diagram showing an example of use condition determining logic code management information according to the embodiment 2 of the present invention.

FIG. 29 is a diagram showing an example of a usage right management database according to the embodiment 2 of the present invention.

FIG. 43 is a diagram showing an example of operation verification status information.

Figure 1:
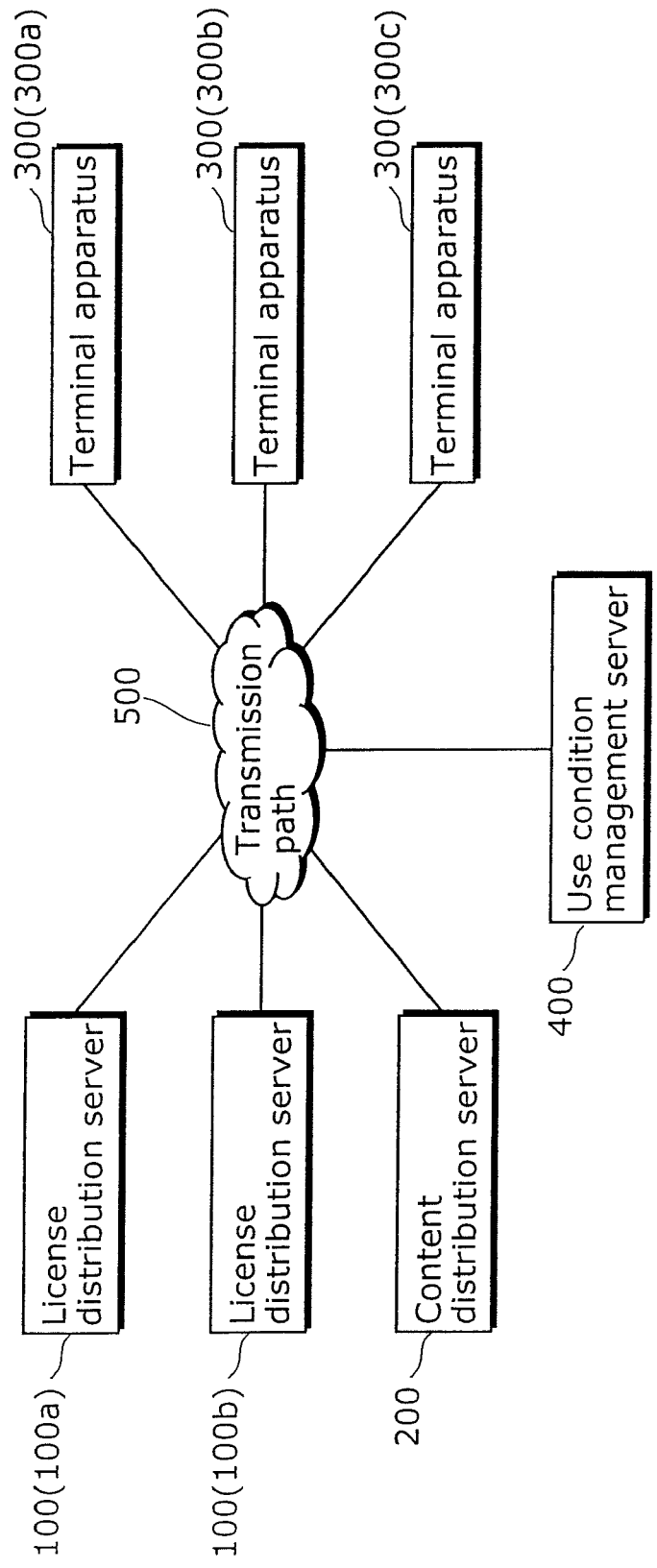
FIG. 1 is a diagram showing an overall schematic structure of a content distribution system according to the embodiment 1 of the present invention.

NUMERICAL REFERENCES 100a, 100b License distribution server
101, 201, 301, 401 Communication unit
102 License generation-transmission unit
103 Use condition determining logic code update unit
111 Use condition determining logic code storage unit
112 Use condition determining parameter storage unit
113 Content key storage unit
200 Content distribution server
202 Content obtainment-transmission unit
211, 311 Content storage unit
300a, 300b, 300c Terminal apparatus
302 Use condition verification unit
303 Use condition bytecode execution unit
304 License obtainment unit
305 Content obtainment unit
306 Content playback unit
312 License storage unit
400 Use condition management server
402 Use condition bytecode input unit
403 Use condition bytecode separation unit
404 Use condition determining logic code transmission unit
405 Use condition determining logic code management information generation unit
406 Use condition determining logic code operation verification unit
500 Transmission path
1200 License
1202 Version number
1204 Use condition determining logic code
2100 Content distribution server
2110 License distribution server
2120 Use condition determining logic code management server
2130 Terminal apparatus
2140 Transmission path
2200 Use condition determining logic code management information
2201 Logic code ID
2202, 2501 Profile
2203, 2502 Version
2204, 2503 Use condition determining logic code
2205, 3601, 3800 Operation verification status information
2301, 2601 Communication unit
2302 Use condition determining logic code management database
2303 Usage right management database
2304 License generation-transmission unit
2305 Operation verification status confirmation unit 2306 Operation verification status flag setting unit
2401, 2703 Terminal ID
2402, 2702 Usage right ID
2403 Logic code ID
2404 Use condition parameter
2405, 2506 Content key
2500 License
2504 Use condition parameter
2505 Operation verification status flag
2507 Signature
2602 Content obtainment unit
2603 License obtainment unit
2604 Use condition bytecode execution permission determination unit
2605 Use condition bytecode execution unit
2606 License use permission determination unit
2607 Content use unit
2608 Operation verified profile-version information management unit
2609 License management unit
2610 Content management unit
2700 License request message
2701 License request message identifier
2800 License request response message
2801 License request response message identifier
2802 Status code
3801 Mask bit value
3802 Comparison ID

BEST MODE FOR CARRYING OUT THE INVENTION

Embodiment 1

Hereinafter, the embodiment 1 according to the present invention is described in detail with reference to drawings.

FIG. 1 is a diagram showing an overall schematic structure of a content distribution system according to the embodiment 1 of the present invention.

The content distribution system is a system in which terminal apparatuses 300 use content. The content distribution system includes: license distribution servers 100a and 100b which generate and distribute a use condition bytecode and a license; a content distribution server 200 which holds and distributes the content; terminal apparatuses 300a to 300c which obtain the content and the license, and use the content; a use condition management server 400 which distributes and manages information used in the license distribution servers 100 for generating the use condition bytecode; and a transmission path 500 which connects these servers and apparatuses to each other.

The license distribution server 100 includes a function to connect with the transmission path 500. The license distribution server 100 is a server apparatus which holds a use condition determining parameter, a use condition determining logic code and the like, generates the use condition bytecode and the license based on a request from the terminal apparatus 300, and transmits the license. The license distribution server 100 can be implemented by a workstation, for example. Furthermore, a description is hereinafter given of the case where the license distribution server 100 is managed by a SP.

The content distribution server 200 includes a function to connect with the transmission path 500. The content distribution server 200 is a server apparatus which holds content information and transmits the content based on a request from the terminal apparatus 300, and can be implemented by a workstation, for example. Furthermore, a description is hereinafter given of the case where the content distribution server 200 is managed by a content provider (hereinafter referred to as "CP").

The terminal apparatus 300 is an apparatus which includes a function to connect with the transmission path 500 and holds the content and the license. The terminal apparatus 300 performs processing related to use of the content, such as outputting the content on a monitor screen, after performing a use permission determination based on the use condition bytecode included in the license. Specific examples of the terminal apparatus 300 include a Set Top Box (STB) for receiving digital broadcasting, Digital TV, Digital Versatile Disc (DVD) recorder, Hard Disk Drive (HDD) recorder, Personal Computer (PC), Personal Digital Assistance (PDA), data playback apparatus such as mobile phone, recording apparatus, and multifunction apparatus of these. In the present embodiment, a description is given of the case where the above apparatuses include a VM for executing the use condition bytecode.

The use condition management server 400 is a server apparatus which includes a function to connect with the transmission path 500, holds the use condition determining logic code with reliable signature, and updates the use condition determining logic code held by the license distribution server 100 based on a request from the license distribution server 100. The use condition management server 400 can be implemented by a workstation, for example. Furthermore, a description is hereinafter given of the case where the use condition management server 400 is managed by a technology management organization that provides technical specification to the content distribution system.

The transmission path 500 is a network which connects the license distribution server 100, the content distribution server 200, the terminal apparatus 300 and the use condition management server 400 to each other. More particularly, the transmission path 500 is configured with a wired network such as Ethernet (registered trademark), wireless network such as wireless LAN, or a combination of these.

In the present embodiment, the following five processing are described in detail which are related to obtainment of the license and playback of the content in the above described content distribution system, with reference to FIG. 2 through FIG. 25.

(1) A processing performed by the license distribution server 100 for updating the use condition determining logic code
(2) A processing performed by the terminal apparatus 300 for obtaining the license
(3) A processing performed by the terminal apparatus 300 for obtaining the content
(4) A processing performed by the terminal apparatus 300 for playing back the content
(5) A processing performed by the use condition management server 400 for adding a new use condition determining logic code Prior to the detailed description, a definition is given of information used for determining whether or not use of the content is permitted in the terminal apparatus 300 according to the present invention.

First, the use condition bytecode for performing use permission determination in the terminal apparatus 300 is described. The use condition bytecode is a program which operates in the VM of the terminal apparatus 300, and at least includes a logic for performing use permission determination and a parameter to be referred by the logic. More particularly, the use condition bytecode includes a logic indicating "if current time<parameter, use is permitted" and a parameter indicating "Aug. 8, 2007", and is a program for performing use permission determination such as "if current time is earlier than Aug. 8, 2007, use is permitted, and if not, use is not permitted".

The use condition bytecode may be newly generated by combining two or more such use condition bytecodes. More particularly, a first use condition bytecode including a logic indicating "if current time<parameter, use is permitted" and a parameter indicating "Aug. 8, 2007" and a second use condition bytecode including a logic indicating "if the number of playbacks<parameter, use is permitted" and a parameter indicating "10 times" may be combined and used as a third use condition bytecode including a logic indicating "if current time<first parameter, and if the number of playbacks<second parameter, use is permitted" and a parameter indicating "first parameter=Aug. 8, 2007, and second parameter=10 times".

In the present embodiment, a program and data indicating the above logic are referred to as "use condition determining logic code", and a program and data indicating the above parameter are referred to as "use condition determining parameter". More particularly, examples of the use condition determining logic code other than the above include "if current number of uses<parameter, use is permitted", "if time of first use+parameter<current time, use is permitted" and "if Jul. 7, 2007<current time<parameter, use is permitted". Furthermore, examples of the use condition determining parameter other than the above include "10 times" "2 days" and "license obtaining time+3 days". As described in the specific examples, it may be that the use condition determining logic code includes numeric data such as "Jul. 7, 2007", or the use condition determining parameter includes a calculation program such as "license obtaining time+".

In general, from the viewpoint of right protection, it is necessary to securely manage information related to use of the content in the content distribution system.

Therefore, for transmitting and receiving, through the transmission path 500, data such as the license, use condition bytecode, use condition determining logic code and use condition determining parameter which require to be securely managed, it is desirable to perform transmission and reception of the data after establishing a Secure Authenticated Channel (hereinafter referred to as "SAC") in order to ensure security. In order to establish an SAC, for example, a Secure Socket Layer (SSL) and a Transport Layer Security (TLS) may be used.

Next, identifiers according to the present embodiment are defined.

A user identifier is information for uniquely identifying a user in the content distribution system. In the present embodiment, a description is given of the case where the user identifier of the user of the terminal apparatus 300 is "USER-ID-0001". Furthermore, a description is given hereinafter of the case where the user identifier is inputted and stored in the storage area of the terminal apparatus 300 when the terminal apparatus is purchased.

A content identifier is information for uniquely identifying content in the content distribution system.

A license identifier is information for uniquely identifying the license in the terminal apparatus 300.

A logic identifier is information for uniquely identifying the use condition determining logic code in the content distribution system.

Other identifiers and the specific values of the identifiers are described and defined when appropriate and necessary.

Each identifier has been defined above.

Next, the structure of the license distribution servers 100, the content distribution server 200, the terminal apparatuses 300 and the use condition management server 400 are described in detail.

First, the structure of the license distribution server 100 is described in detail.

Figure 2:
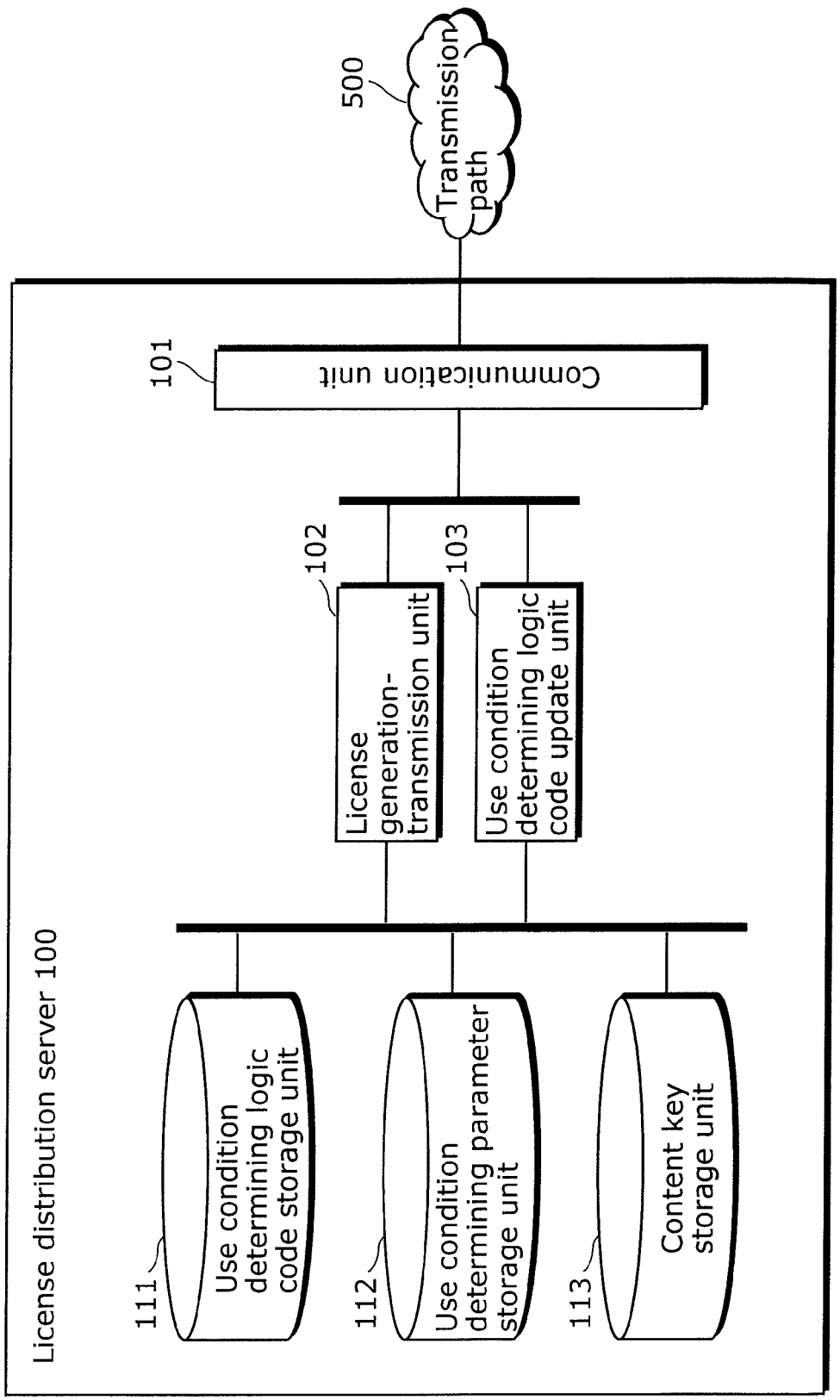
FIG. 2 is a functional block diagram showing a structure of a license distribution server according to the embodiment 1 of the present invention.

FIG. 2 is a functional block diagram showing a detailed structure of the license distribution server 100 shown in FIG. 1. It should be noted that the functional structures of the license distribution servers 100a and 100b are represented by the license distribution server 100a, and described as the license distribution server 100.

The license distribution server 100 includes: a use condition determining logic code storage unit 111 which stores the use condition determining logic code; a use condition determining parameter storage unit 112 which stores the use condition determining parameter; a content key storage unit 113 which stores a content key; a communication unit 101 which connects with the transmission path 500 for communicating with the terminal apparatuses 300 and the use condition management server 400; a license generation-transmission unit 102 which generates, based on a request from the terminal apparatus 300, the use condition bytecode from the use condition determining logic code and the use condition determining parameter and generates the license from the use condition bytecode and the content key for transmission; and a use condition determining logic code update unit 103 which obtains a use condition determining logic code for update from the use condition management server 400 and updates the use condition determining logic code. Here, it should be noted that the license generation-transmission unit 102 includes functions of the "license distribution unit" recited in the claims.

Next, the structure of the content distribution server 200 is described in detail.

Figure 3:
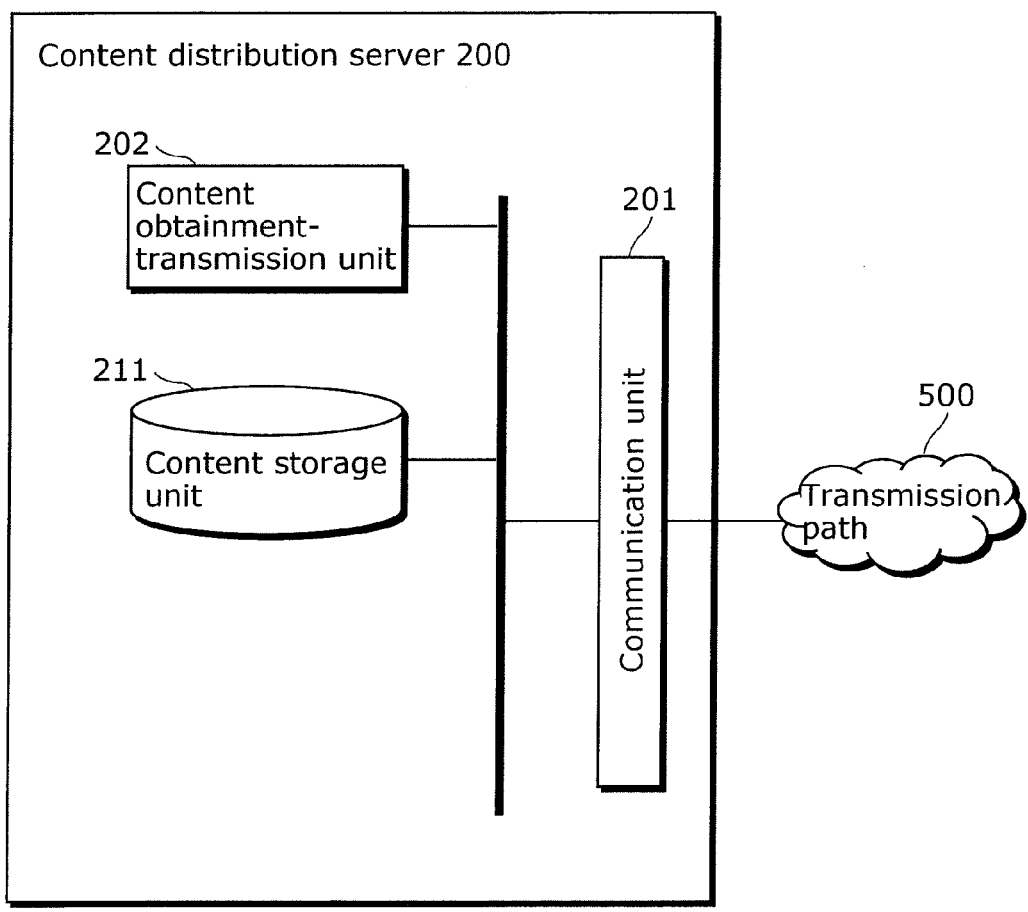
FIG. 3 is a functional block diagram showing a structure of a content distribution server according to the embodiment 1 of the present invention.

FIG. 3 is a functional block diagram showing the detailed structure of the content distribution server 200 shown in FIG. 1.

The content distribution server 200 includes: a content storage unit 211 which stores the content; a communication unit 201 which connects with the transmission path 500 for communicating with the terminal apparatuses 300; and a content obtainment-transmission unit 202 which obtains the content from the content storage unit 211 based on a request from the terminal apparatus 300 for transmission.

Next, the structure of the terminal apparatus 300 is described in detail.

FIG. 4 is a functional block diagram showing the detailed structure of the terminal apparatus 300 shown in FIG. 1. It should be noted that the functional structures of the terminal apparatuses 300a to 300c are represented by the terminal apparatus 300a, and described as the terminal apparatus 300.

The terminal apparatus 300 includes: a content storage unit 311 which stores the content obtained from the content distribution server 200; a license storage unit 312 which stores the license obtained from the license distribution server 100; a communication unit 301 which connects with the transmission path 500 for communicating with the license distribution server 100 and the content distribution server 200; a use condition verification unit 302 which verifies the use condition determining logic code included in the license and determines whether or not the use condition determining logic code can be executed as a use condition bytecode; a use condition bytecode execution unit 303 which receives the verification result of the use condition verification unit 302 and executes the use condition bytecode when determined to be executable; a license obtainment unit 304 which obtains the license from the license distribution server 100; a content obtainment unit 305 which obtains the content from the content distribution server 200; and a content playback unit 306 which decrypts the content under the control of the use condition bytecode executed by the use condition bytecode execution unit 303 and playbacks the content.

Here, it should be noted that the use condition verification unit 302 includes functions of the "operation confirmation determination unit" recited in the claims. Furthermore, the use condition bytecode execution unit 303 includes functions of the "use condition determining code execution unit" and the "operable version management unit" recited in the claims.

Lastly, the structure of the use condition management server 400 is described in detail.

FIG. 5 is a functional block diagram showing the detailed structure of the use condition management server 400 shown in FIG. 1.

The use condition management server 400 includes: a use condition determining logic code storage unit 411; a version number storage unit 412; a communication unit 401 which connects with the transmission path 500 for communicating with the license distribution server 100; a use condition bytecode input unit 402; a use condition bytecode separation unit 403; a use condition determining logic code transmission unit 404; a use condition determining logic code management information generation unit 405; and a use condition determining logic code operation verification unit 406.

The use condition determining logic code storage unit 411 stores the use condition determining logic code. The version number storage unit 412 stores version number. The use condition bytecode input unit 402 receives the use condition bytecode inputted by the license distribution server 100, server administrator or the like.

The use condition bytecode separation unit 403 determines a separation policy between the use condition determining logic code and the use condition determining parameter in the use condition bytecode inputted to the use condition bytecode input unit 402, and then separates and extracts the use condition determining logic code.

The use condition determining logic code transmission unit 404 determines, based on a request from the license distribution server 100, the necessity of update of the use condition determining logic code, and transmits the use condition determining logic code for update when determined to be necessary.

The use condition determining logic code management information generation unit 405 assigns the logic identifier and the version number to the use condition determining logic code extracted by the use condition bytecode separation unit 403. Furthermore, the use condition determining logic code management information generation unit 405 assigns a digital signature to data including the logic identifier, the version number and the use condition determining logic code, using a secret key of the use condition management server 400, and stores the assigned signature in association with the data.

The use condition determining logic code operation verification unit 406 verifies operation of the use condition determining logic code separated by the use condition bytecode separation unit 403.

Here, it should be noted that the use condition determining logic code management information generation unit 405 includes functions of the "determination information generation unit" recited in the claims. Furthermore, the use condition determining logic code operation verification unit 406 includes functions of the "use condition determining code operation verification unit" recited in the claims.

The detailed structure of the license distribution server 100, the content distribution server 200, the terminal apparatus 300, and the use condition management server 400 have been described above. Each of the servers and the terminal apparatuses 300 includes the respective data storage units and the respective processing units. The respective data storage units are implemented by a recording medium such as an HDD, and the respective processing units are implemented by a hardware such as LSI or program and the like which is executed using a CPU, RAM, ROM and the like. It is desirable that the respective storage units and processing units in the terminal apparatus 300 and the use condition management server 400 are tamper-resistant in terms of hardware or software.

Next, data and data structure according to the present embodiment are described. First, the data structure of the data held by each storage unit is described in the following order: the license distribution server 100; the content distribution server 200; the terminal apparatus 300; and the use condition management server 400. At the end, the data structure of the license distributed from the license distribution server 100 to the terminal apparatus 300 in the present embodiment is described.

First, the data held by the license distribution server 100 are described with reference to the drawings.

The use condition determining logic code storage unit 111 is a database that includes a use condition determining logic code management table for managing information related to the use condition determining logic code. The use condition determining logic code storage unit 111 is used for generating the use condition bytecode when the license can be issued in response to a license distribution request from the terminal apparatus 300.

More particularly, as shown in FIG. 6A, the use condition determining logic code storage unit 111 includes a use condition determining logic code management table D600a having: logic identifiers D601; logic codes D603 corresponding to the logic identifiers D601; version numbers D602 of the logic codes D603; and signatures D604 that are digital signatures for data having the logic identifier D601, the version number D602 and the logic code D603. For example, FIG. 6A shows that the logic code D603 which has the logic identifier D601 "LOGIC-ID-0001" is a bytecode indicating "current time<parameter", its version number D602 is "1.0", and the signature D604 for those data is "323bf3bbc". The data are recorded to the use condition determining logic code storage unit 111 according to the instruction of the administrator of the license distribution server 100, or when the necessity of update of the use condition determining logic code is regularly confirmed to the use condition management server 400 and the use condition determining logic code for update is obtained. The detailed processing is described later.

The use condition determining parameter storage unit 112 is a database for managing use condition of content for each user, and is used for determining whether or not the use condition held by the user can be issued in response to the license distribution request from the terminal apparatus 300 and generating the use condition bytecode when determined to be issued.

More particularly, as shown in FIG. 7A, the use condition determining parameter storage unit 112 includes a use condition determining parameter management table D700a having: user identifiers D701 indicating the owner of the use condition; content identifiers D702 of the content to which the use permission is given by the use condition; logic identifiers D703 of the use condition determining logic code for determining use permission of the content indicated by the content identifier D702; and parameters D704 to be referred when the use condition determining logic code corresponding to the logic identifier D703 performs use permission determination. For example, the table D700a shows that for the user who has the identifier D701 indicating "USER-ID-0001", the content of which the use is permitted is identified as "CONTENT-ID-0001" by the content identifier D702; the use condition determining logic code for determining use permission is identified as "LOGIC-ID-0001" by the logic identifier D703; the parameter to be referred by the use condition determining logic code is identified as "till Aug. 15, 2007" by the parameter D704. Furthermore, it is also possible to associate a single logic identifier with several content identifiers.

The data are recorded to the use condition determining parameter storage unit 112 by the SP which manages the content distribution service when the user purchases a right to use the content. The purchase processing may be performed in such a manner that a user connects to the website of the SP via the transmission path 500 and makes an online purchase through a content purchase screen, or that the user makes an offline purchase by using a postcard purchase-form or the like. In the purchase processing, the user first designates the content identifier D702 of the content to be purchased, confirms use conditions and then makes the purchase. The user identifier D701 of the user who made the purchase, the content identifier D702, the logic identifier D703 uniquely identified by the use condition, and the parameter D704 are recorded in association with each other to the use condition determining parameter management table D700a of the use condition determining parameter storage unit 112.

As a result of the purchase processing described above, the use condition determining parameter management table D700a of the use condition determining parameter storage unit 112 is created. Furthermore, it may be that several logic identifiers D703 and several parameters are set with respect to a single content. Now a description is given with reference to FIG. 7B. Since D701 through D704 have already been described in FIG. 6A, descriptions of them are not repeated. Parameters 2 D705 indicate the parameter which corresponds to the second logic identifiers. Priority orders D706 indicate the use condition determining logic code to be preferentially used for determining use permission in the case where several use condition determining logic codes exist and one of them is used for use permission determination. Further, the priority order D706 indicates, in the case where two or more use condition determining logic codes are used together for determining use permission, which logic is to be executed, whether or not several conditions are to be executed under AND condition or OR condition, and the like.

The content key storage unit 113 is a database for managing the content key for decrypting an encrypted content, and is used, when the license is generated in response to a license obtainment request from the terminal apparatus 300, for obtaining the content key which corresponds to the content identifier included in the license obtainment request.

Figure 8:
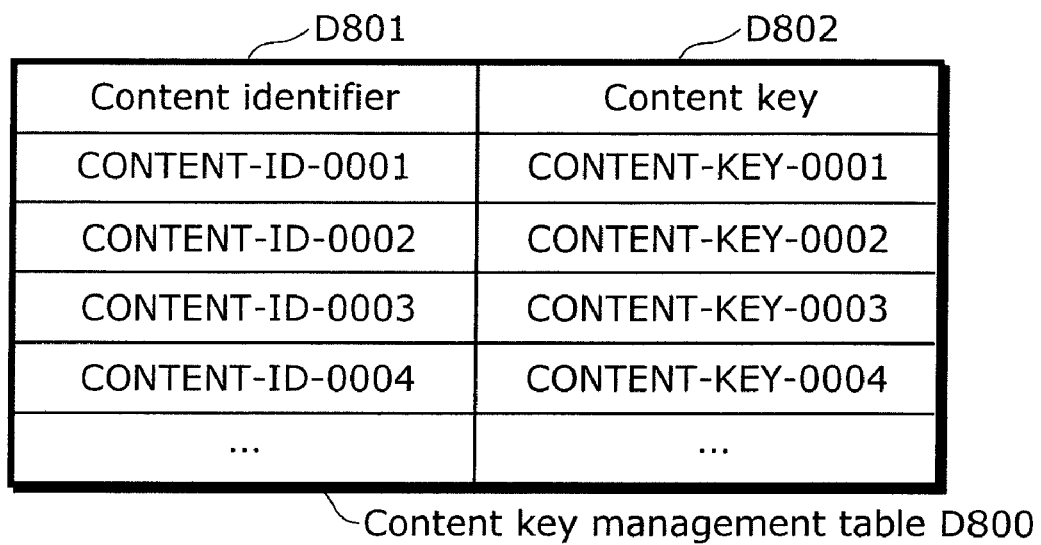
FIG. 8 is a diagram showing a table structure of a content key storage unit according to the embodiment 1 of the present invention.

More particularly, as shown in FIG. 8, the content key storage unit 113 includes a content key management table D800 having content identifiers D801 and content keys D802 which correspond to the content identifiers D801. For example, the table D800 indicates that when the content identifier D801 is identified as "CONTENT-ID-0001", the content key D802 for decrypting the encrypted content of the "CONTENT-ID-0001" is "CONTENT-KEY-0001". The data are recorded to the content key storage unit 113 by, for example, the CP which encrypts the content.

Next, the data held by the storage unit of the content distribution server 200 is described with reference to the drawing.

The content storage unit 211 is a database for managing the encrypted content, and is used, when the content is transmitted in response to a content obtainment request from the terminal apparatus 300, for obtaining the encrypted content which corresponds to the content identifier included in the content obtainment request.

Figure 9:
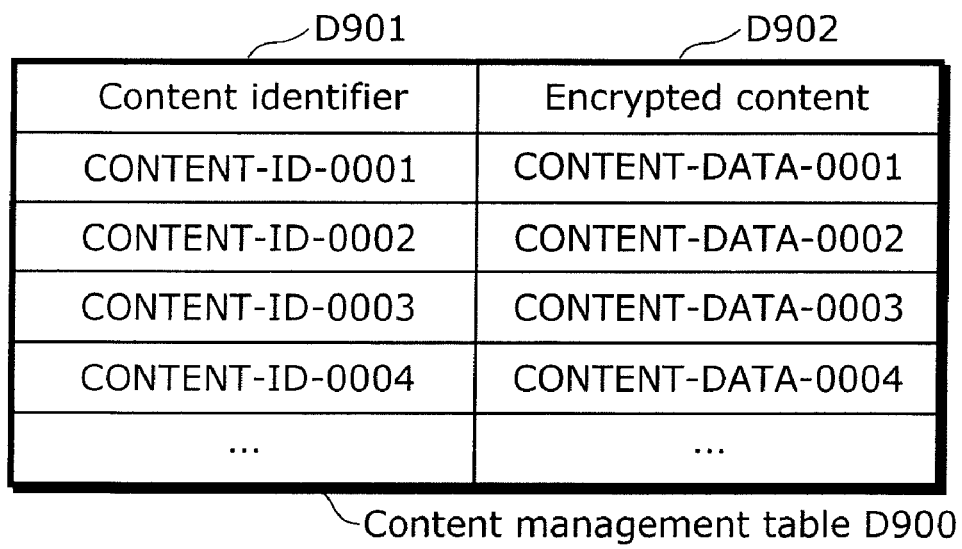
FIG. 9 is a diagram showing a table structure of a content storage unit according to the embodiment 1 of the present invention.

More particularly, as shown in FIG. 9, the content storage unit 211 includes a content management table D900 having content identifiers D901 and encrypted contents D902 which correspond to the content identifiers D901. For example, the content management table D900 indicates that when the content identifier D901 is "CONTENT-ID-0001", the encrypted content D902 of the "CONTENT-ID-0001" is "CONTENT-DATA-0001". The data are recorded to the content storage unit 211 by, for example, the CP which encrypts the content.

Next, the data held by the storage unit of the terminal apparatus 300 is described with reference to the drawing.

The content storage unit 311 is a database for managing the encrypted content, and used for obtaining the encrypted content when the terminal apparatus 300 uses the content. The specific descriptions are the same as described for the content storage unit 211 of the content distribution server 200. The data are recorded to the content storage unit 311 when the terminal apparatus 300 obtains the content from the content distribution server 200.

The license storage unit 312 is a database for managing the license, and used for obtaining the license which corresponds to the content identifier when the terminal apparatus 300 uses the content.

Figure 10:
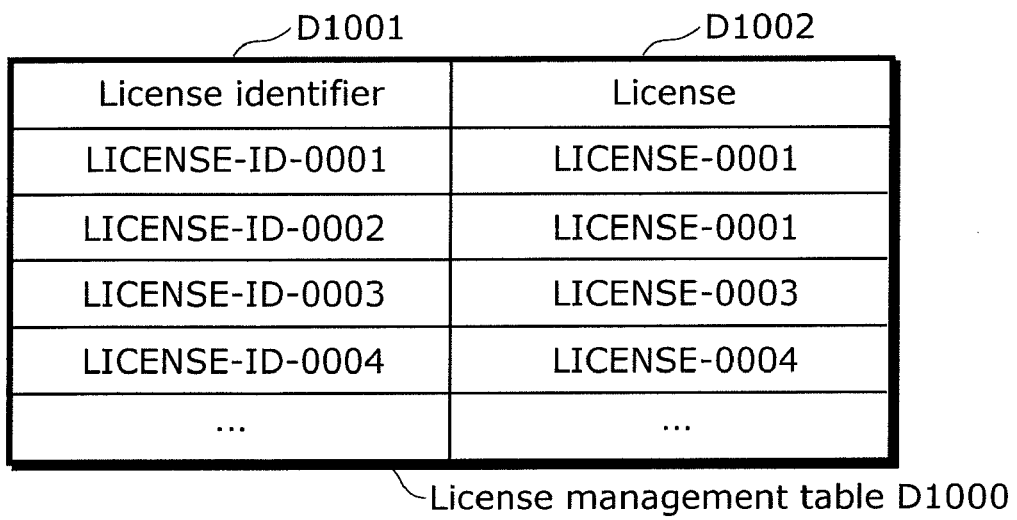
FIG. 10 is a diagram showing a table structure of a license storage unit according to the embodiment 1 of the present invention.

More particularly, as in FIG. 10, the license storage unit 312 includes a license management table D1000 having license identifiers D1001, and licenses D1002 which correspond to the license identifiers D1001. For example, the table D1001 shows that when the license identifier D1001 is "LICENSE-ID-0001", the corresponding license D1002 is "LICENSE-0001". The data are recorded to the license storage unit 312 when the terminal apparatus 300 obtains the license from the license distribution server 100. The data structure of the license D1002 is described later.

Lastly, the data held by the storage unit of the use condition management server 400 is described with reference to the drawing.

The use condition determining logic code storage unit 411 is a database that includes a use condition determining logic code management table for managing information related to the use condition determining logic code. The use condition determining logic code storage unit 411 is used, when the use condition determining logic code for update is transmitted in response to a use condition determining logic code update request form the license distribution server 100, for obtaining the use condition determining logic code for update. The details are same as described for the use condition determining logic code storage unit 111 of the license distribution server 100. The data are recorded to the use condition determining logic code storage unit 411 when a new use condition determining logic code is added according to the instruction of the server administrator, a request from the license distribution server 100 and the like. The processing is described later in detail.

The version number storage unit 412 is a database for managing the version of the use condition determining logic code, and used for assigning a new version number when a use condition determining logic code is added in the use condition management server 400.

Figure 11:
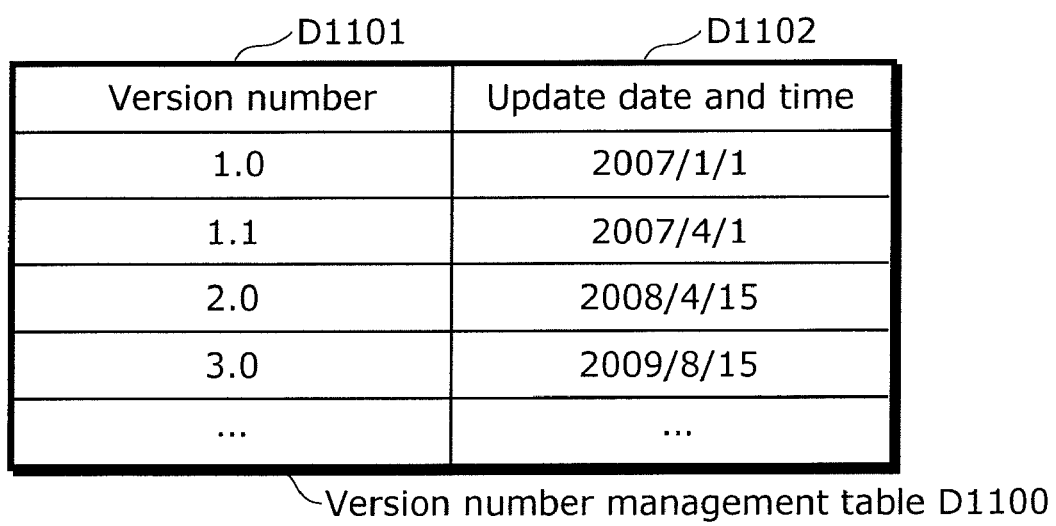
FIG. 11 is a diagram showing a table structure of a version number storage unit according to the embodiment 1 of the present invention.

More particularly, as shown in FIG. 11, the version number storage unit 412 includes a version number management table D1100 having version numbers D1101 and update dates and times D1102 indicating the date and on which the version number D1101 was assigned. For example, the table D1100 shows that the version number D1101 "1.0" was assigned on Jan. 1, 2007 as indicated by the update time and date D1102. The data are recorded to the version number storage unit 412 when a new use condition determining logic code is added according to the instruction of the server administrator, a request from the license distribution server 100 and the like. The processing is described later in detail.

Lastly, the data structure of the license distributed from the license distribution server 100 to the terminal apparatus 300 according to the present embodiment is described.

Figure 12:
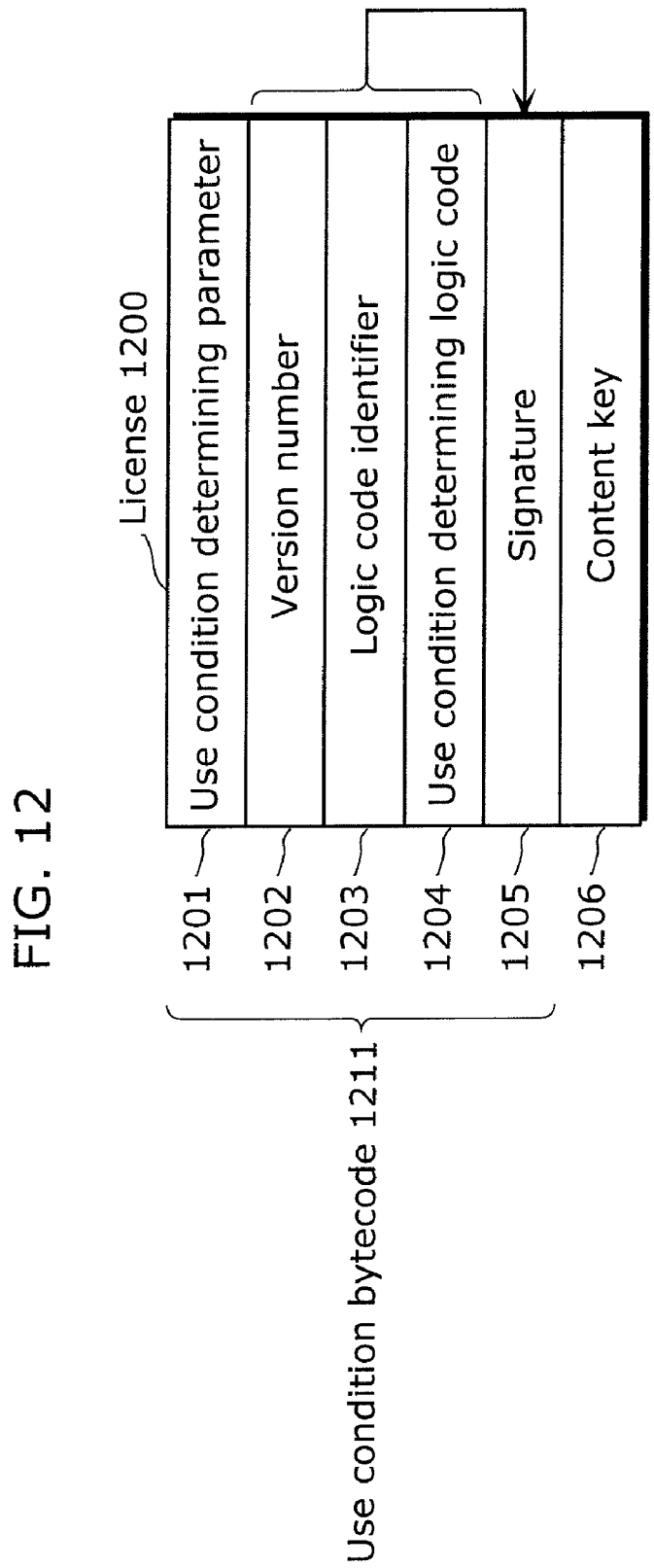
FIG. 12 is a diagram showing a data structure of a license distributed by the license distribution server according to the embodiment 1 of the present invention.

First, the data structure of the license issued by the license distribution server 100 is described with reference to FIG. 12.

The license 1200 includes: a use condition determining logic code 1204 that is a logic for determining whether or not use of the content is permitted; a use condition determining parameter 1201 to be referred by the use condition determining logic code 1204; a version number 1202 indicating the version of the use condition determining logic code 1204; a logic code identifier 1203 for uniquely identifying the use condition determining logic code 1204, a signature 1205; and a content key 1206 for decrypting the encrypted content which corresponds to the license 1200.

Here, the signature 1205 is a digital signature for data which includes the version number 1202, the logic code identifier 1203 and the use condition determining logic code 1204. It should be noted that the use condition determining logic code 1204 corresponds to the "use condition determining code" recited in the claims. Further, the version number 1202 is included in the "determination information" recited in the claims.

Here, the use condition bytecode in the license 1200 is described. In the license 1200, data including the use condition determining parameter 1201, the version number 1202, the logic code identifier 1203, the use condition determining logic code 1204, and the signature 1205 is referred to as "use condition bytecode 1211".

Furthermore, the license 1200 has been described above as a set of data; however, each item of the license 1200 may be separately distributed. For example, the data of the license 1200 may be separated into "the version number 1202, the logic code identifier 1203 and the use condition determining logic code 1204", "the signature 1205", "the content key 1206" and "other data" and distributed. In this case, it is necessary to separate the data in such a manner that tampering can be detected by using, for example, link information with a digital signature. The license 1200 described above needs to be associated with the license identifier and the content identifier in the processing related to the license storage unit 312 and the license. Here, in order to eliminate the need for associating the license 1200 with the license identifier and the content identifier in the terminal apparatus 300, the license 1200 may include the license identifier and the content identifier. The data structure of the license has been described above.

The data structure of the data used in the present embodiment have been described.

Next, the following five processing related to obtainment of the license and playback of the content according to the content distribution system are described.

(1) A processing performed by the license distribution server 100 for updating the use condition determining logic code.

(2) A processing performed by the terminal apparatus 300 for obtaining the license.

(3) A processing performed by the terminal apparatus 300 for obtaining the content.

(4) A processing performed by the terminal apparatus 300 for playing back the content.

(5) A processing performed by the use condition management server 400 for adding a new use condition determining logic code.

The above processing according to the content distribution system structured as described are described in the aforementioned order with reference to FIG. 20 through FIG. 25.

Prior to the description of each processing, a communication message according to the present embodiment is described.

Figure 13:
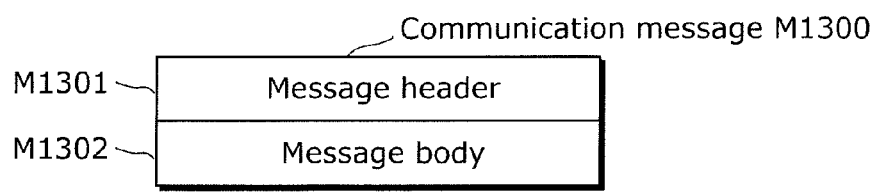
FIG. 13 is a diagram showing a structure of a communication message according to the embodiment 1 of the present invention.

FIG. 13 is a diagram showing the items of the message format of a communication message M1300 which is transmitted and received in communications among the servers and apparatuses including the license distribution server 100, the content distribution server 200, the terminal apparatus 300, and the use condition management server 400.

The communication message M1300 in FIG. 13 includes a message header M1301 and a message body M1302.

Here, the message header M1301 at least includes information for identifying the destination and information for identifying the source. The information for identifying the destination is refereed to as the destination of the message, and the information for identifying the source is refereed to as the destination of a return message transmitted in response to the message. Typical examples of the information for identifying the source or the destination include an IP address. The message body M1302 includes information unique to each message. The unique information of the message body is described in the description of the processing in which the message is required.

First, the processing performed by the license distribution server 100 for updating the use condition determining logic code is described.

Prior to the description of the use condition determining logic code update processing, the data structure of the communication message related to the use condition determining logic code update processing is described with reference to FIG. 14 and FIG. 15.

Figure 14:
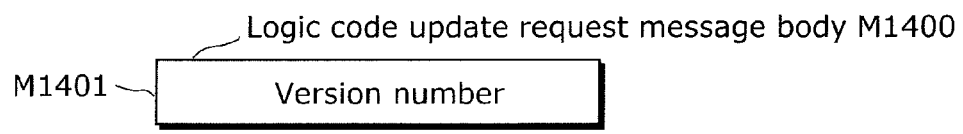
FIG. 14 is a diagram showing a structure of the body of a logic code update request message according to the embodiment 1 of the present invention.
Figure 15:
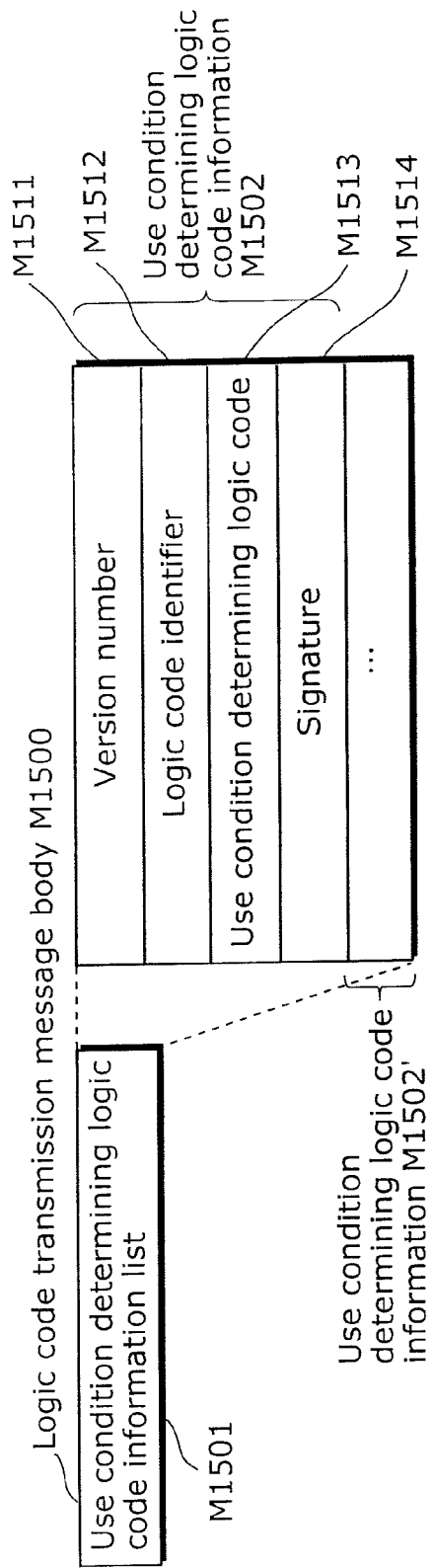
FIG. 15 is a diagram showing a structure of the body of a logic code transmission message according to the embodiment 1 of the present invention.

The logic code update request message body M1400 in FIG. 14 includes a version number M1401. The logic code transmission message body M1500 in FIG. 15 includes a use condition determining logic code information list M1501. The use condition determining logic code information list M1501 includes one or more use condition determining logic code information M1502. The use condition determining logic code information M1502 includes a use condition determining logic code M1513 that is logic for determining whether or not use of the content is permitted; a version number M1511 indicating the version of the use condition determining logic code M1513; a logic code identifier M1512 for uniquely identifying the use condition determining logic code M1513; and a signature M1514. Here, the signature M1514 is a digital signature for data including the version number M1511, the logic code identifier M1512 and the use condition determining logic code M1513.

The data structure of the communication message related to the use condition determining logic code update processing has been described above.

Next, the respective units in the processing performed by the license distribution server 100 for obtaining the use condition determining logic code for update from the use condition management server 400 are described.

The license distribution server 100 starts the use condition determining logic code update processing according to the instruction of the server administrator, the update instruction made periodically to the system and the like. The use condition determining logic code update unit 103 obtains the greatest version number among the version numbers D602 of the use condition determining logic code storage unit 111 (FIG. 20: Step S2011).

For example, in the case of the use condition determining logic code management table D600a in FIG. 6A, "2.0" is obtained as a version number. The use condition determining logic code update unit 103 generates a logic code update request message and transmits the generated message to the use condition management server 400 via the communication unit 101 (FIG. 20: Step S2012). For the version number M1401 included in the logic code update request message body M1400, the version number obtained in the Step S2011, for example, "2.0" is set.

Figure 20:
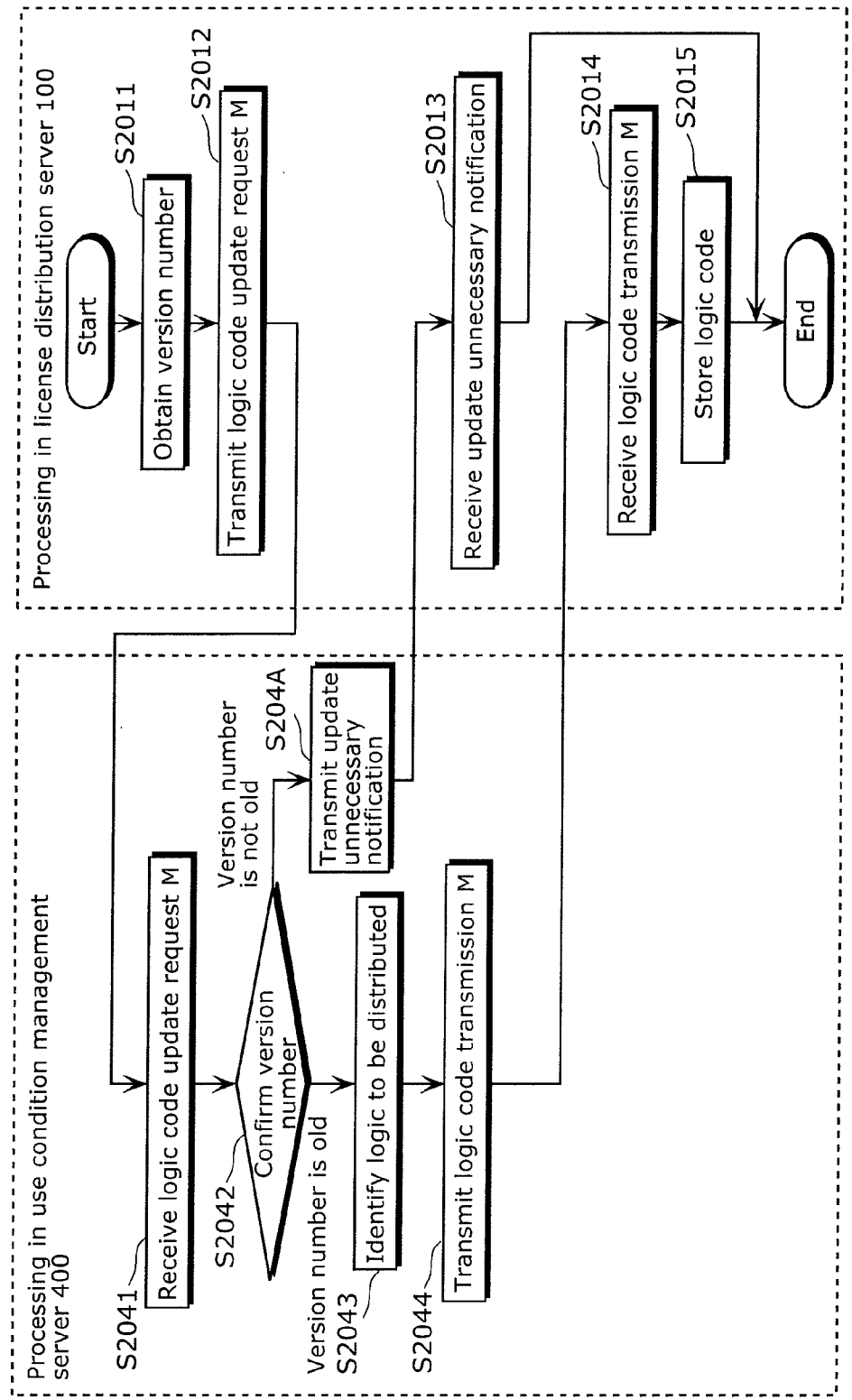
FIG. 20 is a flowchart showing processing performed by the license distribution server according to the embodiment 1 of the present invention for obtaining a use condition determining logic code for update from the use condition management server and updating the use condition determining logic code.

The use condition management server 400 receives the logic code update request message via the communication unit (FIG. 20: Step S2041).

The use condition determining logic code transmission unit 404 extracts the version number M1401 from the logic code update request message body M1400, obtains the greatest version number among the version numbers D602 of the use condition determining logic code storage unit 411, and determines whether or not the version number M1401 is older (the value is smaller) than the version number obtained from the version number storage unit 412 (FIG. 20: Step S2042).

When the version number M1401 is not older than the version number obtained from the use condition determining logic code storage unit 411, the use condition determining logic code transmission unit 404 determines that the update processing is unnecessary, terminates the processing, and transmits to the license distribution server 100 a return message indicating in the message body that no update processing is necessary (FIG. 20: Step S204A).

Upon receiving, from the use condition management server 400, the return message indicating that no update is necessary, the license distribution server 100 notifies the administrator of the reason, included in the return message, that no update is necessary, or records it as a log in the system, and terminates the processing. Alternatively, it may be that when the version number M1401 is greater than the version number obtained from the use condition determining logic code storage unit 411, the license distribution server 100 determines that an unauthorized processing has been performed, and thus does not permit the subsequent update processing.

When the version number M1401 is older than the version number obtained from the use condition determining logic code storage unit 411, the use condition determining logic code transmission unit 404 determines that the update processing is necessary and identifies a version number greater than the version number M1401 among the version numbers D602 of the use condition determining logic code storage unit 411. The use condition determining logic code transmission unit 404 identifies, as use condition determining logic code information to be distributed, a set of the use condition determining logic code information including "the logic identifier D601, the version number D602, the logic code D603 and the signature D604" which are associated with the version number (FIG. 20: Step S2043).

The use condition determining logic code transmission unit 404 sets, to the use condition determining logic code information M1502 of the logic code transmission message body M1500, each of the identified use condition determining logic code information to be distributed, for transmission to the license distribution server 100 via the communication unit 401 (FIG. 20: Step S2044). It has been described that the signature D604 is read from the use condition determining logic code management table D600a and is set to the message; however, the signature D604 may be dynamically generated and assigned. The dynamic generation of the signature D604 is effective when a key used for the signature changes.

The license distribution server 100 receives the logic code transmission message body M1500 via the communication unit 101, and obtains the use condition determining logic code information list M1501 (FIG. 20: Step S2014).

The license distribution server 100 stores the obtained use condition determining logic code information list M1501 in the use condition determining logic code storage unit 111 (FIG. 20: Step S2015).

It has been described above that only the use condition determining logic code information is transmitted which includes the version number greater than the version number M1401 obtained by the use condition management server 400 from the license distribution server 100, that is, only the update data is transmitted. Alternatively, it may be that all use condition determining logic code information held by the use condition management server 400 are transmitted.

Furthermore, it may be that the use condition management server 400 holds the following information in association with each other: a SP identifier for identifying the SP that manages the license distribution server 100 or a license distribution server identifier; and a contract status with the use condition management server 400, reliability, management rule of services provided by the SP, the logic identifier necessary for the services provided by the SP or the like. Then the use condition management server 400 may selectively extract the use condition determining logic code information to be distributed depending on the counterpart that transmitted the logic code update request M.

Furthermore, it may be that restriction information relating to the setting of the use condition determining parameter of the license distribution server 100 is transmitted along with the use condition determining logic code information. Specific examples of the restriction information include parameter type restriction and domain restriction. Further, the restriction may be set according to the SP identifier or license distribution server identifier. For example, in the case of the parameter with respect to the logic for restricting the number of playbacks, it is possible for the SP1 to set the number of playback restrictions up to 10 times, whereas it is possible for the SP2 to set up to 50 times.

The processing has been described above in which the user gives an instruction to obtain the license according to the instruction of the server administrator or the periodical update instruction to the system, and the license distribution server 100 obtains the use condition determining logic code information from the use condition management server 400.

Next, the processing performed by the terminal apparatus 300 for obtaining the license from the license distribution server 100 is described.

Figure 16:
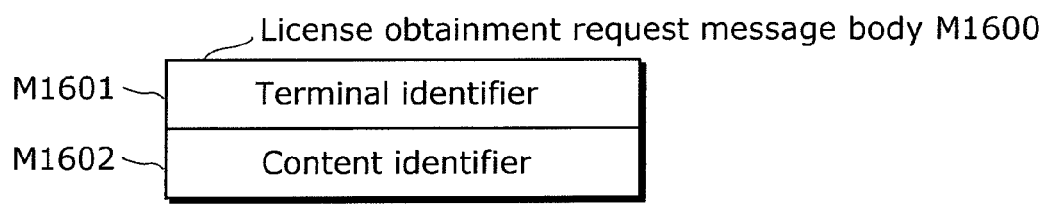
FIG. 16 is a diagram showing a structure of the body of a license obtainment request message according to the embodiment 1 of the present invention.
Figure 17:
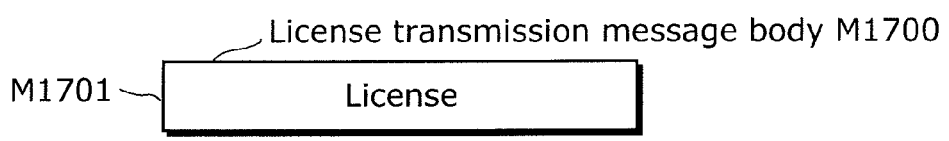
FIG. 17 is a diagram showing a structure of the body of a license transmission message according to the embodiment 1 of the present invention.

Prior to the description of the license obtainment processing, the data structure of the communication message related to the license obtainment processing is described with reference to FIG. 16 and FIG. 17. The license obtainment request message body M1600 in FIG. 16 includes a user identifier M1601 and a content identifier M1602. The license transmission message body M1700 in FIG. 17 includes a license M1701.

The data structure of the communication message related to the license obtainment processing has been described above.

Next, the respective units in the processing performed by the terminal apparatus 300 for obtaining the license from the license distribution server 100 are described with reference to FIG. 21.

Figure 21:
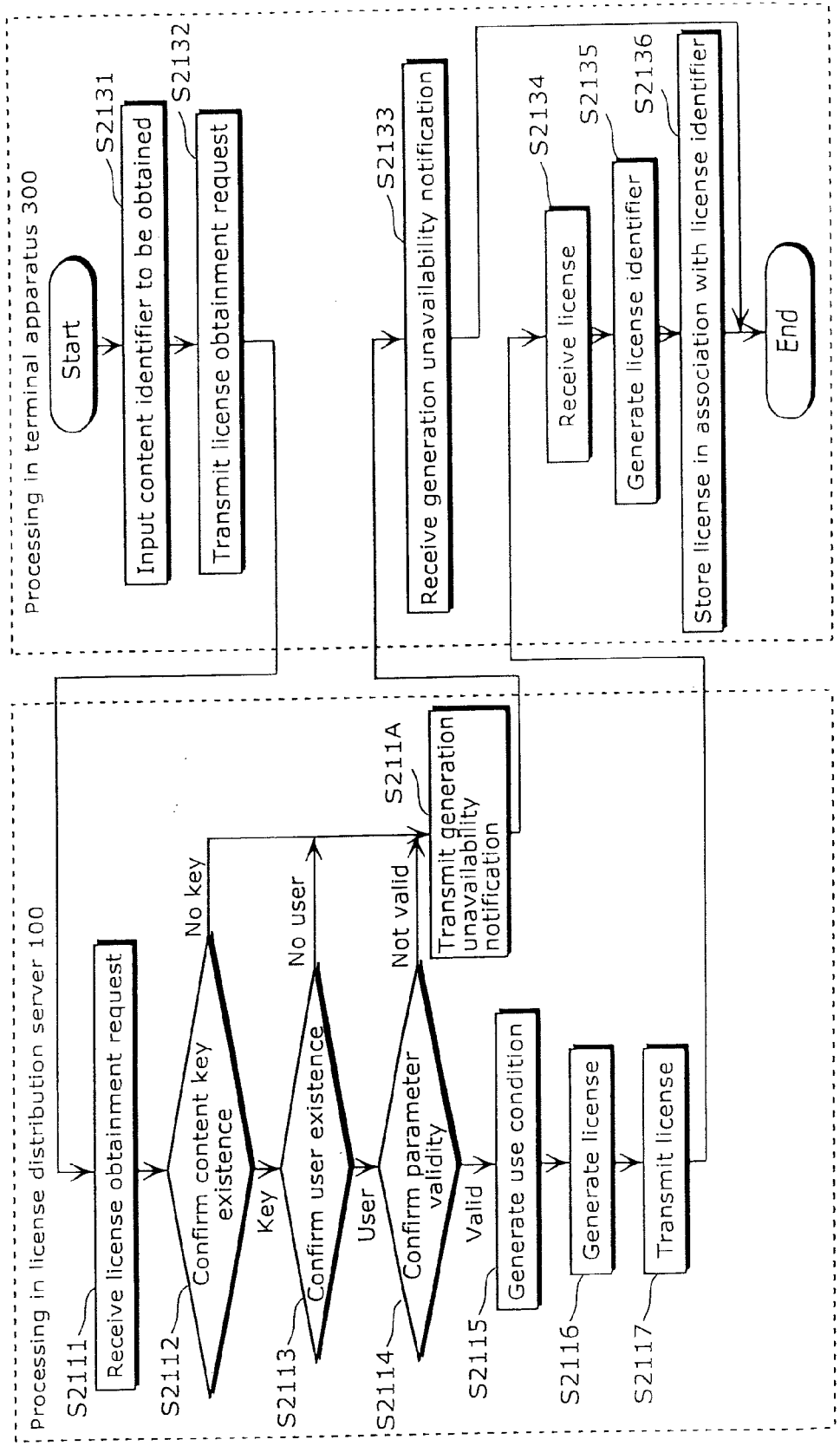
FIG. 21 is a flowchart showing processing performed by the terminal apparatus according to the embodiment 1 of the present invention for obtaining a license from the license distribution server.

The terminal apparatus 300 starts the license obtainment processing when the user inputs information to an application of the terminal apparatus 300 and instructs to obtain the license (FIG. 21: Step S2131). The user needs to input, to the application of the terminal apparatus 300, a content identifier which is one of the information identifying the license to be obtained, or information in accordance with the content identifier at least. The following is described in the case where the user starts the license obtainment processing by inputting the content identifier "CONTENT-ID-0001".

Upon receiving the information inputted by the user, the terminal apparatus 300 generates a license obtainment request message in the license obtainment unit 304, and transmits the generated message to the license distribution server 100 via the communication unit 301 (FIG. 21: Step S2132). For the user identifier M1601 included in the license obtainment request message body M1600, the user identifier of the user who instructed the license obtainment, for example, "USER-ID-0001" is set. For the content identifier M1602, the content identifier "CCONTENT-ID-0001" inputted by the user is set. Here, the user identifier may be inputted by the user, or stored in the storage area (not shown) of the terminal apparatus 300 in advance. Furthermore, it may be that a terminal identifier which uniquely identifies the terminal apparatus 300 is set in the license obtainment request message body M1600, and the license distribution server 100 identifies the user identifier which corresponds to the terminal identifier.

The license distribution server 100 receives the license obtainment request message via the communication unit 101 (FIG. 21: Step S2111).

The license generation-transmission unit 102 extracts the content identifier M1602 from the license obtainment request message body M1600, and determines whether or not the content key corresponding to the content identifier M1602 exits in the content key storage unit 113 (FIG. 21: Step S2112).

When the content key does not exist, the license cannot be generated; therefore, the license generation-transmission unit 102 terminates the processing and transmits to the terminal apparatus 300 a return message indicating in the message body that the content key does not exist, that is, the content identifier is unauthorized (FIG. 21: Step S211A). The license generation-transmission unit 102 performs the following processing when the content key exists. In the present embodiment, as in FIG. 8, the description is hereinafter continued of the case where the content key "CONTENT-KEY-0001" corresponding to the content identifier "CONTENT-ID-0001" exists.

The license generation-transmission unit 102 extracts the user identifier M1601 from the license obtainment request message body M1600, and determines, with the user identifier M1601 as a key, whether or not the corresponding user identifier D701 exists in the use condition determining parameter management table D700 held by the use condition determining parameter storage unit 112 (FIG. 21: Step S2113). When the user identifier M1601 does not exist in the use condition determining parameter management table D700, the license generation-transmission unit 102 determines that the user of the terminal apparatus 300 which transmitted the license distribution request message is not registered in the content distribution service. Since the license use condition cannot be generated, the license generation-transmission unit 102 terminates the processing and transmits to the terminal apparatus 300 a return message indicating in the message body that the user identifier does not exist (FIG. 21: Step S211A).

When the user identifier D701 exists, the following processing is performed. In the present embodiment, as in FIG. 7A and FIG. 7B, the description is hereinafter continued of the case where the user identifier "USER-ID-0001" exits.

The license generation-transmission unit 102 determines whether or not the target use condition exists in the use condition determining parameter management table D700a held by the use condition determining parameter storage unit 112, based on the user identifier D701 and the content identifier M1602 extracted from the license obtainment request message body M1600 (FIG. 21: Step S2114).

More particularly, the license generation-transmission unit 102 identifies the record in which the user identifier D701 and the content identifier D702 of the use condition determining parameter management table D700a correspond to the user identifier D701 and the content identifier M1602 respectively. When the record does not exist, the license generation-transmission unit 102 transmits to the terminal apparatus 300 a return message indicating that the use condition does not exist (FIG. 21: Step S211A).

When the record exists, the license generation-transmission unit 102 obtains the logic identifier D703 and the parameter D704 that are stored, and determines whether or not the parameter D704 is valid (FIG. 21: Step S2114).

More particularly, the license generation-transmission unit 102 determines that the parameter D704 is invalid when the parameter D704 does not make sense as a use condition. For example, when the value of the parameter D704 corresponding to the logic for controlling the number of playbacks is 0, it is determined to be invalid. Furthermore, the license generation-transmission unit 102 may hold the distribution permitted period and the like in association with the parameter D704 to determine whether or not the parameter D704 is valid. When the parameter D704 is invalid, the license generation-transmission unit 102 transmits to the terminal apparatus 300 a return message indicating that the use condition is invalid (FIG. 21: Step S211A).

When the parameter D704 is valid, the license generation-transmission unit 102 identifies, with the logic identifier D703 as a key, the logic identifier D601 which matches or corresponds to the logic identifier 703 from the use condition determining logic code management table D600 held by the use condition determining logic code storage unit 111. Then the license generation-transmission unit 102 generates the use condition bytecode from the logic code D603 of the record and the parameter D704 (FIG. 21: Step S2115). It has been described above that the use condition bytecode is generated using the parameter D704 described in the record; however, the use condition bytecode may be generated using a part of the parameter D704 described in the record. For example, when the value of the parameter D704, which corresponds to the logic for controlling the number of playbacks is 10, the use condition bytecode may be generated using 3 playbacks and the parameter D704 may be reduced to 7 playbacks.

The license generation-transmission unit 102 identifies, with the content identifier M1602 as a key, the content identifier D801 which matches or corresponds to the content identifier M1602 from the content key management table D800 held by the content key storage unit 113, and then obtains the corresponding content key D802 in the record.

The license generation-transmission unit 102 generates the license from the use condition bytecode and the content key D802 (FIG. 21: Step S2116).

Here, a specific example is given. In the use condition determining parameter management table D700a, the logic identifier identified by the user identifier "USER-ID-0001" and the content identifier "CONTENT-ID-0001" is "LOGIC-ID-0001" and the parameter is "till Aug. 15, 2007". Assumed that the determination date is Aug. 1, 2007, the parameter is determined to be valid; whereas assumed that the determination date is Aug. 20, 2007, the parameter is determined to be invalid. In the use condition determining logic code management table D600a, the record identified by the logic identifier "LOGIC-ID-0001" indicates the version number "1.0", the logic code "current time<parameter", and the signature "323bf3bbc". In the content key management table D800, the content key identified by the content identifier "CONTENT-ID-0001" is "CONTENT-KEY-0001".

Here, the license generated according to the license obtainment request message including the user identifier "USER-ID-0001" and the content identifier "CONTENT-ID-0001" is described with reference to FIG. 12.

The license includes the use condition determining parameter 1201 "till Aug. 15, 2007", the version number 1202 "1.0", the logic code identifier 1203 "LOGIC-ID-0001", the use condition determining logic code 1204 "current time<parameter", the signature 1205 "323bf3bbc" and the content key 1206 "CONTENT-KEY-0001".

The license generation-transmission unit 102 sets the license to the license M1701 of the license transmission message body M1700 for transmission to the terminal apparatus 300 via the communication unit 101 (FIG. 21: Step S2117).

The terminal apparatus 300 receives the license transmission message body M1700 via the communication unit 301 and obtains the license M1701 (FIG. 21: Step S2134).

The terminal apparatus 300 generates a license identifier that is unique in the terminal apparatus (FIG. 21: Step S2135).

The terminal apparatus 300 stores, in the license storage unit 312, the obtained license M1701 in association with the content identifier that is identical with the content identifier M1602 of the license obtainment request message, and the license identifier (FIG. 21: Step S2136). When the content identifier is included in the license M1701, it is not necessary to associate with the content identifier.

The license identifier has been defined above as information for uniquely identifying the license in the terminal apparatus 300, and has been described to be generated by the terminal apparatus 300. Alternatively, it may be that the license identifier is defined as information for uniquely identifying the license in the license use system, and the license distribution server 100 generate the license identifier when generating the license and assigns the license identifier to the license. In this case, the processing of generating the license identifier and associating with the license identifier are not necessary in the terminal apparatus 300.

Upon receiving from the license distribution server 100 the return message indicating that generation is not possible, the terminal apparatus 300 notifies the user of the reason, included in the return message, that the generation is not possible, and terminates the processing.

The processing performed by the user for instructing obtainment of the license and by the terminal apparatus 300 for obtaining the license from the license distribution server 100 have been described above.

Next, the content obtainment processing is described.

Figure 18:
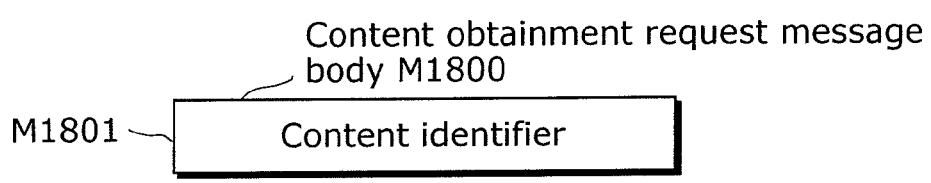
FIG. 18 is a diagram showing a structure of the body of a content obtainment request message according to the embodiment 1 of the present invention.
Figure 19:
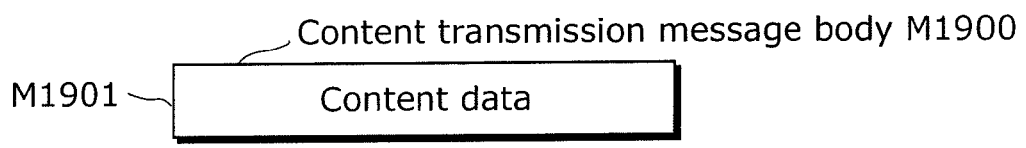
FIG. 19 is a diagram showing a structure of the body of a content transmission message according to the embodiment 1 of the present invention.

Prior to the description of the content obtainment processing, the data structure of the communication message related to the content obtainment processing is described with reference to FIG. 18 and FIG. 19. The content obtainment request message body M1800 in FIG. 18 includes a content identifier M1801. The content transmission message body M1900 in FIG. 19 includes content M1901. The data structure of the communication message related to the content obtainment processing has been described above.

Next, the respective units in the processing performed by the terminal apparatus 300 for obtaining the content from the content distribution server 200 is described.

Figure 22:
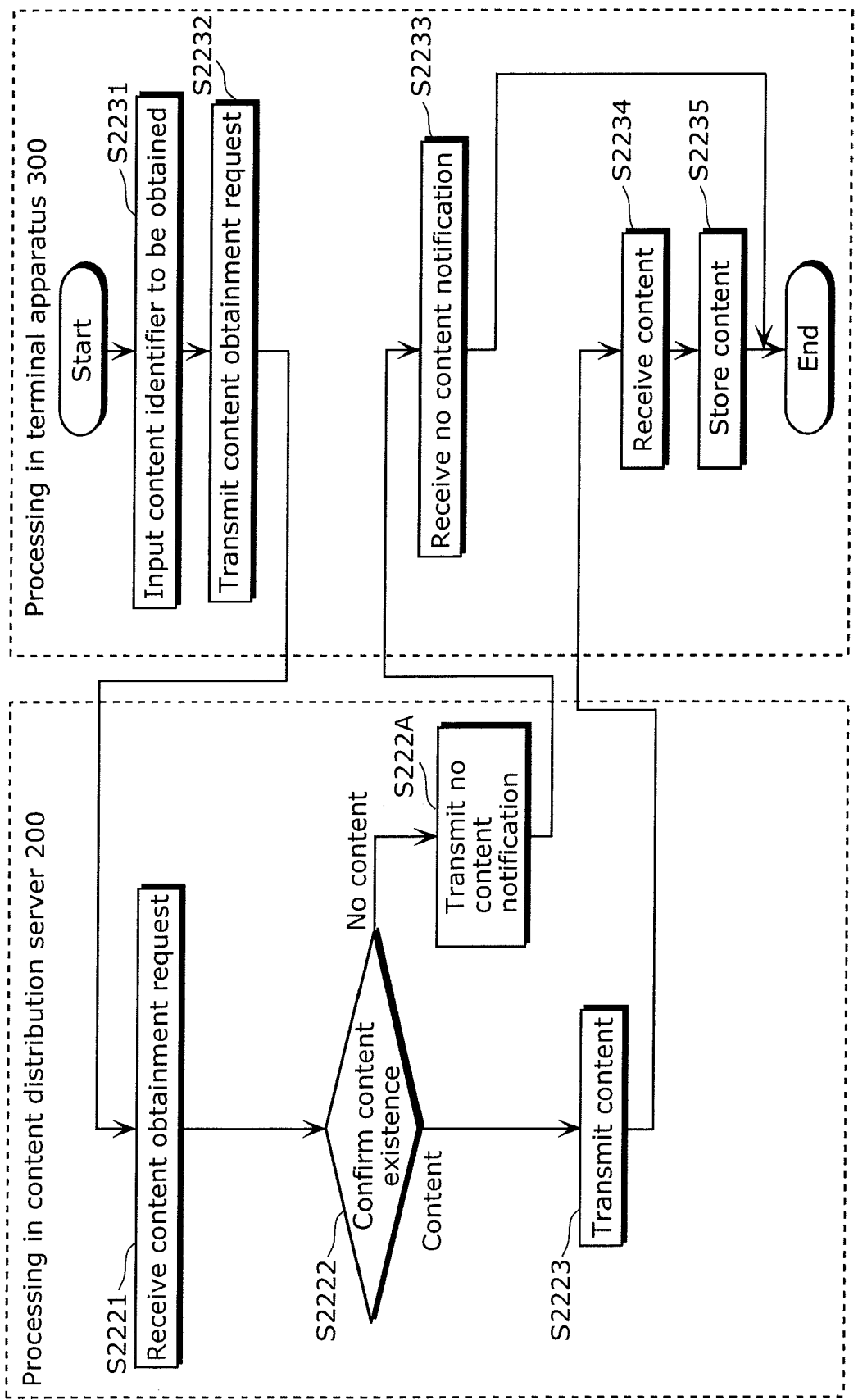
FIG. 22 is a flowchart showing processing performed by the terminal apparatus according to the embodiment 1 of the present invention for obtaining content from the content distribution server.

The terminal apparatus 300 starts the content obtainment processing when the user inputs information to an application of the terminal apparatus 300 and instructs to obtain the content (FIG. 22: Step S2231). The user needs to input, to the application of the terminal apparatus 300, a content identifier which is one of the information identifying the content to be obtained, or information in accordance with the content identifier at least. A description is hereinafter given of the case where the user inputs the content identifier "CONTENT-ID-0001" and starts the content obtainment processing.

Upon receiving the information inputted by the user, the terminal apparatus 300 generates the content obtainment request message in the content obtainment unit 305 and transmits the generated message to the content distribution server 200 via the communication unit 301 (FIG. 22: Step S2232). For the content identifier M1801 included in the content obtainment request message body M1800, the content identifier "CONTENT-ID-0001" inputted by the user is set.

The content distribution server 200 receives the content obtainment request message via the communication unit 201 (FIG. 22: Step S2211).

The content obtainment-transmission unit 202 extracts the content identifier M1801 from the content obtainment request message body M1800, and determines whether or not the content corresponding to the content identifier M1801 exists in the content storage unit 211 (FIG. 22: Step S2212).

When the content does not exist, the content cannot be obtained; therefore, the content obtainment-transmission unit 202 terminates the processing and transmits to the terminal apparatus 300 a return message indicating in the message body that the content does not exist, that is, the content identifier is unauthorized (FIG. 22: Step S221A). When the content exists, the content obtainment-transmission unit 202 obtains the content and performs the following processing. In the present embodiment, as in FIG. 9, the description is hereinafter continued of the case where the content "CONTENT-DATA-0001" corresponding to the content identifier "CONTENT-ID-0001" exists.

The content obtainment-transmission unit 202 sets the content to the content M1901 of the content transmission message body M1900 for transmission to the terminal apparatus 300 via the communication unit 201 (FIG. 22: Step S2213).

The terminal apparatus 300 receives the content transmission message body M1900 via the communication unit 301 and obtains the content M1901 (FIG. 22: Step S2234).

The terminal apparatus 300 stores, in the license storage unit 312, the obtained content M1901 in association with the content identifier that is identical with the content identifier M1801 of the content obtainment request message (FIG. 22: Step S2235). When the content identifier is included in the content M1901, it is not necessary to associate with the content identifier.

When the terminal apparatus 300 receives from the content distribution server 200 the return message indicating that the distribution is not possible, the terminal apparatus 300 notifies the user of the reason, included in the return message, that the generation is not possible, and terminates the processing.

The processing performed by the user for instructing obtainment of the content and by the terminal apparatus 300 for obtaining the content from the content distribution server 200 have been described above.

Next, the respective units of the processing performed by the terminal apparatus 300 for playing back the content and completing the playback of the content are described with reference to FIG. 23 and FIG. 24.

Figure 23:
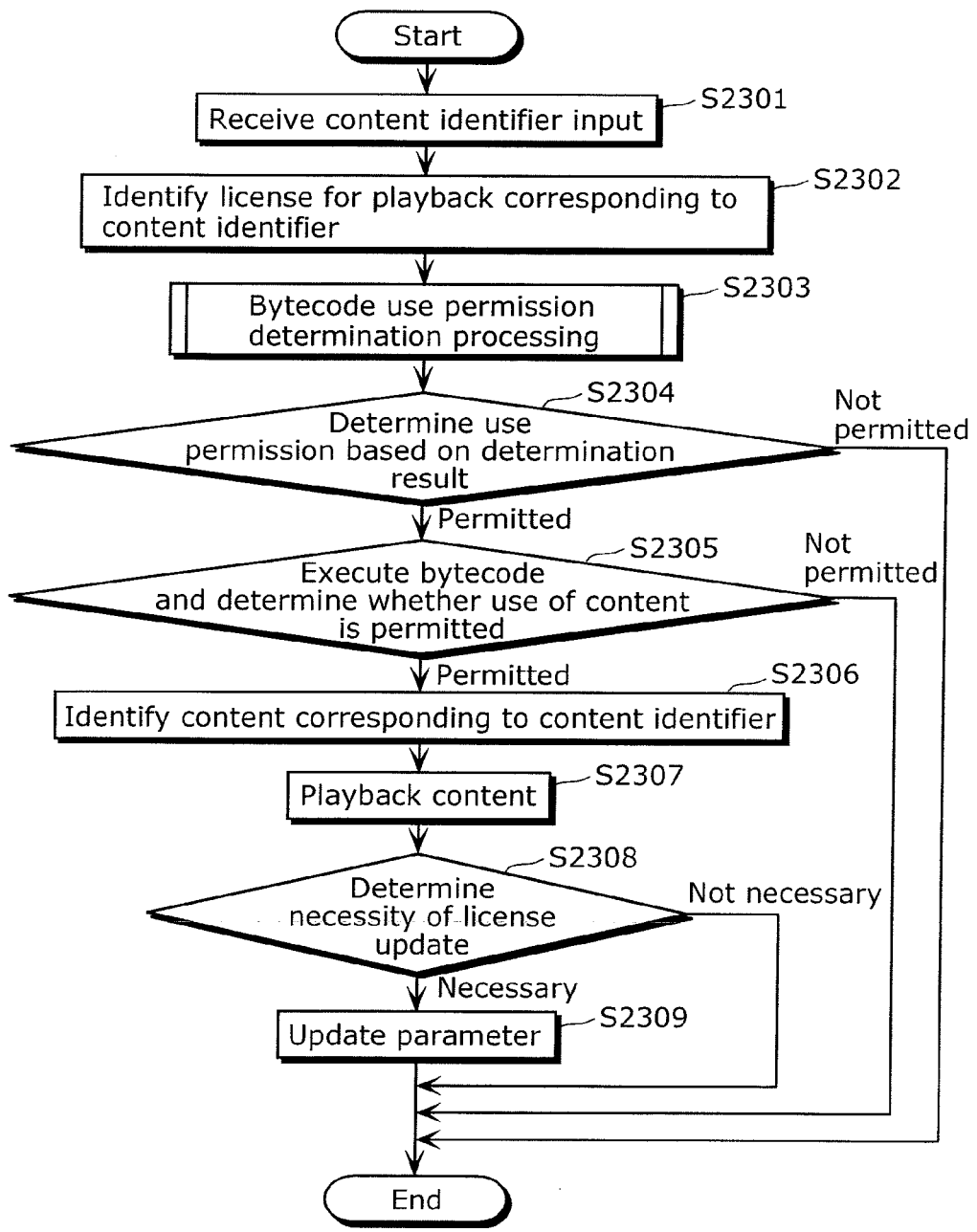
FIG. 23 is a flowchart showing processing performed by the terminal apparatus according to the embodiment 1 of the present invention for playing back the content and updating the license.

The terminal apparatus 300 starts the content playback processing when the user inputs information to an application of the terminal apparatus 300 and instructs to playback the content (FIG. 23: Step S2301). The user needs to input, to the application of the terminal apparatus 300, a content identifier which is one of the information identifying the content to be played back, or the license identifier at least. Hereinafter, a description is given of the case where the user inputs the license identifier and starts the content playback processing.

When the terminal apparatus 300 receives the information inputted by the user, the use condition verification unit 302 identifies the license based on the license identifier (FIG. 23: Step S2302). The use condition verification unit 302 extracts the use condition determining logic code information included in the identified license, and performs the bytecode use permission determination processing for determining whether or not use of the use condition bytecode is permitted (FIG. 23: Step S2303).

The use condition bytecode execution unit 303 confirms the determination result of the bytecode use permission determination processing, and determines whether or not the execution of the use condition bytecode is permitted (FIG. 23: Step S2304).

When the execution of the use condition bytecode is not permitted, the use condition bytecode execution unit 303 terminates the processing, and notifies the user that the execution of the use condition bytecode is not permitted, along with its reason. When the execution of the use condition bytecode is not permitted, it may be that the use condition bytecode execution unit 303 notifies the user that the execution of the use condition bytecode is not permitted as well as its reason, and the following processing is performed if the user still wishes to continue the processing. For example, the notification may be made, such as "The operation of the use condition corresponding to the target content has not been confirmed by the technology management organization. Do you still wish to continue the processing?" It is effective for the user who wishes to use the content even with a risk of an operation error on VM. Furthermore, it is important from the standpoint of convenience of the user to notify the user that the execution of the use condition bytecode being not permitted only means that the operation has not been guaranteed by the technology management organization, but does not mean that the operation always fail.

When the execution of the use condition bytecode is permitted, it is determined that the operation of the use condition bytecode in the use condition bytecode execution unit 303 has been confirmed by the use condition management server 400 and the technology management organization, that is, the execution of the use condition bytecode has a low risk of trouble in the terminal apparatus 300.

The use condition bytecode execution unit 303 executes the use condition bytecode and determines whether or not use of the content is permitted (FIG. 23: Step S2305). Here, the determination of whether or not use of the content is permitted performed by the use condition bytecode, is briefly described. As described earlier, the use condition bytecode at least includes the use condition determining logic code and the use condition determining parameter. The determination of whether or not use of the content is permitted, is performed by the use condition determining logic code referring to the use condition determining parameter.

More particularly, in the case where the use condition bytecode includes the use condition determining logic code indicating "if current time<parameter, use is permitted" and the use condition determining parameter indicating "Aug. 8, 2007", the use condition bytecode execution unit 303 performs use permission determination such as "if current time is earlier than Aug. 8, 2007, use is permitted, and if not, the use is not permitted". When the use of the content is not permitted, the use condition bytecode execution unit 303 terminates the processing and notifies the user that the use of the content is not permitted, as well as its reason.

When the use of the content is permitted, the content playback unit 306 identifies, with the content identifier in association with the license as a key, the corresponding content from the content storage unit 311 (FIG. 23: Step S2306).

The content playback unit 306 decrypts the content using the content key included in the license and plays back the decrypted content (FIG. 23: Step S2307).

The use condition bytecode which operates in the use condition bytecode execution unit 303 determines the necessity of update of the use condition determining parameter during the playback of the content or when the playback is completed (FIG. 23: Step S2308). For example, when the use condition determining logic code controls the number of permitted playbacks, the update is determined to be necessary; whereas, when the use condition determining logic code controls the playback permitted period, the update is determined to be unnecessary.

When the update is unnecessary, the playback is continued or the processing is terminated.

When the update is necessary, the use condition bytecode updates the use condition determining parameter (FIG. 23: Step S2309). For example, when the use condition determining logic code controls the number of permitted playbacks, and when the use condition determining parameter is "5 times", the use condition determining parameter is updated to be "4 times" when the playback is completed. Alternatively, instead of updating the use condition determining parameter, the storage area of the terminal apparatus 300 may record "1 time" as a use history. In this case, the use condition determining logic code is a program for determining use permission based on the use history and the use condition determining parameter. In the case where the data corresponding to the number of permitted playbacks is included in the use condition determining logic code, signature verification fails when the data of the use condition determining logic code is updated. Thus, the data corresponding to the number of permitted playbacks needs to be recorded in the storage area of the terminal apparatus 300.

The processing performed by the terminal apparatus 300 for playing back the content and completing the playback of the content have been described.

Next, the bytecode use permission determination processing in Step S2303 of FIG. 23 is described with reference to the flowchart in FIG. 24.

Figure 24:
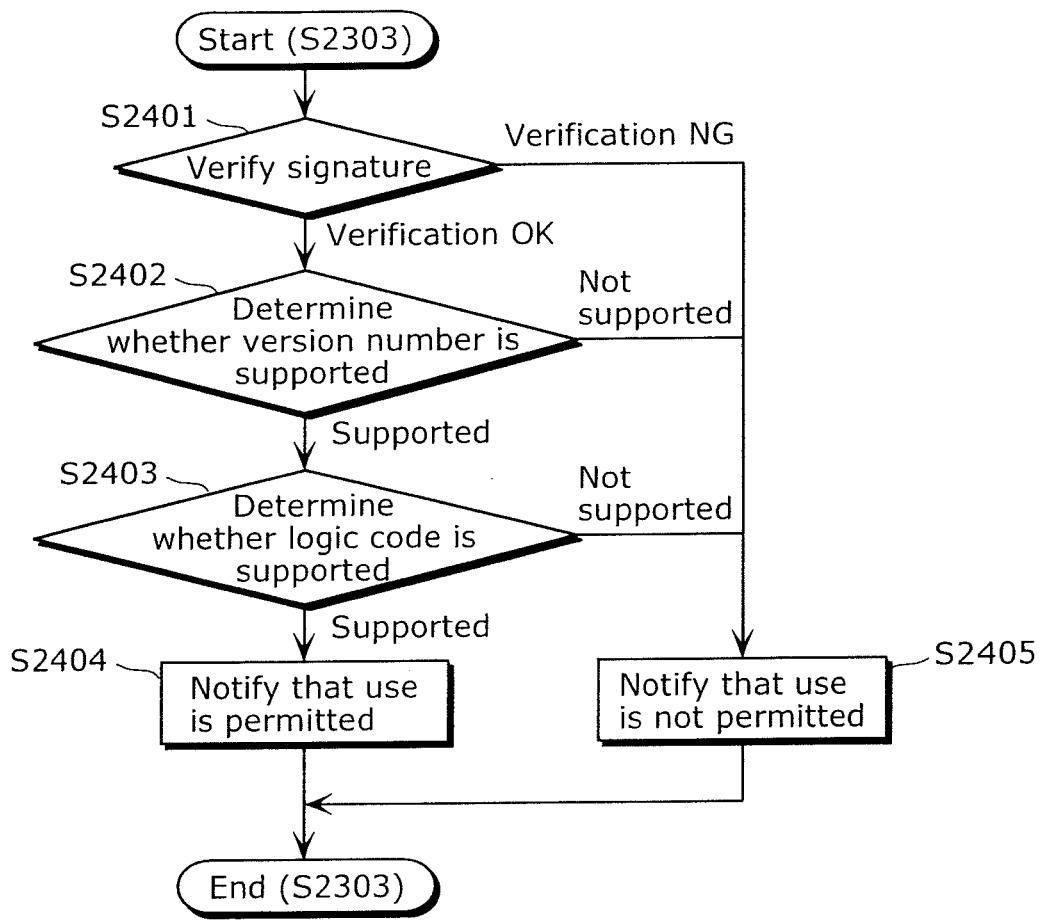
FIG. 24 is a flowchart showing processing for determining bytecode use permission according to the embodiment 1 of the present invention.

The use condition verification unit 302 verifies signature of the use condition determining logic code information (FIG. 24: Step S2401). More particularly, the use condition verification unit 302 verifies the use condition determining logic code information using the public key of the use condition management server 400 recorded in the storage area (not shown) of the terminal apparatus 300.

When the verification of the use condition determining logic code information fails, the notification that the use is not permitted is presented as well as its reason (FIG. 24: Step S2405).

When the verification of the use condition determining logic code information succeeds, the following processing is performed.

The use condition verification unit 302 extracts the version number from the use condition determining logic code information, and also obtains, from the use condition bytecode execution unit 303, the bytecode execution unit version number which indicates the version number of the use condition bytecode executable in the use condition bytecode execution unit 303. Here, it should be noted that the bytecode execution unit version number is included in the "operable version information" recited in the claims, and corresponds to the "version number indicated by the operable version information" recited in the claims.

The use condition verification unit 302 determines, from the version number and the bytecode execution unit version number, whether or not the use condition bytecode execution unit 303 supports the use condition determining logic code (FIG. 24: Step S2402).

More particularly, when the version number is equal to or less than the bytecode execution unit version number, the use condition verification unit 302 determines that the use condition bytecode execution unit 303 supports the execution of the use condition determining logic code. When the version number is greater than the bytecode execution unit version number, the use condition verification unit 302 determines that the use condition bytecode execution unit 303 does not support the execution of the use condition determining logic code.

When determined that the use condition bytecode execution unit 303 does not support the execution of the use condition determining logic code, the notification that the use is not permitted is presented as well as its reason (FIG. 24: Step S2405).

When determined that the use condition bytecode execution unit 303 supports the execution of the use condition determining logic code, the following processing is performed.

The use condition verification unit 302 extracts the logic identifier from the use condition determining logic code information, and also obtains, from the use condition bytecode execution unit 303, a logic identifier list that is a list of the logic identifier of the use condition determining logic code executable in the use condition bytecode execution unit 303.

The use condition verification unit 302 determines, from the logic identifier and the logic identifier list, whether or not the use condition bytecode execution unit 303 supports the use condition determining logic code corresponding to the logic identifier (FIG. 24: Step S2403).

More particularly, when the logic identifier is included in the logic identifier list, the use condition verification unit 302 determines that the use condition bytecode execution unit 303 supports the execution of the use condition determining logic code. When the logic identifier is not included in the logic identifier list, the use condition verification unit 302 determines that the use condition bytecode execution unit 303 does not support the execution of the use condition determining logic code. It has been described above that the logic identifier is used as information for identifying the use condition determining logic code; however, the use condition determining logic code may be identified using character string indicating the processing content of the use condition determining logic code, such as character string indicating information of validity period control or the number of uses. In this case, the character string may be used for determination of whether the use condition bytecode execution unit 303 supports the execution of the use condition determining logic code, and also may be used as information to be presented to the user.

When determined that the use condition bytecode execution unit 303 does not support the execution of the use condition determining logic code, the notification that the use is not permitted is presented as well as its reason (FIG. 24: Step S2405).

When determined that the use condition bytecode execution unit 303 supports the execution of the use condition determining logic code, the notification that the use is permitted is presented (FIG. 24: Step S2404).

The description has been given above of the method for determining in the use condition bytecode execution unit 303 whether or not operation of the use condition bytecode has been confirmed by the technology management organization, using the version number or the logic identifier, after signature verification is succeeded.

Next, the determination method that is different from the above is described. Prior to the detailed description, the FIG. 6B held by the use condition determining logic code storage unit 111 is described. Since D601 through D604 have already been described in FIG. 6A, descriptions of them are not repeated. The use function identifiers D605 are identifiers or an identifier list for identifying the resource or function required when the logic code D603 identified by the logic identifier D601 is executed on the terminal apparatus 300. For example, FIG. 6B indicates that when the logic identifier D601 is "LOGIC-ID-0002" the resource used by the logic code D603 is "Secure lock and non-volatile memory". The provider identifiers D606 are identifiers for identifying the SP that generated the corresponding logic codes D603. For example, it is shown that the logic code D603 of the logic identifier D601 "LOGIC-ID-0004" is generated by the SP that is indicated as "SP3" by the provider identifier D606. The data are recorded to the use condition determining logic code storage unit 111 when the license distribution server 100 requests the use condition management sever 400 to add the use condition determining logic code. The identifier of the SP which manages the license distribution server 100 is recorded in the provider identifier D606 in association with the added use condition determining logic code.

Next, the method is described for determining, using the use function identifier D605, whether or not the operation of the use condition bytecode has been guaranteed in the use condition bytecode execution unit 303.

The use condition verification unit 302 extracts the use function identifier D605 which corresponds to the logic identifier for identifying the use condition bytecode, and also obtains, from the use condition bytecode execution unit 303, a usable function identifier list that is a list of identifiers for identifying the resource or function that are usable.

The use condition verification unit 302 determines, from the use function identifier D605 and the usable function identifier list, whether or not the use condition bytecode execution unit 303 supports the use condition determining logic code corresponding to the logic identifier.

More particularly, when all the use function identifiers D605 are included in the usable function identifier list, the use condition verification unit 302 determines that the use condition bytecode execution unit 303 supports the execution of the use condition determining logic code. When at least one of the use function identifiers D605 is not included in the usable function identifier list, the use condition verification unit 302 determines that the use condition bytecode execution unit 303 does not support the execution of the use condition determining logic code. It has been described above that the use function identifier D605 is included in the license; however, the terminal apparatus 300 may hold the logic identifier, and a list of identifiers of the resource and function which are necessary for using the corresponding use condition determining logic code, and perform the above determination based on the list. For example, when the product lineup of the terminal apparatus 300 produced by a single manufacturer A includes different resources and functions, the determination with the use function identifier D605 is effective.

Next, the method is described for determining whether or not the operation of the use condition bytecode has been guaranteed in the use condition bytecode execution unit 303.

The use condition verification unit 302 extracts the provider identifier D606 corresponding to the logic identifier for identifying the use condition bytecode, and also obtains an operation guaranteed provider identifier list stored in the storage area (not shown) of the terminal apparatus 300.

The use condition verification unit 302 determines, from the provider identifier D606 and the operation guaranteed provider identifier list, whether or not the use condition bytecode execution unit 303 supports the use condition determining logic code corresponding to the logic identifier.

More particularly, when the provider identifier D606 is included in the operation guaranteed provider identifier list, the use condition verification unit 302 determines that the use condition bytecode execution unit 303 supports the execution of the use condition determining logic code. When the provider identifier D606 is not included in the operation guaranteed provider identifier list, the use condition verification unit 302 determines that the use condition bytecode execution unit 303 does not support the execution of the use condition determining logic code. For example, the determination with the provider identifier D606 is effective in the case where several tests have been performed between the terminal apparatus 300 produced by the manufacturer A and the license distribution server managed by the service provider AA that is one of the group businesses of the manufacturer A, and the reliability has been specially established between the two. Furthermore, the determination may be performed not only with the identification information described above, but also with information such as VM types and terminal manufacturer types. Further, it is preferable to include such information used for the determination in the target area of the digital signature in the use condition management server 400. If the information are not included in the target area of the digital signature, detection of tampering fails, and thus such a risk possibly arises that a use condition bytecode having effects similar to virus is executed.

Furthermore, it has been described above that the use is permitted only when it is determined in all of the determination methods that the use condition bytecode execution unit 303 supports the execution of the use condition determining logic code. However, the use may be permitted when it is determined in any one of the determination methods. For example, even though the execution of the use condition determining logic code is determined not to be supported by the use condition bytecode execution unit 303 in the determination with the version number, the use may be permitted when determined to be supported in the determination with the logic identifier. Furthermore, it has been described above that use permission is determined by performing several determination methods; however, the determination may be performed by one of the methods, or two or more determination methods may be combined for the determination with AND or OR condition.

The bytecode use permission determination processing has been described above.

Next, the respective units in the processing performed by the use condition management server 400 for adding the use condition determining logic code are described with reference to FIG.

The use condition management server 400 starts the use condition determining logic code addition processing according to the instruction for adding the use condition determining logic code from the server administrator or the license distribution server 100 (hereinafter referred to as "addition instructor" (FIG. 25: Step S2501). The addition instructor needs to input the use condition bytecode at least including the use condition determining logic code to the use condition bytecode input unit 402 of the use condition management server 400. In stead of inputting the use condition bytecode, the addition instructor may input the use condition determining logic code, or a requirement for the use condition such as "determination of playback permission for X days and Y nights is required". In this case, the processing of the use condition bytecode separation unit 403 is not necessary. Further, when the requirement for the use condition is inputted, it is necessary to convert the inputted requirement into the use condition determining logic code.

Figure 25:
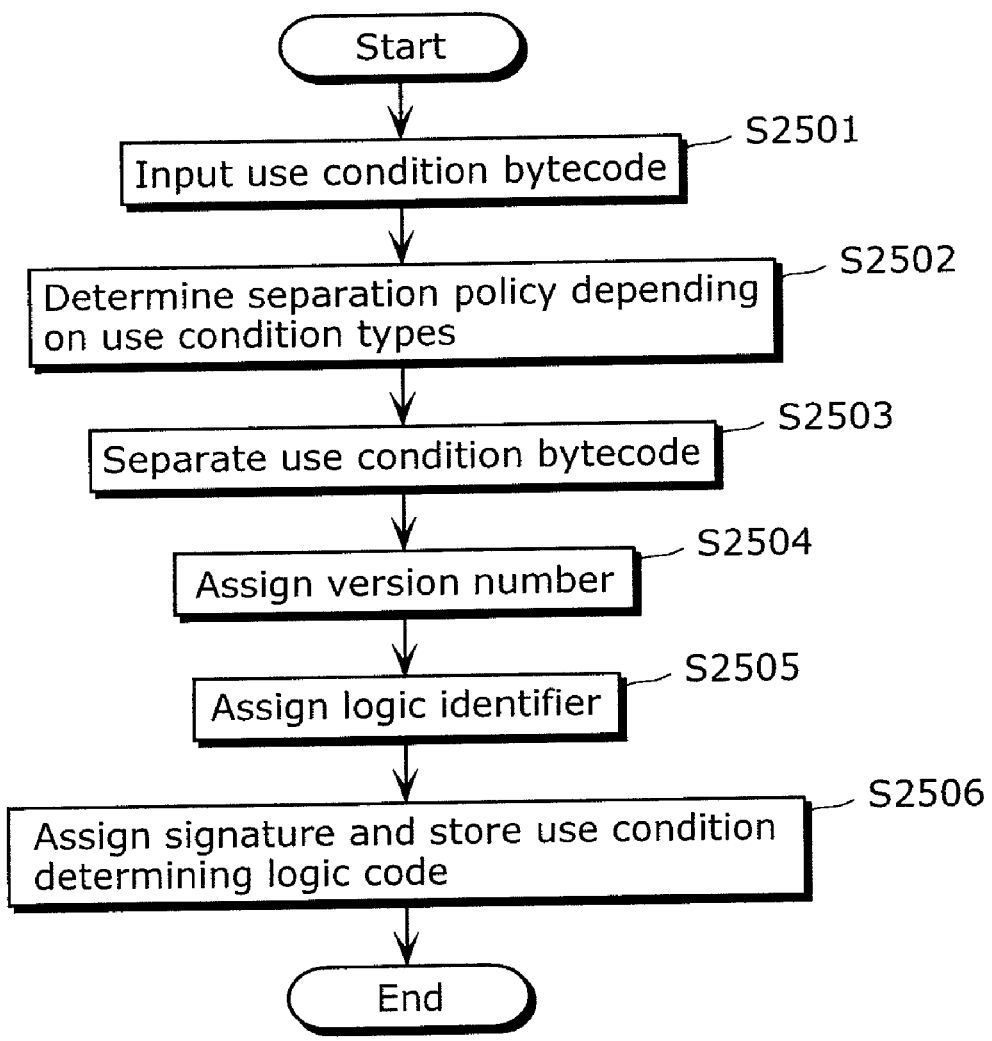
FIG. 25 is a flowchart showing processing performed by the use condition management server according to the embodiment 1 of the present invention for updating the use condition determining logic code.

Upon receiving the information inputted by the use condition bytecode input unit 402, the use condition bytecode separation unit 403 determines a separation policy of the use condition determining logic code and the use condition determining parameter according to the content of the inputted use condition bytecode, the relationship to the SP that manages the license distribution server 100 requesting the addition (FIG. 25: Step S2502). Then, the use condition bytecode separation unit 403 separates the use condition bytecode into the use condition determining logic code and the use condition determining parameter based on the separation policy (FIG. 25: Step S2503). More specifically, the boundaries of responsibilities between the SP and the technology management organization are clarified. In other words, the code within the responsibility boundary of the SP is separated into the use condition determining parameter, and the code within the responsibility boundary of the technology management organization is separated into the use condition determining logic code.

To be more specific, such a management is possible in that when reliability of the SP is extremely low, all data are included in the use condition determining logic code; whereas, when reliability of the SP is extremely high, all data are included in the use condition determining parameter. A description of the specific example for separating the use condition bytecode into the use condition determining logic code and the use condition determining parameter is omitted here, since it is the same as in the description for the use condition bytecode above.

The use condition determining logic code operation verification unit 406 confirms operation of the use condition determining logic code separated and extracted in the use condition bytecode separation unit 403, for example, by performing several tests. In the case where the operation of the use condition determining logic code cannot be confirmed, the processing is terminated.

The use condition determining logic code management information generation unit 405 obtains the version number which has the latest update date and time in the version number storage unit 412, adds values to the obtained version number, and generates a new version number (FIG. 25: Step S2504).

More particularly, the use condition determining logic code management information generation unit 405 assigns "3.0" as a new version number when the latest version number is "2.0". Furthermore, the value to be added may be changed according to the degree of differences of the existing use condition determining logic codes. For example, when there is a big change, such as the change of the use function, "1.0" is added. Whereas, when there is only a small difference, such as the change of the use condition determining parameter to be referred, and when it is determined that the change does not influence the operation in the terminal apparatus 300, "0.1" is added.

The use condition determining logic code management information generation unit 405 assigns a new logic identifier to the use condition determining logic code to be newly added (FIG. 25: Step S2505).

The use condition determining logic code management information generation unit 405 assigns a digital signature to data at least including the use condition determining logic code previously separated, the new version number and the new logic identifier, using the secret key stored in the storage area (not shown) of the use condition management server 400, and stores the data in the use condition determining logic code storage unit 411 (FIG. 25: Step S2506). More specifically, the digital signature is assigned to the data within the responsibility boundary of the technology management organization, using the secret key of the use condition management server 400 and the data is stored in the use condition determining logic code storage unit 411.

The processing performed by the use condition management server 400 for adding the use condition determining logic code have been described above.

It has been described above that the version number is unique in the content distribution system; however, the version number may be managed for each use condition determining logic code or each logic identifier. In this case, the version number is managed for each logic identifier, and the version number, of which the operation of the use condition determining logic code has been confirmed in the use condition determining logic code operation verification unit 406, is assigned, and the digital signature is assigned to the use condition determining logic code, the logic identifier and the version number.

Furthermore, other than the version number, a terminal manufacturer identifier and a VM identifier may also be associated so that the VM of which the operation has been confirmed can be identified. In this case, several control methods are possible such that each of the version number, terminal manufacturer identifier, and the VM identifier includes, or at least one of them includes the element for determining whether the operation has been confirmed.

Furthermore, the model has been described above in which the technology management organization assigns the signature to the use condition determining logic code certified by the technology management organization. However, it may be that a terminal apparatus manufacturer assigns a signature to the use condition determining logic code certified by the terminal apparatus manufacturer instead of the technology management organization, and the use condition bytecode is executed after the verification is performed in the terminal apparatus 300. In addition, it may be that the use condition determining logic code signed by the technology management organization and the use condition determining logic code signed by the terminal apparatus manufacturer coexist. In this case, the terminal apparatus 300 needs a public key of the technology management organization and a public key of the terminal apparatus manufacturer.

Alternatively, it may be that in the model where each terminal apparatus manufacturer assigns signature to a single use condition determining logic code, for example, the execution is performed when signature verification of the three or more manufacturers succeed.

Further, when use condition determining logic codes with signatures of several organizations coexist, the organization to which the priority for determination is given may be decided according to a unique rule of the terminal apparatus or the user's intention. Further, it may be that signature verification of different organization may be preferentially performed under certain conditions in the terminal apparatus in which the signature verification of the technology management organization is usually performed first. For example, the terminal apparatus 300 produced by the manufacturer A assigns the highest priority to perform the signature verification of the service provider AA that is one of the group businesses of the manufacturer A.

In addition, use permission determination may be performed with a combination of two or more use condition bytecodes.

In the case where several use condition bytecodes are used in a combination, the necessity of the combination may be determined according to the verification result by the signature verification or type of the target content, for example.

It has been described above that the terminal apparatus 300 executes the use condition determining logic code included in the license obtained from the license distribution server 100. Alternatively, it may be that the terminal apparatus 300 holds in advance the use condition determining logic code of which the operation has been confirmed, and, in the case where the terminal apparatus 300 holds in itself the use condition determining logic code which corresponds to the logic identifier included in the license, the terminal apparatus 300 executes the use condition determining logic code held in the terminal apparatus. Furthermore, it may be that when the use condition determining logic code with signature is received, the received use condition determining logic code is executed, and when there is no signature assigned, or the verification of the signature fails, the use condition determining logic code held in the terminal apparatus may be executed.

Furthermore, the use condition bytecode has been described above; however, a bytecode for different purposes may also be able to improve reliability of the bytecode by decomposing the bytecode according to the responsibility boundary and assigning a signature to the data within the responsibility boundary.

Furthermore, it has been described above that the logic identifier, the version number and the use condition determining logic code are considered as target elements of the signature among elements forming the use condition bytecode, and the use condition management server assigns the signature to the target elements of the signature. In the signature algorithm used by the use condition management server, when the use condition bytecode is structured in such a manner that the target part of the signature and non-target part of the signature cannot be divided, the use condition bytecode is typically coded as the content of a first XML element, and the use condition management server may assign an XML signature to the first XML element. In this case, it may be that the part corresponding to the target part of the signature, more specifically, a second XML element including, as the content, at least the use condition determining logic code among the logic identifier, version number and use condition determining logic code, is newly provided, and the signature is assigned to the second XML element. In this case, the terminal apparatus verifies the signature assigned to the second XML element, and also verifies the tampering of the data part corresponding to the content of the second XML element among the content of the first XML element.

Embodiment 2

The content distribution system according to the embodiment 2 of the present invention is described.

Figure 26:
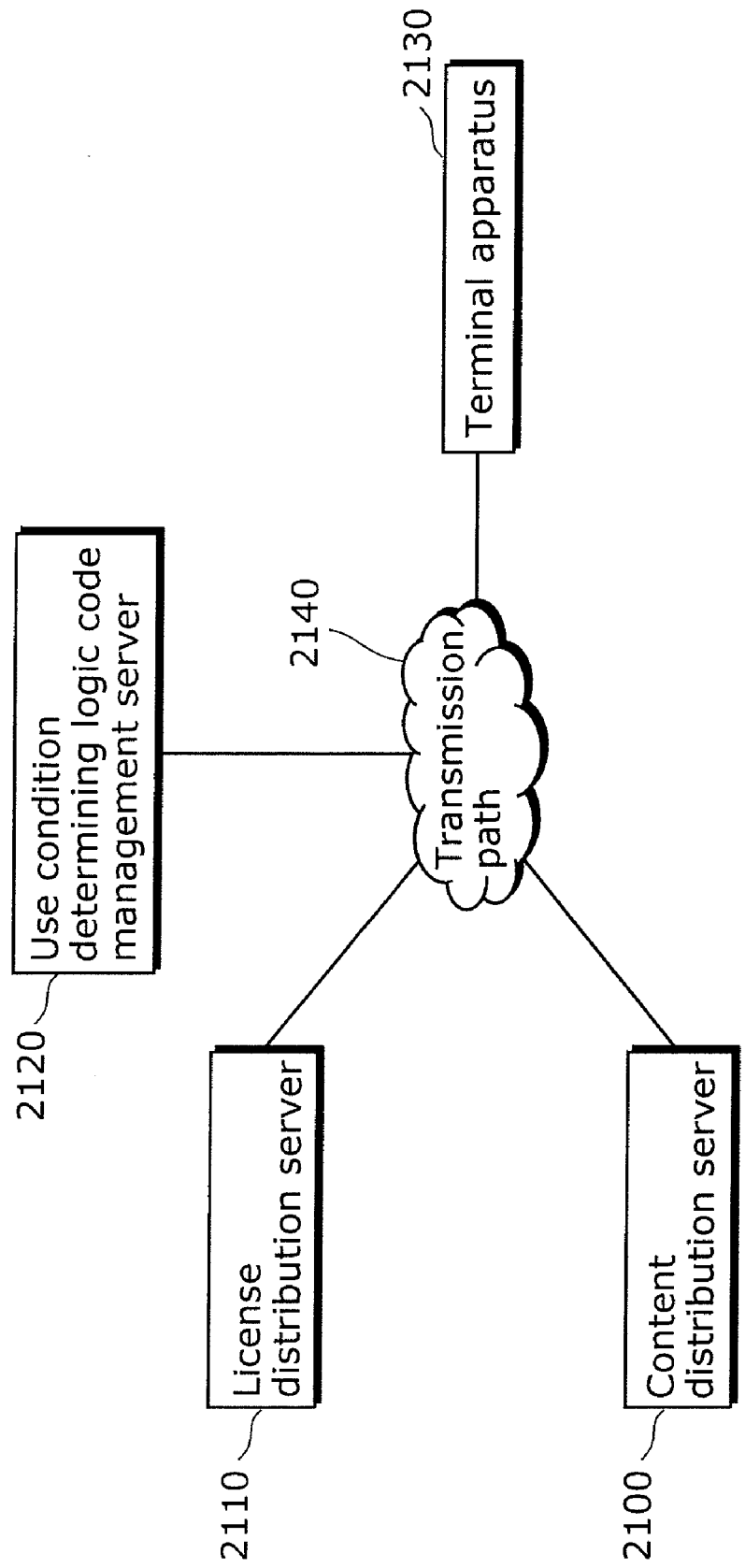
FIG. 26 is a block diagram showing a structure of a content distribution system according to the embodiment 2 of the present invention.

FIG. 26 is a diagram showing an overall structure of the content distribution system according to the embodiment 2 of the present invention.

In FIG. 26, the content distribution system includes a content distribution server 2100, a license distribution server 2110, a use condition determining logic code management sever 2120, several terminal apparatuses 2130 (only one of them is shown for simplification in FIG. 26) and a transmission path 2140. Hereinafter, each structural element of the content distribution system is described.

The content distribution server 2100 is a server which distributes encrypted content to the terminal apparatus 2130. The content is assigned with a content ID which can uniquely identify the content in the content distribution system, and distributed.

The license distribution server 2110 is a server which manages contract (usage right) of each user for the content, and distributes to the terminal apparatus 2130 the license 2500 which will be described later with reference to FIG. 30. When the license 2500 is distributed from the license distribution server 2110 to the terminal apparatus 2130, the distribution is made securely via a SAC. As SAC, a Secure Socket Layer (SSL) may be used, for example.

The use condition determining logic code management server 2120 is a server which generates and manages a use condition determining logic code management information 2200 which will be described later with reference to FIG. 27, for transmission to the license distribution server 2110 as necessary.

The terminal apparatus 2130 is an apparatus which is used by the user, and uses the content distributed from the content distribution server 2100, with the license 2500 distributed from the license distribution server 2110. Each terminal apparatus 2130 is assigned with an ID which can uniquely identify themselves in the content distribution system.

Examples of the transmission path 2140 include the Internet, Cable Television (CATV), wired transmission medium such as broadcast wave, wireless transmission medium and portable recording medium. The transmission path 2140 connects the content distribution server 2100, the license distribution server 2110, the use condition determining logic code management sever 2120, and the terminal apparatus 2130 to each other so that data can be exchanged between them.

In the present embodiment, the content distribution server 2100 and the license distribution server 2110 are managed by a service provider, and the use condition determining logic code management server 2120 is managed by a technology management organization that provides technical specification to the content distribution system. However, the present invention is not limited to this, of course.

The overall structure of the content distribution system has been described above.

Prior to the detailed description, information is defined which is used for determining whether use of the content is permitted in the terminal apparatus 2130 according to the present embodiment.

First, a use condition bytecode for performing use permission determination in the terminal apparatus 2130 is described. The use condition bytecode is a program which operates in the terminal apparatus 2130, and at least includes a logic for determining use permission and a parameter to be referred by the logic. More particularly, the use condition bytecode includes a logic indicating "If current time<parameter, use is permitted", and a parameter indicating "Aug. 8, 2007", and is a program for performing use permission determination such as "if current time is earlier than Aug. 8, 2007, use is permitted, and if not, use is not permitted".

In the present embodiment, a program and data indicating the logic are referred to as "use condition determining logic code", and a program and data indicating the parameter are referred to as "use condition determining parameter". More particularly, examples of the use condition determining logic code other than the above include "if current number of uses<parameter, use is permitted", "if time of first use+parameter<current time, use is permitted" and "if Jul. 7, 2007<current time<parameter, use is permitted". Furthermore, examples of the use condition determining parameter other than the above include "10 times" "2 days" and "license obtaining time+3 days". As described in the specific examples, it may be that the use condition determining logic code includes numeric data such as "Jul. 7, 2007", or the use condition determining parameter includes a calculation program such as "license obtaining time+".

The use condition bytecode has been described above.

Next, the use condition determining logic code management information 2200 is described with reference to FIG. 27. The use condition determining logic code management information 2200 is information including logic code IDs 2201, profiles 2202, versions 2203, use condition determining logic codes 2204 and operation verification status information 2205.

The logic code ID 2201 is an ID for uniquely identifying the use condition determining logic code 2204. The profile 2202 is information indicating the profile of the use condition determining logic code 2204. For example, the profile 2202 may set types of use conditions such as "valid period determination" and "number of uses determination" and types of services such as "for subscription" and "for rent". The version 2203 is information indicating the version of the use condition determining logic code 2204. The use condition determining logic code 2204 is a use condition determining logic code included in the use condition bytecode. The operation verification status information 2205 is information indicating the status of the operation verification of the use condition determining logic code 2204 in each terminal apparatus 2130. In the present embodiment, the operation verification status information 2205 is information which lists the terminal ID of the terminal apparatuses 2130 of which the operation has not been confirmed, among the terminal apparatuses 2130 which have already been shipped.

FIG. 27 indicates, for example, that when the logic code ID 2201 is "0002", its use condition determining logic code 2204 is "current time and date<time of first use+parameter", its profile 2202 is "valid period", its version 2203 is "2.0", and the ID of the terminal apparatus 2130, of which the operation has not been confirmed, described in the operation verification status information 2205 is "00010000".

The use condition determining logic code management information 2200 is generated and managed by the use condition determining logic code management server 2120, as described in the following.

The use condition determining logic code management server 2120 generates the use condition determining logic code 2204. Then the use condition determining logic code management server 2120 assigns the logic code ID2201, the profile 2202 and the version 2203 to the generated use condition determining logic code 2204, and also records such information on the use condition determining logic code management information 2200. Furthermore, the use condition determining logic code management server 2120 provides such information to the manufacturer of the terminal apparatus 2130.

The manufacturer of the terminal apparatus 2130 verifies the operation of the use condition determining logic code 2204 in the terminal apparatus 2130, and notifies the use condition determining logic code management server 2120 of the completion status accordingly.

The use condition determining logic code management server 2120 generates and updates the operation verification status information 2205 based on the information notified by the manufacturer of the terminal apparatus 2130, and records it to the use condition determining logic code management information 2200.

The use condition determining logic code management information 2200 has been described above.

Figure 28:
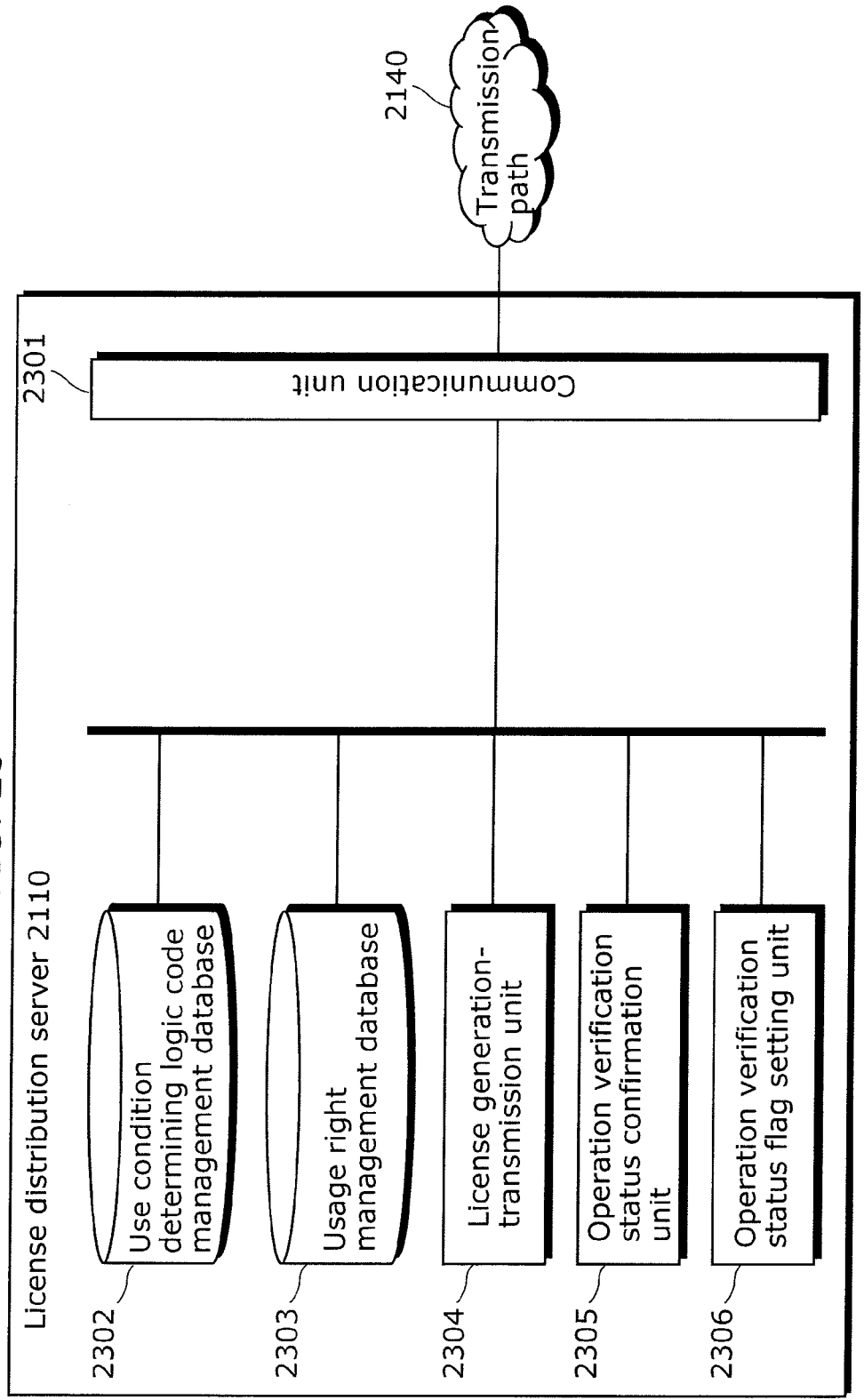
FIG. 28 is a block diagram showing a structure of a license distribution server according to the embodiment 2 of the present invention.

Next, the overall structure of the license distribution server 2110 is described with reference to FIG. 28. In FIG. 28, the license distribution server 2110 includes a communication unit 2301, a use condition determining logic code management database 2302, a usage right management database 2303, a license generation-transmission unit 2304, an operation verification status confirmation unit 2305, and an operation verification status flag setting unit 2306. Hereinafter, each structural element is described.

The communication unit 2301 is a processing unit which communicates with the use condition determining logic code management server 2120 and the terminal apparatus 2130 via the transmission path 2140.

The use condition determining logic code management database 2302 is a database for managing the use condition determining logic code management information 2200. The use condition determining logic code management database 2302 accesses to the use condition determining logic code management server 2120 whenever necessary, and updates the use condition determining logic code management information 2200.

The usage right management database 2303 is a database for managing the usage right of the content purchased by the user. FIG. 29 shows an example. In FIG. 29, the usage right management database 2303 includes terminal IDs 2401, usage right IDs 2402, logic codes ID2403, use condition parameters 2404, and content keys 2405.

In the terminal ID2401, the ID of the terminal apparatus 2130 owned by each user is described. In the usage right ID2402, the ID of the usage right purchased by each user is described. In the logic code ID 2403, the ID of the use condition determining logic code 2204 used in the usage right identified by the usage right ID2402 is described. In the use condition parameter 2404, the use condition parameter used in the usage right identified by the usage right ID2402 is described. In the content key 2405, the key for decrypting the content that can be used with the usage right identified by the usage right ID 2042 is described.

FIG. 29 indicates, for example, that the user of the terminal apparatus 2130 having the terminal ID2401 "00010002" has purchased the usage right having the usage right ID2402 "0021". It is also indicated that the logic cod ID2403 of the use condition determining logic code used in the usage right is "0003", the use condition parameter 2404 is "1 time" and the decryption key for the content to be used with the usage right is "333333".

Now returning to the description of FIG. 28, the license generation-transmission unit 2304 is a processing unit which generates the license 2500 which will be described with reference to FIG. 30, in response to a request from the terminal apparatus 2130, and transmits the generated license 2500 to the user terminal apparatus 2130.

Here, the license 2500 generated and transmitted by the license generation-transmission unit 2304 is described.

Figure 30:
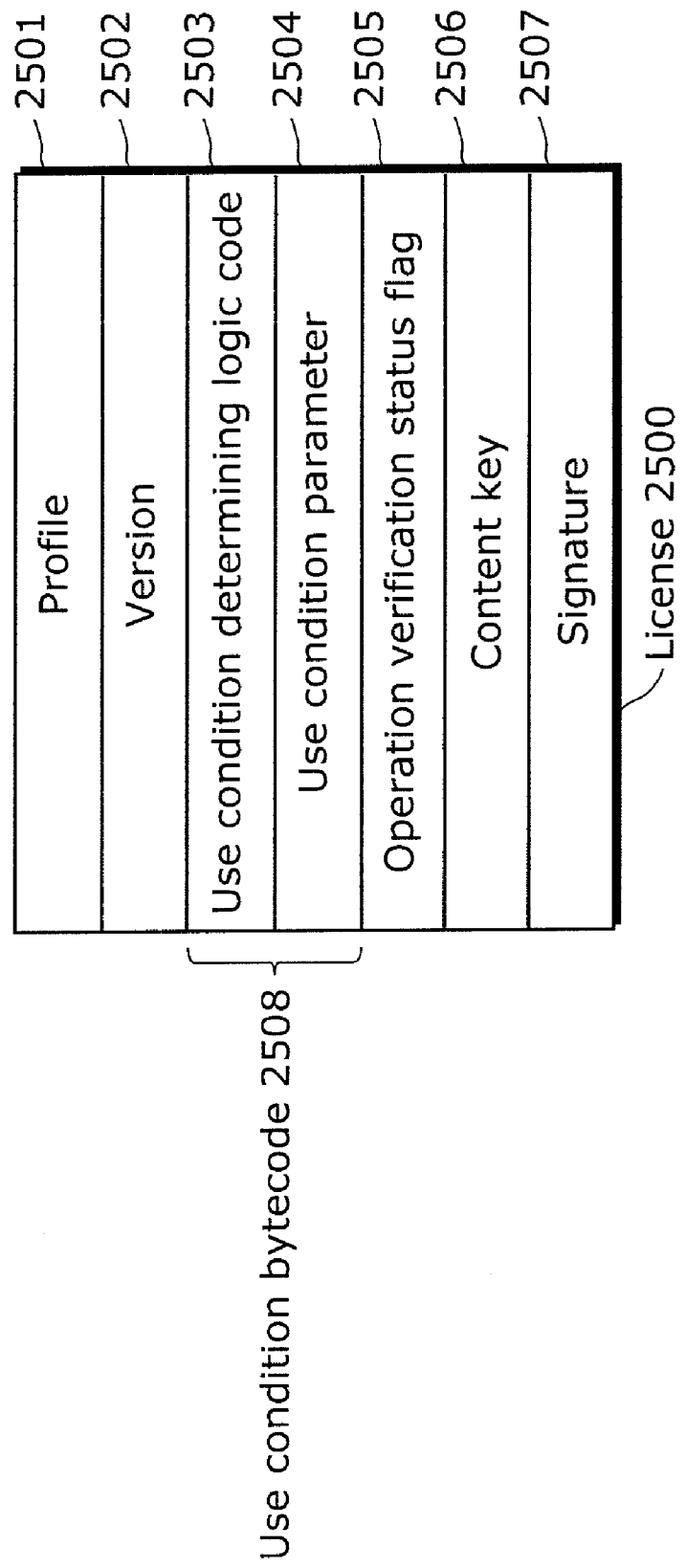
FIG. 30 is a diagram showing an example of a license according to the embodiment 2 of the present invention.

As shown in FIG. 30, the license 2500 is data including a profile 2501, a version 2502, a use condition bytecode having a use condition determining logic code 2503 and a use condition parameter 2504, an operation verification status flag 2505, a content key 2506 and a signature 2507.

In the profile 2501 and the version 2502, the profile and the version assigned to the use condition determining logic code 2503 included in the license 2500 is described. In the use condition bytecode 2508, the use condition bytecode executed for determining whether or not use of the license 2500 is permitted is described. In the operation verification status flag 2505, information is described which indicates whether or not the operation of the use condition determining logic code 2503 in the terminal apparatus 2130 has been verified. In the content key 2506, the decryption key for the content to be used with the license 2500 is described. In the signature 2507, signature data of the service provider provided for data containing the profile 2501, the version 2502, the use condition determining logic code 2503, the use condition parameter 2504, the operation verification status flag 2505 and the content key 2506 is described.

In generating the license 2500, the license generation-transmission unit 2304 sets the values of the profile 2501, the version 2502, the use condition bytecode 2508, the content key 2506, and the signature 2507; on the other hand, the operation verification status flag setting unit 2306, which will be described later, sets the values of the operation verification status flag 2505.

Now returning to the description of FIG. 28, the operation verification status confirmation unit 2305 is a processing unit which determines whether or not the operation of the use condition determining logic code 2503 included in the license 2500 has been verified in the terminal apparatus 2130 requesting the license 2500.

The operation verification status flag setting unit 2306 is a processing unit which sets the values to the operation verification status flag 2505 of the license 2500 based on the determination result of the operation verification status confirmation unit 2305.

The overall structure of the license distribution server 2110 in the present embodiment has been described above.

Next, the overall structure of the terminal apparatus 2130 is described with reference to FIG. 31. The terminal apparatus 2130 includes a communication unit 2601, a content obtainment unit 2602, a license obtainment unit 2603, a use condition bytecode execution permission determination unit 2604, a use condition bytecode execution unit 2605, a license use permission determination unit 2606, a content use unit 2607, an operation verified profile-version information management unit 2608, a license management unit 2609, and a content management unit 2610. Hereinafter, each structural element is described.

The communication unit 2601 is a processing unit which communicates with the license distribution server 2110 and other terminal apparatuses 2130 via the transmission path 2140.

The content obtainment unit 2602 is a processing unit which obtains the content from the content distribution server 2100 and accumulates the obtained content in the content management unit 2610.

The license obtainment unit 2603 is a processing unit which obtains the license 2500 from the license distribution server 2110 and accumulates the obtained license 2500 in the license management unit 2609. The license obtainment unit 2603 transmits to the license distribution server 2110 a license request message 2700 shown in FIG. 32, and obtains the license 2500 by receiving, as a response, a license request response message 2800 shown in FIG. 33.

Here, the license request message 2700 and the license request response message 2800 are described.

Figure 32:
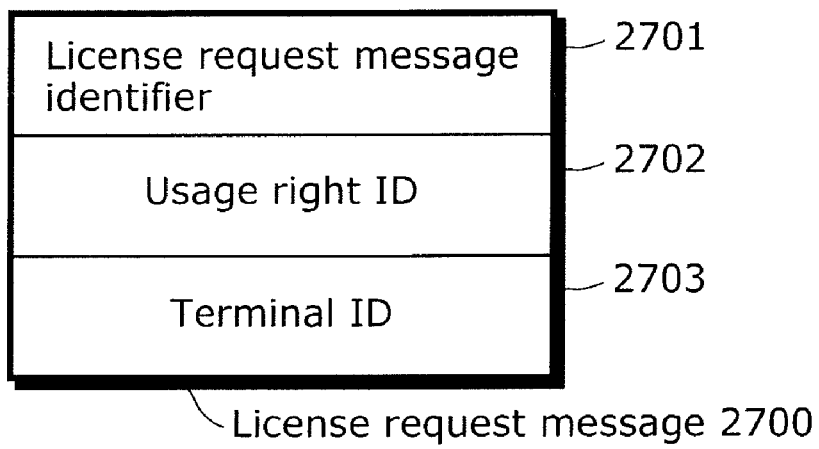
FIG. 32 is a diagram showing a structure of a license request message according to the embodiment 2 of the present invention.

In FIG. 32, the license request message 2700 includes a license request message identifier 2701, a usage right ID 2702, and a terminal ID 2703. In the license request message identifier 2701, information indicating that the data is the license request message 2700 is described. In the usage right ID 2702, the ID of the usage right that is a basis for issuing the license 2500 to be request is described. In the terminal ID 2703, the ID of the terminal apparatus 2130 requesting the license 2500 is described.

Figure 33:
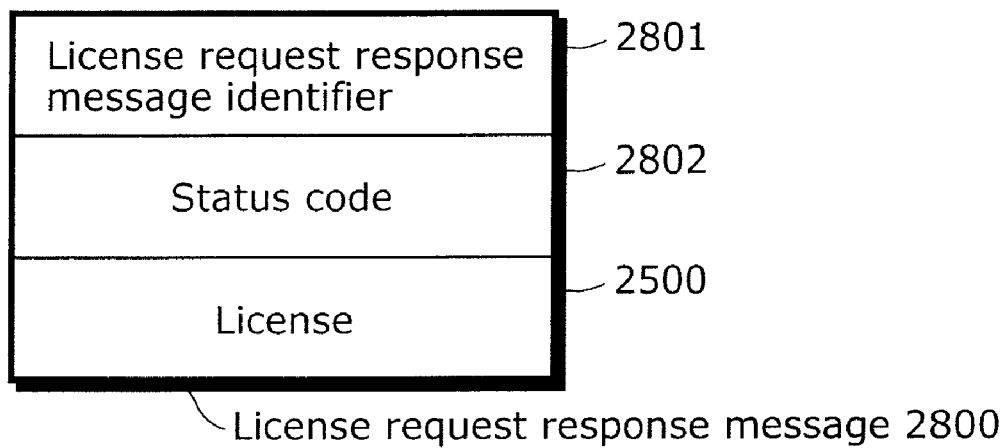
FIG. 33 is a diagram showing a structure of a license request response message according to the embodiment 2 of the present invention.

In FIG. 33, the license request response message 2800 includes a license request response message identifier 2801, a status code 2802, and a license 2500. In the license request response message identifier 2801, information is described which indicates that the data is the license request response message 2800 is described. In the status code 2802, information is described which indicates whether or not the license 2500 requested to be issued has been successfully issued. In the license 2500, the license 2500 of which the issuance is requested is described.

Figure 31:
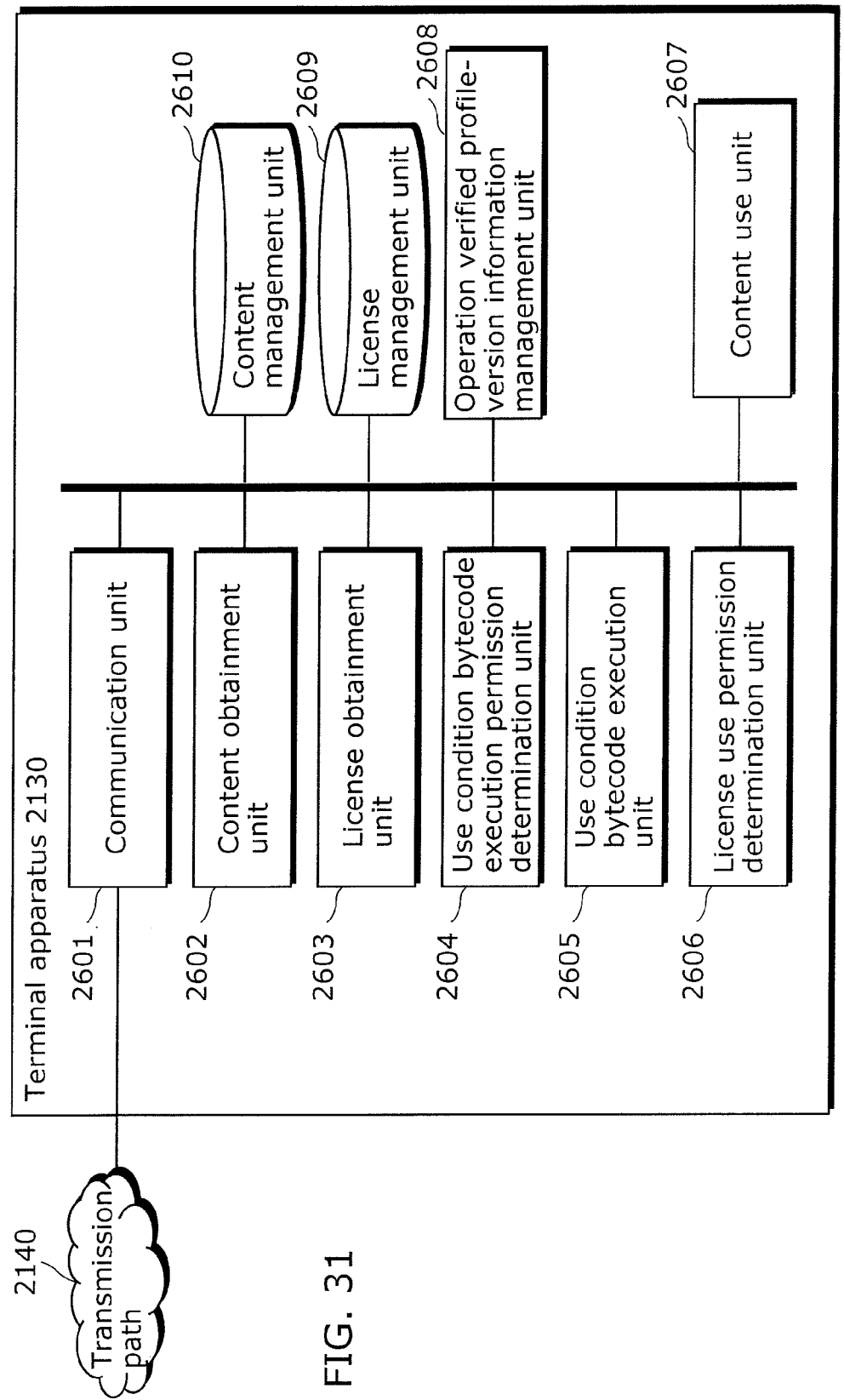
FIG. 31 is a block diagram showing a structure of a terminal apparatus according to the embodiment 2 of the present invention.

Returning to the description of FIG. 31, the use condition bytecode execution permission determination unit 2604 is a processing unit which determines whether or not the use condition bytecode 2508 included in the license 2500 is executable. The use condition bytecode execution permission determination unit 2604 confirms, based on the operation verification status flag 2505 and the operation verified profile-version information managed in the operation verified profile-version information management unit 2608 which will be described later, whether or not the operation of the use condition determining logic code 2503 included in the use condition bytecode 2508 has been verified in the terminal apparatus 2130. When the operation has been verified, the use condition bytecode execution permission determination unit 2604 determines that the execution is permitted.

The use condition bytecode execution unit 2605 is a processing unit which executes the use condition bytecode 2508 included in the license 2500.

The license use permission determination unit 2606 is a processing unit which determines whether or not use of the license 2500 is permitted. When the use condition bytecode execution unit 2605 executes the use condition bytecode 2508 and the result indicates "OK", the license use permission determination unit 2606 determines that the use of the license 2500 is permitted.

The content use unit 2607 is a processing unit which uses the content, playbacks the content and writes the content on a recording media.

The operation verified profile-version information management unit 2608 manages operation verified profile-version information that is information indicating the profile and version of the use condition determining logic code of which the operation has been verified in the terminal apparatus 2130. The operation verified profile-version information is recorded at the time of shipment of the terminal apparatus 2130. As for the terminal apparatus 2130 having a software update function, the operation verified profile-version information is also updated according to the update of the software.

The license management unit 2609 is a processing unit which accumulates and manages the license 2500 obtained by the license obtainment unit 2603.

The content management unit 2610 is a processing unit which accumulates and manages the content obtained by the content obtainment unit 2602.

The overall structure of the terminal apparatus 2130 in the present embodiment have been described above.

Next, the operations of the content distribution system according to the present embodiment are described with reference to flowcharts.

Figure 34:
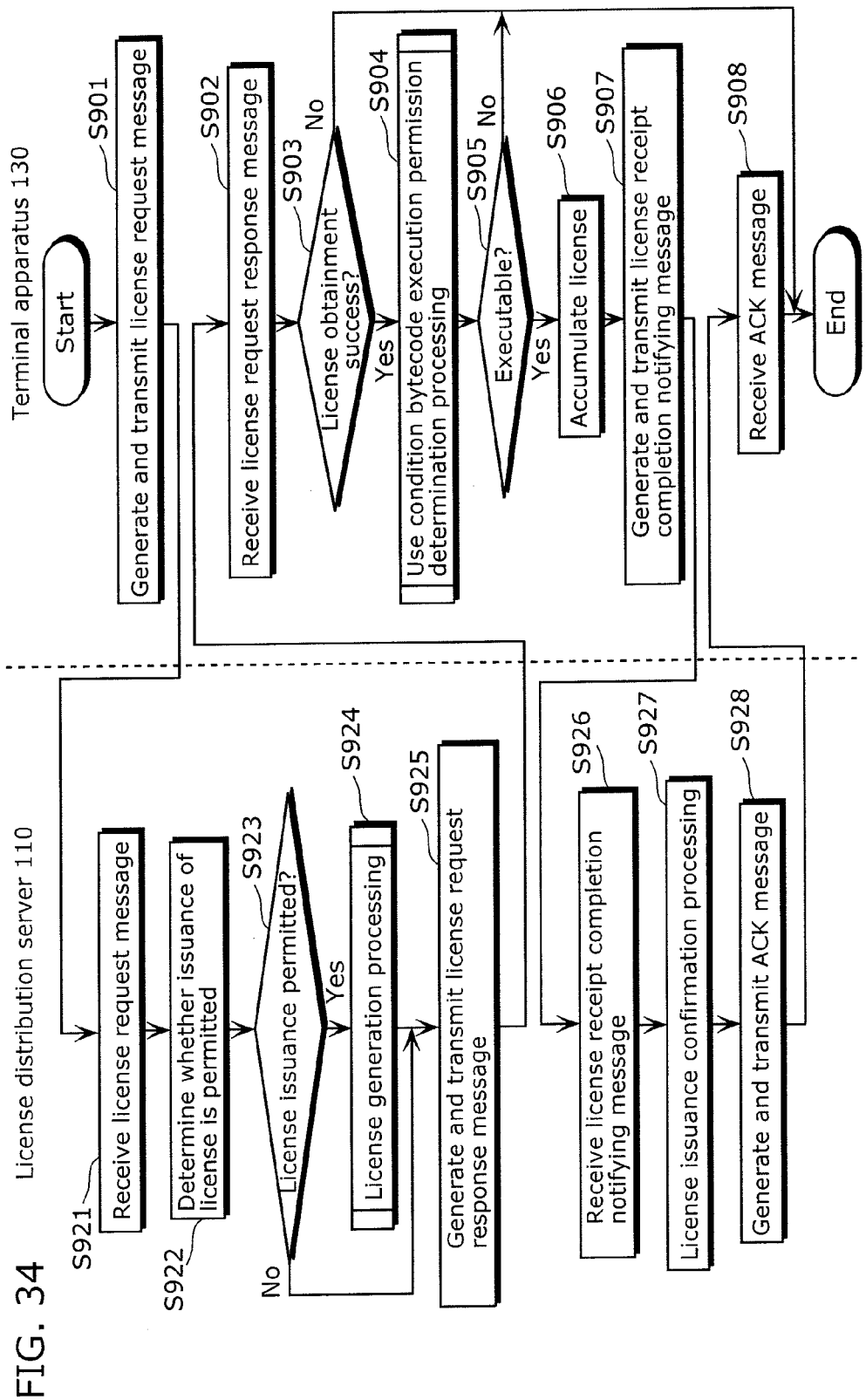
FIG. 34 is a flowchart showing operations of license obtainment processing according to the embodiment 2 of the present invention.

First, the operations of the license obtainment processing performed by the terminal apparatus 2130 for obtaining the license 2500 from the license distribution server 2110 are described with reference to the flowchart shown in FIG. 34.

S901: the license obtainment unit 2603 starts the license obtainment processing according to the instruction from the user to obtain the license. The user inputs, to an application of the terminal apparatus 2130, information identifying the ID of the usage right which is a basis for generating the license 2500 to be obtained. Here, the input from the user is performed based on the data obtained by the terminal apparatus 2130 at the time of purchase of the usage right, for example. Examples of the data include data having the content ID and the usage right ID.

After the license obtainment processing has started, the license obtainment unit 2603 generates a license request message 2700 for transmission to the license distribution server 2110. Here, the license obtainment unit 2603 sets, to the usage right ID 2702 of the license request message 2700, a value based on the information identifying the ID of the usage right inputted from the user, and sets the ID of the terminal apparatus 2130 to the terminal ID 2703.

S921: The license generation-transmission unit 2304 receives the license request message 2700.

S922: The license generation-transmission unit 2304 determines whether or not issuance of the license 2500 is permitted by referring to the usage right management database 2303 and confirming whether or not the usage right to be a basis for issuing the license 2500 has been recorded.

More particularly, the license generation-transmission unit 2304 refers to the usage right management database 2303, and confirms whether or not the ID identical with the ID that is set to the terminal ID2703 and included in the license request message 2700 has been recorded as the terminal ID2401. When recorded, the license generation-transmission unit 2304 further confirms the ID identical with the ID that is set to the usage right ID 2702 has been recorded, as the usage right ID 2402, in association with the terminal ID 2401. When recorded, the usage right having the ID is identified as a usage right to be a basis for issuing the license, and also it is determined that the issuance of the license is permitted.

S923: As a result of the determination in S922, when the issuance of the license has been determined to be permitted, the processing is continued at S924. As a result of the determination in S922, when the issuance of the license has been determined to be not permitted, the processing is continued at S925.

Figure 35:
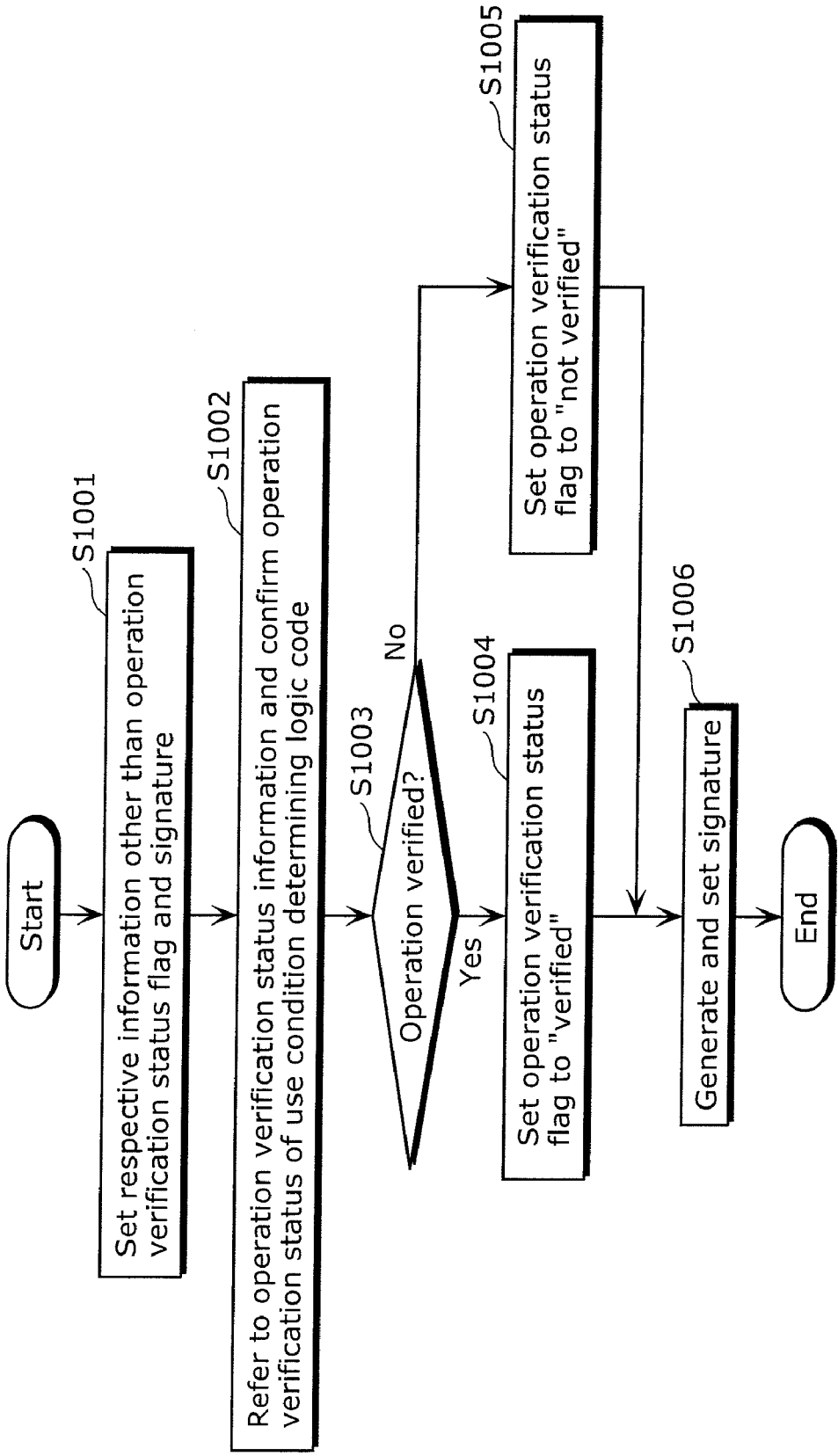
FIG. 35 is a flowchart showing operations of license generation processing according to the embodiment 2 of the present invention.

S924: The license generation processing which will be described later with reference to FIG. 35 is executed for generating the license 2500.

S925: The license generation-transmission unit 2304 generates the license request response message 2800 for transmission to the terminal apparatus 2130. In generating the license request response message 2800, the license generation-transmission unit 2304 sets the status code 2802 (the license 2500 is not set) to "failure" when the issuance of the license has been determined as not permitted in S923. When issuance of the license has been determined to be permitted in S923, the license generation-transmission unit 2304 sets the status code 2802 to "success", and sets the license 2500 generated in S924 to the license 2500.

S902: The license obtainment unit 2603 receives the license request response message 2800.

S903: The license obtainment unit 2603 refers to the status code 2802 of the license request response message 2800, and determines whether or not obtainment of the license has been succeeded. When obtainment of the license has been succeeded, the processing is continued at S904. When obtainment of the license has been failed, the user is notified of the failure via, for example, a display (not shown) and the processing is terminated.

S904: The use condition bytecode execution permission determination unit 2604 executes the use condition bytecode execution permission determination processing, which will be described later with reference to FIG. 36, and determines whether or not the use condition bytecode 2508 included in the license 2500 is executable.

S905: When determined to be "executable" in S904, the processing is continued at S906. When determined to be "not executable" in S904, it is notified to the user via, for example, a display (not shown) and the processing is terminated.

S906: The license obtainment unit 2603 accumulates, in the license management unit 2609, the obtained license 2500 in association with the content ID of the content to be used with the license 2500.

S907: The license obtainment unit 2603 generates a license receipt completion notifying message for notifying that the license 2500 has been received, and transmits the generated message to the license distribution server 2110.

S926: The license generation-transmission unit 2304 receives the license receipt completion notifying message.

S927: The license generation-transmission unit 2304 performs the license issuance confirmation processing. Examples of the processing include the processing in which "1" is added to the number of issuance of the license 2500.

S928: The license generation-transmission unit 2304 generates an ACK message for transmission to the terminal apparatus 2130.

S908: The license obtainment unit 2603 receives the ACK message.

It has been described above that the license receipt completion notifying message is generated and transmitted in S907 when determined to be "executable" in S904. However, it may be that when determined to be "not executable" in S904, a message notifying cancellation of the license obtainment may be transmitted to the license distribution server 2110.

Further, it may be that after the transmission of the license receipt completion notifying message in S907 and when the ACK message is not received as a response, re-transmission is successively performed. Alternatively, it may be that the processing is terminated once, and information for allowing the processing to be resumed at a later date is stored for re-transmission.

The operations for the license obtainment processing according to the present embodiment have been described.

Next, the operations for the license generation processing (details of S924 in FIG. 34) according to the present embodiment are described with reference to the flowchart shown in FIG. 35.

S1001: The license generation-transmission unit 2304 sets respective information other than the operation verification status flag 2505 and the signature 2507 to the license 2500 to be generated.

More particularly, the license generation-transmission unit 2304 first refers to the usage right management database 2303, and confirms the logic code ID2403 of the usage right to be a basis for issuing the license 2500. Next, the license generation-transmission unit 2304 refers to the use condition determining logic code management database 2302, and identifies the use condition determining logic code 2204, having the logic code ID2201 identical with the logic code ID2403, as being set to the license 2500. The license generation-transmission unit 2304 sets the profile 2202 and the version 2203 of the identified use condition determining logic code 2204 to the profile 2501 and the version 2502 of the license respectively, and sets the identified use condition determining logic code 2204 to the use condition determining logic code 2503. Furthermore, the license generation-transmission unit 2304 sets, to the use condition parameter 2504 and the content key 2506 of the license 2500, the use condition parameter 2404 and the content key 2405 of the usage right to be a basis for issuing the license 2500 respectively.

S1002: The operation verification status confirmation unit 2305 refers to the use condition determining logic code management database 2302 and determines whether or not the operation of the use condition determining logic code 2204 has been confirmed in the terminal apparatus 2130 identified by the terminal ID2703 included in the license request message 2700.

More particularly, the operation verification status confirmation unit 2305 refers to the operation verification status information 2205 of the use condition determining logic code 2204 identified as being set to the license 2500 in S1001. Then the operation verification status confirmation unit 2305 determines whether or not the ID identical with the ID set to the terminal ID 2703 included in the license request message 2700 is described as the ID of the terminal apparatus 21130 of which the operation has not been verified. Here, when described as the ID of the terminal apparatus 2130 of which the operation has not been verified, it is determined that the operation has not been verified, and when not described, it is determined that the operation has been verified.

S1003: When determined to be "not verified" in S1002, the processing is continued at S1005. When determined to be "verified" in S1002, the processing is continues at S1004.

S1004: The operation verification status flag setting unit 2306 sets the operation verification status flag 2505 to "verified".

S1005: The operation verification status flag setting unit 2306 sets the operation verification status flag 2505 to "not verified".

S1006: The license generation-transmission unit 2304 generates, using the secret key of the service provider, signature data for data containing the profile 2501, the version 2502, the use condition determining logic code 2503, the use condition parameter 2504, the operation verification status flag 2505 and the content key 2506, and then sets the generated signature data to the signature 2507 of the license 2500.

The operations of the license generation processing according to the present embodiment has been described above.

Figure 36:
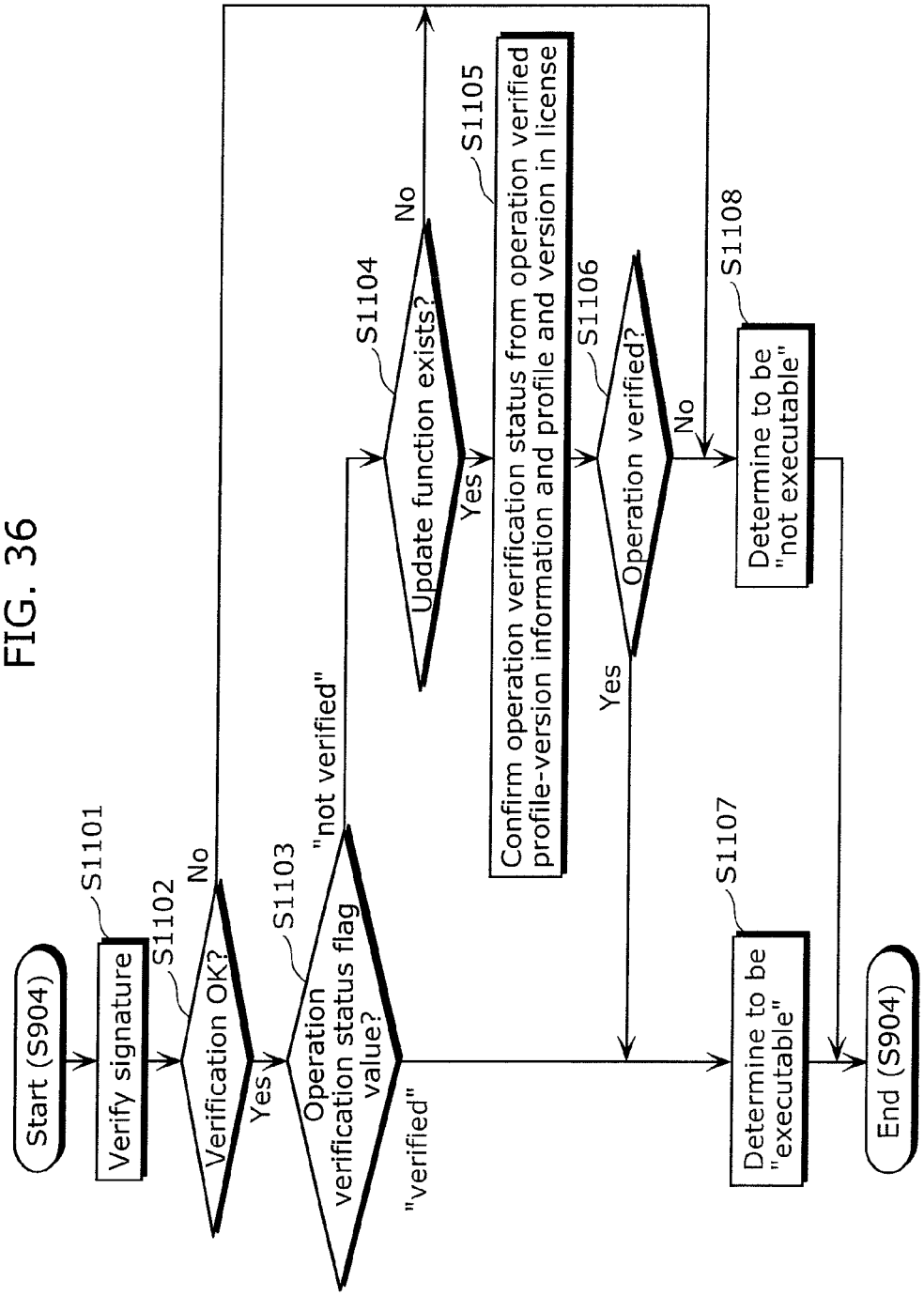
FIG. 36 is a flowchart showing operations of use condition bytecode execution permission processing according to the embodiment 2 of the present invention.

Next, the operations of the use condition bytecode execution permission determination processing (details of S904 in FIG. 34) according to the present embodiment are described with reference to the flowchart shown in FIG. 36.

S1101: The use condition bytecode execution permission determination unit 2604 verifies the signature 2507 of the license 2500 using the public key of the service provider recorded in the storage area (not shown).

S1102: When the result of the signature verification indicates "OK" in S1101, the processing is continued at S1103. When the result of the signature verification in S1101 indicates "NG", the processing is continued at S1108.

S1103: The use condition bytecode execution permission determination unit 2604 confirms the value of the operation verification status flag 2505 of the license 2500. When the value of the operation verification status flag 2505 indicates "verified", the processing is continued at S1107. When the value of the operation verification status flag 2505 indicates "not verified", the processing is continued at S1104.

S1104: When the terminal apparatus 2130 includes a function to upgrade software, the processing is continued at S1105. When the terminal apparatus 2130 does not include the function to upgrade software, the processing is continued at S1108.

S1105: The use condition bytecode execution permission determination unit 2604 refers to the operation verified profile-version information managed by the operation verified profile-version information management unit 2608, and confirms whether or not the profile 2501 and the version 2502 included in the license 2500 are the profile and version of the use condition determining logic code of which the operation has been verified in the terminal apparatus 2130.

S1106: When determined to be "verified profile and version" in S1105, the processing is continued at S1107. When determined to be "not verified profile and version" in S1105, the processing is continued at S1108.

S1107: The use condition bytecode execution permission determination unit 2604 determines that the use condition bytecode 2508 included in the license is "executable".

S1108: The use condition bytecode execution permission determination unit 2604 determines that the use condition bytecode 2508 included in the license 2500 is "not executable".

The operations of the use condition bytecode execution permission processing according to the present embodiment have been described above.

Figure 37:
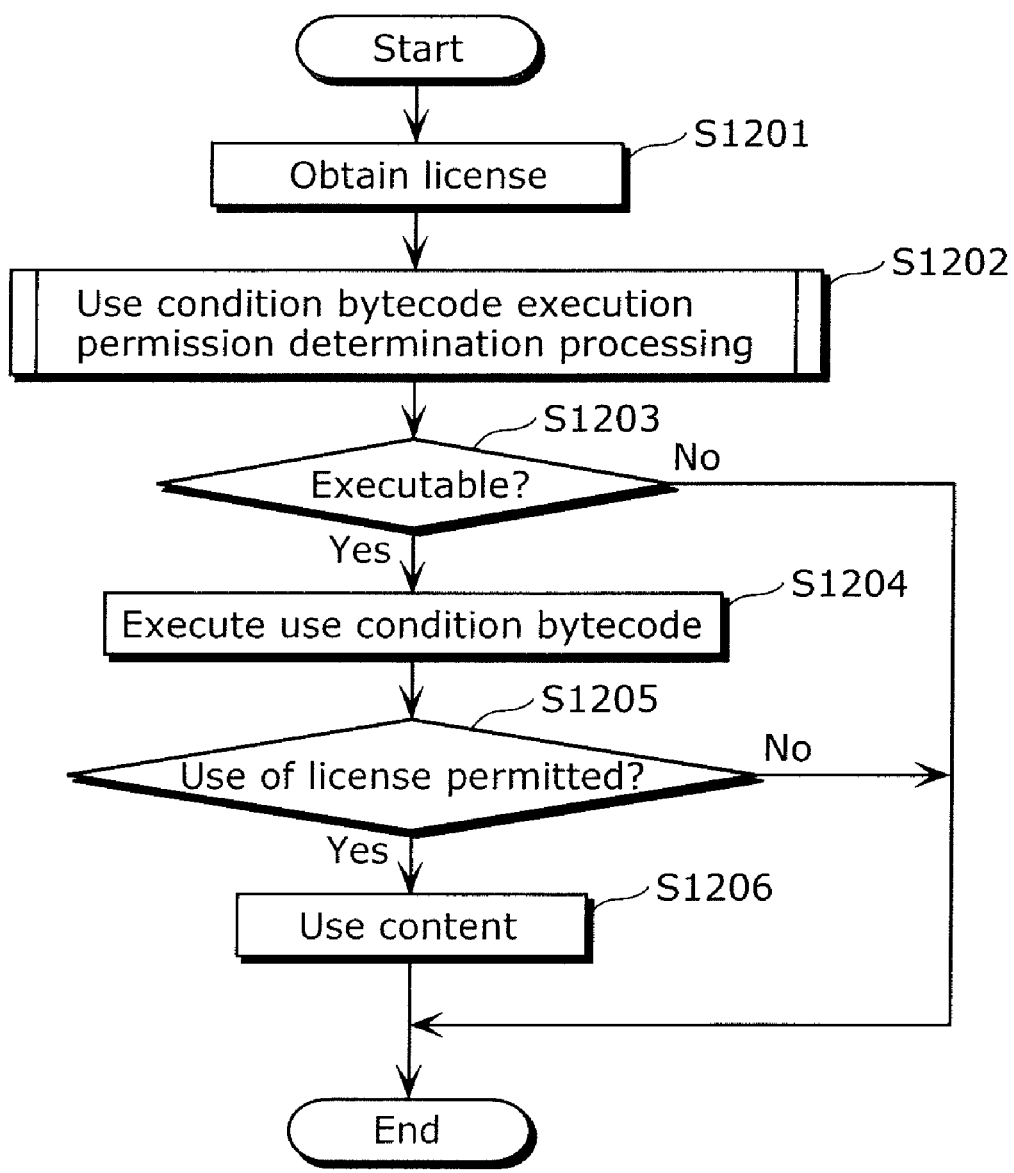
FIG. 37 is a flowchart showing operations of content use processing according to the embodiment 2 of the present invention.

Next, the operations of the content use processing in which the terminal apparatus 2130 uses the content are described with reference to the flowchart shown in FIG. 37.

S1201: The license use permission determination unit 2606 obtains, from the license management unit 2609, the license 2500 stored in association with the content ID of the content that the user has desired to use.

S1202: The use condition bytecode execution permission determination unit 2604 executes the use condition bytecode execution permission processing.

S1203: When determined to be "executable" in S1202, the processing is continued at S1204. When determined to be "not executable" in S1202, it is notified to the user via, for example, a display (not shown), and the processing is terminated.

S1204: The use condition bytecode execution unit 2605 executes the use condition bytecode 2508.

S1205: The license use permission determination unit 2606 determines that "use of the license is permitted" when the execution result in S1204 indicates "OK", and the processing is continued at S1206. The license use permission determination unit 2606 determines that "use of the license is not permitted" when the execution result in S1204 indicates "NG", and it is notifies to the user via, for example, a display (not shown), and terminates the processing.

S1206: The content use unit 2607 obtains the content that the user has desired to use from the content management unit 2610 and decrypts the obtained content with the content key 2506 of the license 2500 for using the content.

The operations of the content use processing according to the present embodiment have been described above.

The operations of the content distribution system according to the present embodiment have been described above.

Figure 38:
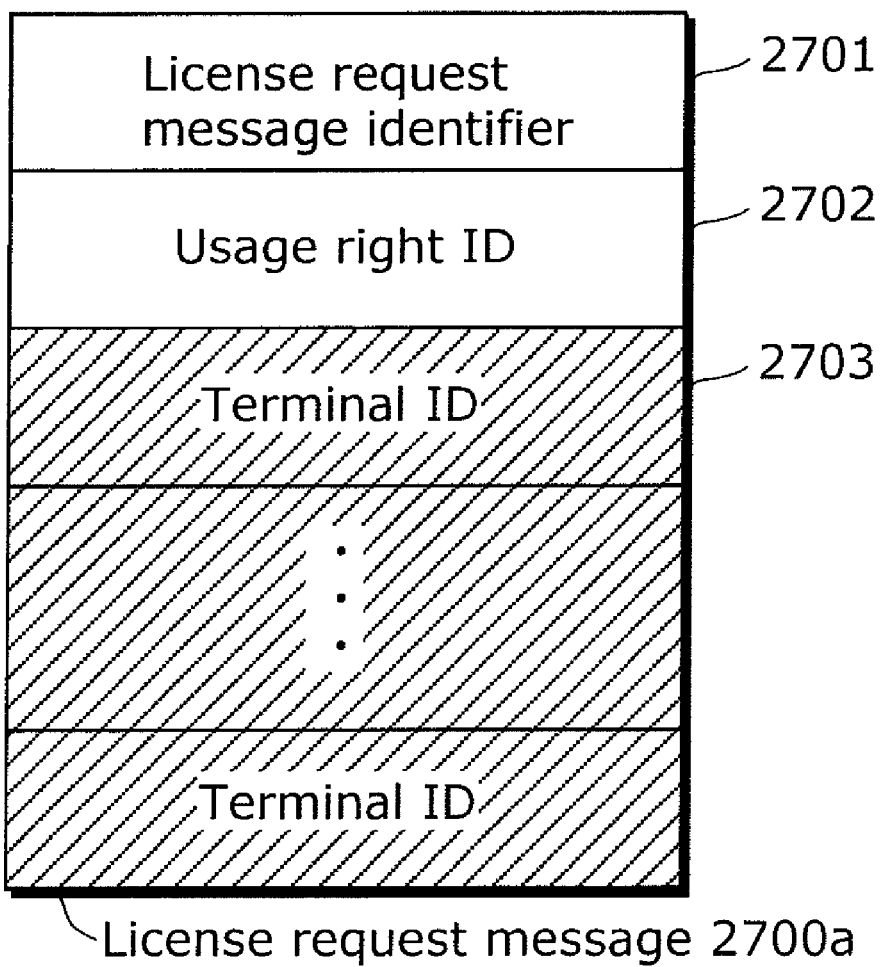
FIG. 38 is a diagram showing a structure of the license request message according to the embodiment 2 of the present invention.
Figure 39:
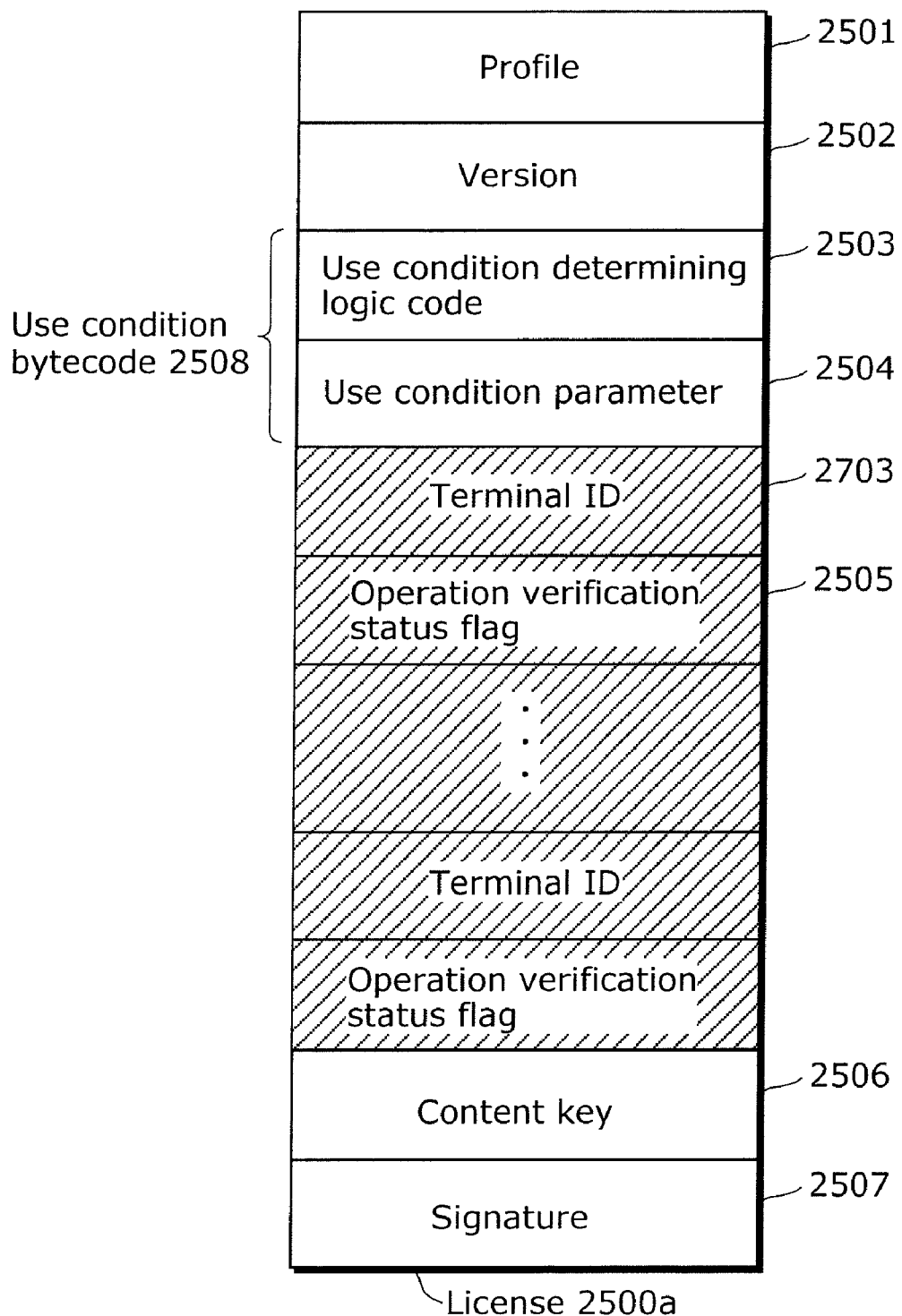
FIG. 39 is a diagram showing an example of the license according to the embodiment 2 of the present invention.

As a variation of the present embodiment, as shown in FIG. 38, such an embodiment may be used that several terminal IDs 2703 are included in the license request message 2700a, and as shown in FIG. 39, several pairs of the terminal ID 2703 and the operation verification status flag 2505 are included in the license 2500a. In the present variation, it is assumed that the license 2500 is transferred between the terminal apparatuses 2130.

In the present variation, the license obtainment unit 2603 in S901 collects IDs of the terminal apparatuses 2130 which possibly transfer the license 2500 and includes the collected IDs in the license request message 2700. Furthermore, in the license generation processing in S924, the operation verification status confirmation unit 2305 confirms operation verification status of the use condition determining logic code for each terminal apparatus 2130 identified by the terminal ID 2703 included in the license request message 2700. Then the operation verification status flag setting unit 2306 sets the result to the operation verification status flag 2505 to be the partner of the terminal ID 2703. In the case (where the processing of S1002 to S1005 are performed for each terminal apparatus 2130), the operation verification status flag 2505 confirmed by the use condition bytecode execution permission determination unit 2604 in S1103 is the operation verification status flag 2505 which is the partner of the terminal ID 2703 of the terminal apparatus 2130. With this, even when the license 2500 is transferred to other terminal apparatus 2130, such an advantageous effect can be obtained that the operation verification status of the use condition determining logic code 2503 included in the license 2500 can be confirmed in the terminal apparatus 2130 to which the transferred is made.

The content distribution system according to the embodiment 2 has been described above.

Embodiment 3

The content distribution system according to the embodiment 3 is described. It is to be noted that the content distribution system in the embodiment 3 includes only some differences from the content distribution system in the embodiment 2, and thus only those differences are described.

Figure 41:
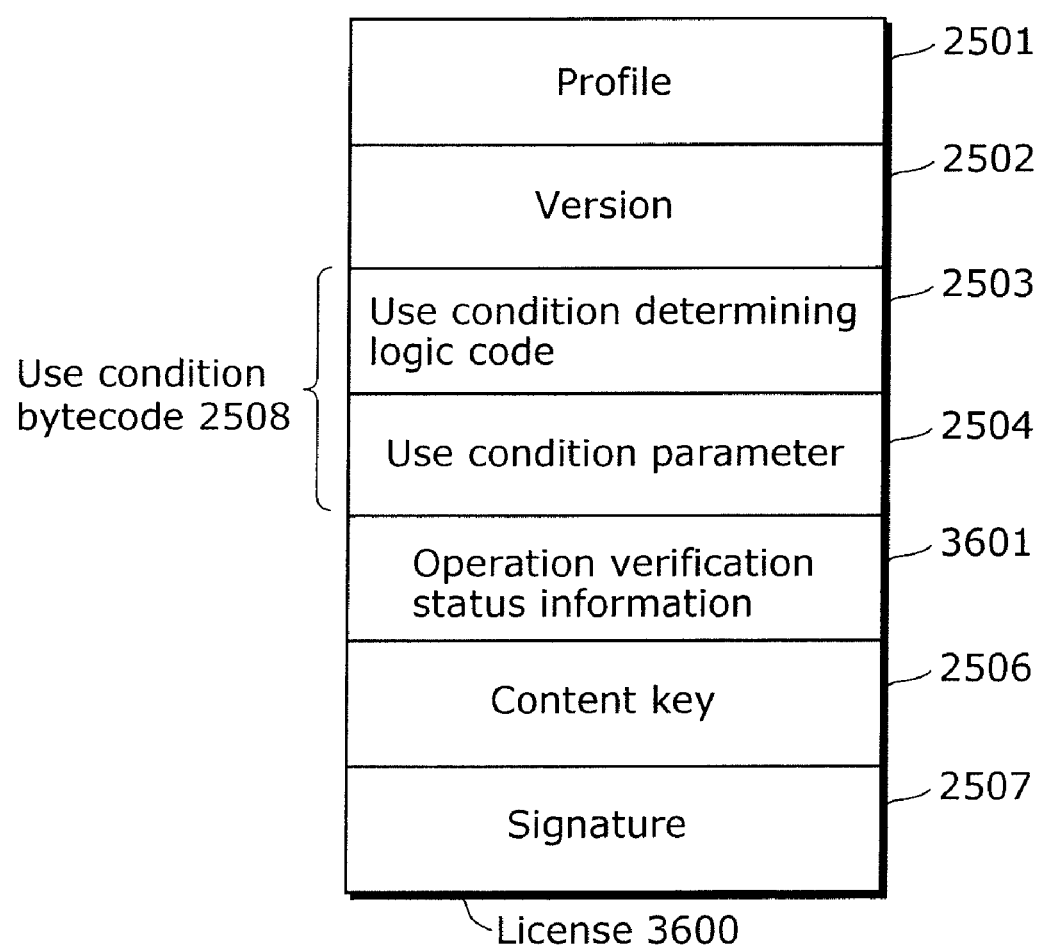
FIG. 41 is a diagram showing an example of the license according to the embodiment 3 of the present invention.

The content distribution system in the embodiment 3 differs from the content distribution system in the embodiment 2 in that confirmation of the operation verification status of the use condition determining logic code is performed (processing of S1002 to S1005 in FIG. 35) not in the license distribution server 2110, but in the terminal apparatus 2130. Thus, a license 3600 according to the embodiment 3 shown in FIG. 41 includes operation verification status information 3601 instead of the operation verification status flag 2505. The operation verification status information 2205 corresponds to the use condition determining logic code included in the license 3600 is set to the operation verification status information 3601.

Figure 40:
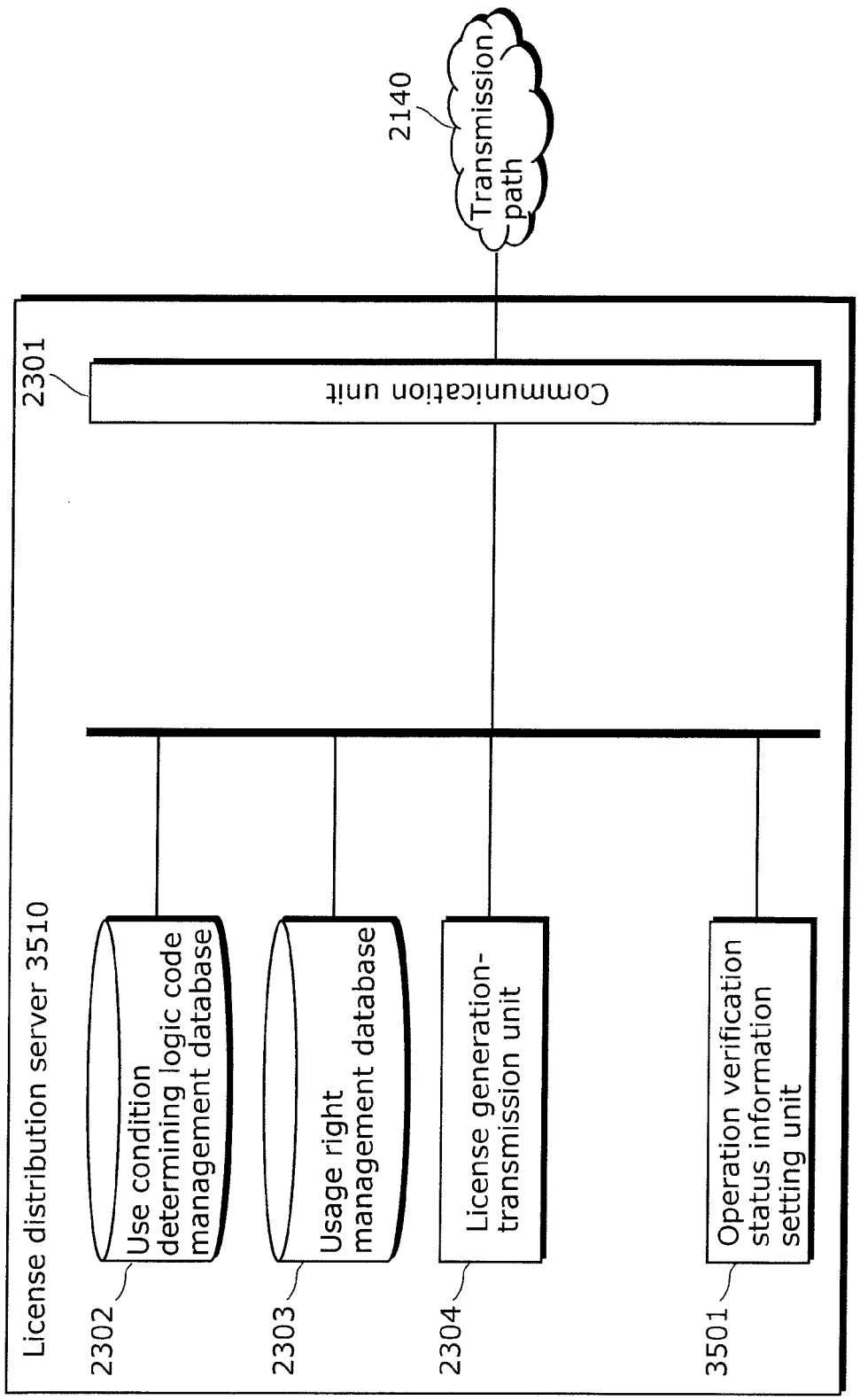
FIG. 40 is a block diagram showing a structure of a license distribution server according to the embodiment 3 of the present invention.

FIG. 40 is a diagram showing a structure of the license distribution server 3510 according to the embodiment 3. The license distribution server 3510 differs from the license distribution server 2110 according to the embodiment 2 in that the license distribution server 3510 includes an operation verification status information setting unit 3501 instead of the operation verification status confirmation unit 2305 and the operation verification status flag setting unit 2306. The operation verification status information setting unit 3501 is a processing unit which sets information to the operation verification status information 3601 of the license 3600. The operation verification status information setting unit 3501 refers to the use condition determining logic code management database 2302, and sets, to the operation verification status information 3601, the operation verification status information 2205 corresponding to the use condition determining logic code 2503 set to the license 3600.

Figure 42:
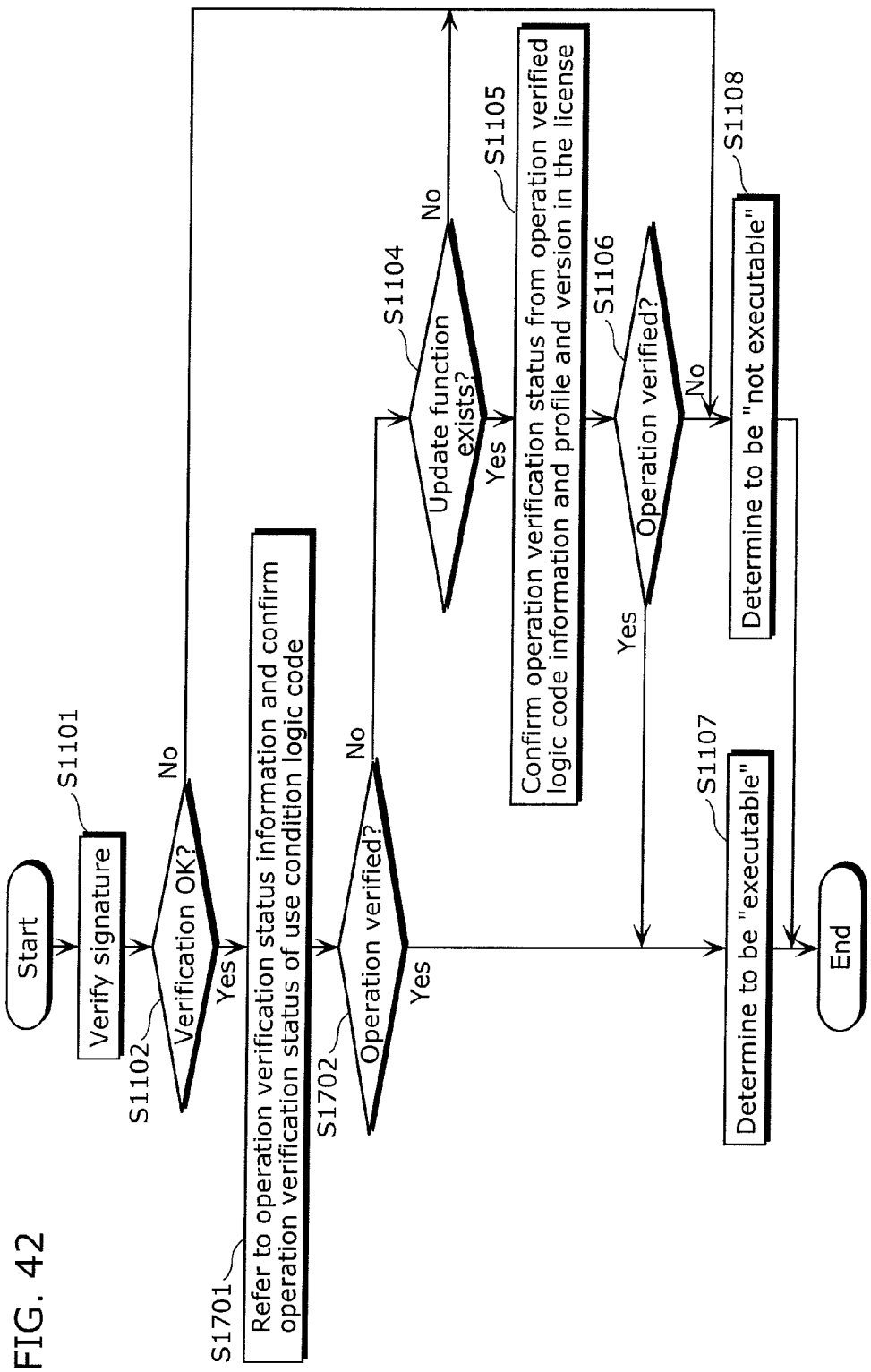
FIG. 42 is a flowchart showing operations of use condition bytecode execution permission determination processing according to the embodiment 3 of the present invention.

The difference between the terminal apparatus 2130 in the embodiment 3 and the terminal apparatus 2130 in the embodiment 2 is operations of the use condition bytecode execution permission determination processing as shown in FIG. 42. The use condition bytecode execution permission determination processing in the embodiment 3 differs from that in the embodiment 2 in that the processing of S1103 does not exist and the processing of S1701 and S1702 are added instead. Other processing are same as the use condition bytecode execution permission determination processing in the embodiment 2.

The processing of S1701 and S1702 are hereinafter described.

S1701: The use condition bytecode execution permission determination unit 2604 refers to the operation verification status information 3601 of the license 3600, and determines whether or not the ID of the terminal apparatus itself is described as the ID of the terminal apparatus 2130 of which the operation has not been verified. Here, when described as the ID of the terminal apparatus 2130 of which the operation has not been verified, it is determined that the operation has not been verified, and when not described, it is determined that the operation has been verified.

S1702: When determined to be "not verified" in S1701, the processing is continued at S1104. When determined to be "verified" in S1702, the processing is continued at S1107.

The operations of the use condition bytecode execution permission determination processing according to the embodiment 3 have been described above.

The content distribution system according to the embodiment 3 has been described above.

As a variation of the operation verification status information 2205 and 3601 in the embodiments 2 and 3, an operation verification status information 3800 which is shown in FIG. 43 as an example, may be used. In FIG. 43, the operation verification status information 3800 includes mask bit values 3801 and comparison IDs 3802. The mask bit value 3801 is information for deriving mask data. When the value of the mask bit value 3801 is assumed as N, a mask data is derived in such a form that among the bit strings to be compared, high order N bit is defined as "1" and all of the lower order bit (if any) are defined as "0". The comparison ID 3802 is an ID to be compared with the result in which logical conjunction is obtained for each bit of the terminal ID and the derived mask data. When they match, it indicates that operation has not been verified. In the comparison ID3802 which is the partner of the mask bit value 3801, only the content of the high order N bit is effective among the bit strings forming the comparison ID3802, and other values are format data such as "0" for example. Here, the operations performed when verification status of the use condition determining logic code in the terminal apparatus 2130 is confirmed using the operation verification status information 3800 are described.

(1) Mask data is derived from the mask bit value 3801.
(2) Logical conjunction for each bit of the ID of the terminal apparatus 2130, of which the operation verification status is confirmed, and the derived mask data is obtained.
(3) The comparison ID 3802 is compared to the logical conjunction obtained in (2).
(4) As a result of the comparison, when they match, it is determined that the operation has not been verified. As a result of the comparison, when they do not match, the processing (1) to (4) are repeated for the pair of the next mask bit value 3801 and the comparison ID 3802.
(5) When the processing has been performed for all pairs of the mask bit value 3801 and the comparison ID 3802, and the comparison result does not show any match in (4), it is determined that the operation has been verified.

The operations have been described which is performed when the verification status of the use condition determining logic code is confirmed in the terminal apparatus 2130 using the operation verification status information 3800. By using the operation verification status information 3800, it is possible to obtain such an advantageous effect that the data size of the operation verification status information can be reduced.

As another variation of the operation verification status information, the following structure may be used. To each terminal apparatus 2130, numbers which are coprime are assigned, and as the operation verification status information, the numbers of which the ID assigned to the operation verified terminal being multiplied are set. In this case, the terminal apparatus 2130 determines that the operation has been verified when the number set to the operation verification status information is divisible by the ID assigned to the terminal apparatus 2130 itself.

In the embodiments 2 and 3, it has been described that the ID of the terminal apparatus 2130 in which the operation has not been verified is described in the operation verification status information 2205 and the operation verification status information 3601. However, the present invention is not limited to this, and the ID of the terminal apparatus 2130 of which the operation has been verified may be described. Furthermore, it has been described that the ID of the terminal apparatus 2130 is described; however, it is not limited to the ID, but other information may be used which can identify the terminal apparatus 2130 such as the manufacturer name, model name, and lot number. Furthermore, information which can identify the use condition bytecode execution unit 2605 may be described instead of the information which can identify the terminal apparatus 2130.

The ID to be described in the operation verification status information 2205 and the operation verification status information 3601 may be described with variations in the use condition determining logic code management server 2120 in accordance with a certain rule. In this case, the processing of S1701 is performed by adding variations to the ID of the terminal apparatus 2130 in accordance with a certain rule as well. With this, such an advantageous effect can be obtained that the verification status in each terminal apparatus 2130 can be kept confidential to service providers.

Furthermore, in the embodiment 3, the operation verification status information 2205 and the operation verification status information 3601 may be the following variation.

The operation verification status information 2205 and the operation verification status information 3601 are set of data that are uniquely created by each manufacturer of the terminal apparatuses 2130. In this case, each manufacturer creates, in accordance with their unique rule, data which can determine the verification status of the use condition determining logic code, and transmits the created data to the use condition determining logic code management server 2120.

The use condition determining logic code management server 2120 collects the unique data from the terminal apparatus manufacturer, and records set of the data in the use condition determining logic code management information 2200 as operation verification status information 2205. The license distribution sever 2110 obtains the use condition determining logic code management information 2200 from the use condition determining logic code management server 2120, and manages the obtained information 2200 in the use condition determining logic code management database 2302. At the time of issuance of the license 3600, the operation verification status information 2205 is set as the operation verification status information 3601. In this case, the terminal apparatus 2130 refers to the unique data part created by the manufacturer of the terminal apparatus among the data set to the operation verification status information 3601, and determines the operation verification status.

More particularly, the use condition bytecode execution permission determination unit 2604 of the terminal apparatus 2130 refers to the unique data part created by the manufacturer of the terminal apparatus among the data set to the operation verification status information 3601. Then, the use condition bytecode execution permission determination unit 2604 determines the operation verification status of the use condition determining logic code 2503 in the terminal apparatus 2130 in accordance with the rule unique to the manufacturer.

In the present variation, it has been described that both of the operation verification status information 2205 and the operation verification status information 3601 are set of the data that are uniquely created by the respective manufacturers of the terminal apparatuses 2130. Alternatively, only data created by the manufacturer of the terminal apparatus 2130 that requests the license 3600 may be extracted and included in the operation verification status information 3601 to be included in the license 3600. With the present variation, such an advantageous effect can be obtained that the operation verification status in each terminal apparatus 2130 can be kept confidential to the service providers and the manufacturers of other terminal apparatuses.

In the embodiment 3, it has been described that the operation verification status information 2205 and the operation verification status information 3601 are lists of ID of the terminal apparatuses of which the operation has not been verified. However, the following variation is also possible.

The operation verification status information 2205 and the operation verification status information 3601 are data, made of bit strings, to which the bit is assigned for each terminal apparatuses 2130 in advance, and the bit is set to "1" in the case where the operation has been verified in the terminal apparatus. In this case, in S1701, the use condition bytecode execution permission determination unit 2604 of the terminal apparatus 2130 refers to the bit assigned to the terminal apparatus 2130, and determines that the operation has been verified when the value is "1".

In the present variation, it has been described that the bit is assigned for each terminal apparatus 2130; however, the present invention is not limited to this, and it may be that the bit is assigned per unit such as terminal apparatus manufacturer, model type, and lot. Furthermore, it may be that the bit string is encoded in a predetermined encoding method so that the size is reduced. Further, it may be that the variations are added to the bit string in the encryption method unique to each manufacturer in order to be kept in confidential to the service providers and other terminal apparatus manufacturers.

Furthermore, in the embodiment 2, it has been described that the operation verification status flag 2505 is included in the license 2500. Instead, the operation verification status flag 2505 may be set as a parameter of the license request response message 2800.

In the embodiment 3, it has been described that the operation verification status information 3601 is included in the license 3600. Instead, the operation verification status information 3601 may be set as a parameter of the license request response message 2800.

In the embodiment 2, it has been described that when determined that the operation has not been verified in S1003, the operation verification status flag 2505 is set to "not verified" in S1005. However, such a variation is also possible that the use condition determining logic code 2503 to be set to the license 2500 is changed to the use condition determining logic code 2503 of which the operation has been verified in the terminal apparatus 2130, and the operation verification status flag 2505 may be set to "verified". In the case where the use condition determining logic code 2503 is changed, such a change is desirable in that the use condition parameter 2504 is also modified accordingly so as to include same use conditions as the use conditions before the change.

In the embodiments 2 and 3, it has been described that the entire license is signature target; however, the present invention is not limited to this, and only a part of the license can be the signature target. Furthermore, it has been described that signature data is generated dynamically at the time of issuance of the license; however, it may be that the signature data is generated in advance and added at the time of issuance of the license. Furthermore, it has been described that the signature is performed with the secret key of the service provider; however, the signature may be performed with the secret key of the technology management organization or the terminal apparatus manufacturer.

In the embodiments 2 and 3, it has been described that the use condition bytecode execution permission determination processing is performed both at the time of license obtainment and content use; however, it may be performed only by one of them.

Though the present invention has been described above based on the embodiments 1 to 3, the present invention should not be limited to the above-described embodiments 1 to 3. For example, the present invention also includes the following cases.

(1) Each of the above-described apparatuses is actually a computer system that includes, for example, a micro processor, ROM, RAM, hard disk unit, display unit, keyboard, and mouse. A computer program is stored on the RAM or the hard disk unit. Functions of each of the apparatuses can be achieved by the microprocessor operating according to the computer program. The computer program mentioned here is a combination of a plurality of instruction codes that indicate commands to a computer for achieving predetermined functions.

(2) Some or all of the structural elements which configure the respective apparatuses may be integrated into a single system LSI (Large Scale Integration). The system LSI is a super multi-functional LSI manufactured by integrating the plural structural units into a single chip, and more specifically is a computer system configured to include the micro processor, ROM, RAM, and the like. A computer program is stored in the RAM. The system LSI achieves its functions by the microprocessor operating according to the computer program.

(3) Some or all of the structural elements which configure the respective apparatuses may be configured as IC cards attachable/detachable to/from the respective apparatuses or independent modules. The IC card or the module is a computer system that includes a microprocessor, ROM, RAM, and the like. The IC card or module may include the super multi-functional LSI. The IC card or module achieves their functions by the microprocessor operating according to the computer program. These IC card or module may be tamper resistant.

(4) The present invention may be a method as shown above. In addition, the present invention may be a computer program for achieving the method by using a computer, and may be a digital signal made of the computer program.

Furthermore, the present invention may be realized by a computer-readable recording medium, such as a flexible disk, hard disk, CD-ROM, MO, DVD, DVD-ROM, DVD-RAM, Blu-ray Disc (BD), or semiconductor memory, on which the computer program or the digital signal is recorded. In addition, the present invention may be the digital signal recorded on these recording media.

In addition, the present invention may be used for transmitting the computer program or the digital signal via an electric communication line, wireless or wired communication line, network represented by the Internet, data broadcast and the like.

In addition, the present invention may be a computer system including a microprocessor and a memory in which the memory stores the computer program, and the microprocessor operates according to the computer program.

In addition, the present invention may allow an independent computer system to execute the program or the digital signal by recording them on the recording medium and transmitting them via the network or the like.

(5) The above embodiments 1 to 3 and variations may be freely combined. For example, it may be that the profile 2501 of the embodiment 2 is included in the license 1200 of the embodiment 1, and the use condition verification unit 302 obtains the profile information that can be operated in the terminal apparatus so as to determine whether or not the operation of the use condition determining logic code 1204 has been confirmed. Furthermore, it may be that the terminal ID 2703 of the embodiment 2 is included in the license 1200 of the embodiment 1, and the use condition verification unit 302 determines whether or not the ID of the terminal apparatus that uses the content is included in the terminal ID 2703 so as to determine whether or not the operation of the use condition determining logic code 1204 has been confirmed. In other words, the profile 2501 and the terminal ID 2703 may be included in the "determination information" recited in the claims.

INDUSTRIAL APPLICABILITY

The terminal apparatus in the content distribution system according to the present invention is useful in a content distribution service receiving terminal using packaged media such as DVD, and a content distribution service receiving terminal using digital broadcast, CATV, the Internet and the like.

The invention claimed is:

1. A terminal apparatus which uses, based on a license, content that is a digital copyrighted work, the terminal apparatus comprising:

a memory storing a license obtainment program, an operation confirmation determination program, a use condition determining code execution program, a content playback program, and an operable version management program; and a processor, wherein the license obtainment program, when executed by the processor, causes the terminal apparatus to perform a method of obtaining the license which includes (i) a use condition determining code that is a program for determining whether or not use of the content is permitted, (ii) determination information for determining whether or not operation of the use condition determining code has been confirmed, and (iii) an operation verification status flag indicating whether or not the operation of the use condition determining code has been confirmed, wherein the operation confirmation determination program, when executed by the processor, causes the terminal apparatus to perform a method of determining, based on the determination information included in the obtained license, whether or not the operation of the use condition determining code has been confirmed, wherein the use condition determining code execution program, when executed by the processor, causes the terminal apparatus to perform a method of executing the use condition determining code when the operation of the use condition determining code has been determined to have been confirmed, wherein the content playback program, when executed by the processor, causes the terminal apparatus to perform a method of determining whether or not the use of the content is permitted based on the executed use condition determining code and of playing back the content when the use of the content has been determined to be permitted, wherein the determination information includes version information indicating a version number of the use condition determining code included in the obtained license, wherein the operable version management program, when executed by the processor, causes the terminal apparatus to execute a method of managing operable version information indicating the version number of the use condition determining code that is operable in the terminal apparatus, and wherein, when the method of determining whether or not the operation of the use condition determining code has been confirmed, as performed by the terminal apparatus, determines, based on the operation verification status flag included in the obtained license, that the operation of the use condition determining code has not been confirmed and when it is determined that the terminal apparatus has updated the operable version information, the operation confirmation determination program, when executed by the processor, further causes the terminal apparatus to perform a method of (i) determining that the operation of the use condition determining code has been confirmed when the version number indicated by the version information is equal to or less than a version number indicated by the updated operable version information, and (ii) determining that the operation of the use condition determining code has not been confirmed when the version number indicated by the version information is greater than the version number indicated by the updated operable version information.

2. The terminal apparatus according to claim 1,
wherein the determination information includes profile information indicating a profile of the use condition determining code included in the obtained license,
wherein the memory further stores an operable profile management program,
wherein the operable profile management program, when executed by the processor, causes the terminal apparatus to perform a method of managing operable profile information indicating a profile of the use condition determining code that is operable in the terminal apparatus, and
wherein the operation confirmation determination program, when executed by the processor, further causes the terminal apparatus to perform a method of determining whether or not the operation of the use condition determining code has been confirmed by comparing the profile information and the operable profile information.

3. The terminal apparatus according to claim 1,
wherein the determination information includes information of at least one of the terminal apparatus and another terminal apparatus in which the use condition determining code is operable, and
wherein the operation confirmation determination program, when executed by the processor, further causes the terminal apparatus to perform a method of determining, using the information of at least one of the terminal apparatus and the other terminal apparatus included in the determination information, whether or not the operation of the use condition determining code in the terminal apparatus which uses the content has been confirmed.

4. The terminal apparatus according to claim 1, wherein the license obtainment program, when executed by the processor, further causes the terminal apparatus to perform a method of obtaining, from a server, the license that includes the determination information generated by the server.

5. A system comprising a server and a terminal apparatus, the server distributing a license in response to a license distribution request from the terminal apparatus, and the terminal apparatus using, based on the distributed license, content that is a digital copyrighted work,
wherein the server includes:
a server memory storing a use condition determining code operation verification program, a determination information generation program, and a license distribution program; and
a server processor,
wherein the use condition determining code operation verification program, when executed by the server processor, causes the server to perform a method of verifying whether or not a use condition determining code operates, the use condition determining code being a program for determining whether or not use of content, which is a digital copyrighted work, is permitted,
wherein the determination information generation program, when executed by the server processor, causes the server to perform a method of generating, based on a result of the verification performed by the use condition determining code operation verification program, determination information used by the terminal apparatus for determining whether or not operation of the use condition determining code has been confirmed in the terminal apparatus, and
wherein the license distribution program, when executed by the server processor, causes the server to perform a method of distributing the license to the terminal apparatus, the license including (i) the use condition determining code, (ii) the generated determination information, and (iii) an operation verification status flag indicating whether or not the operation of the use condition determining code has been confirmed,
wherein the terminal apparatus includes:
a terminal memory storing a license obtainment program, an operation confirmation determination program, a use condition determining code execution program, a content playback program, and an operable version management program; and
a terminal processor,
wherein the license obtainment program, when executed by the terminal processor, causes the terminal apparatus to perform a method of obtaining the license,
wherein the operation confirmation determination program, when executed by the terminal processor, causes the terminal apparatus to perform a method of determining, based on the determination information included in the obtained license, whether or not the operation of the use condition determining code has been confirmed,
wherein the use condition determining code execution program, when executed by the terminal processor, causes the terminal apparatus to perform a method of executing the use condition determining code when the operation of the use condition determining code has been determined to have been confirmed, and
wherein the content playback program, when executed by the terminal processor, causes the terminal apparatus to perform a method of determining whether or not the use of the content is permitted based on the executed use condition determining code and of playing back the content when the use of the content has been determined to be permitted,
wherein the determination information includes version information indicating a version number of the use condition determining code included in the obtained license,
wherein the operable version management program, when executed by the terminal processor, causes the terminal apparatus to perform a method of managing operable version information indicating the version number of the use condition determining code that is operable in the terminal apparatus, and
wherein, when the method of determining whether or not the operation of the use condition determining code has been confirmed, as performed by the terminal apparatus, determines, based on the operation verification status flag included in the obtained license, that the operation of the use condition determining code has not been confirmed and when it is determined that the terminal apparatus has updated the operable version information, the operation confirmation determination program, when executed by the terminal processor, further causes the terminal apparatus to perform a method of (i) determining that the operation of the use condition determining code has been confirmed when the version number indicated by the version information is equal to or less than a version number indicated by the updated operable version information, and (ii) determining that the operation of the use condition determining code has not been confirmed when the version number indicated by the version information is greater than the version number indicated by the updated operable version information.

6. A content use method in which content that is a digital copyrighted work is used based on a license, the content use method comprising:
  obtaining the license which includes (i) a use condition determining code that is a program for determining whether or not use of the content is permitted, (ii) determination information for determining whether or not operation of the use condition determining code has been confirmed, and (iii) an operation verification status flag indicating whether or not the operation of the use condition determining code has been confirmed;
  determining, based on the determination information included in the obtained license, whether or not the operation of the use condition determining code has been confirmed;
  executing the use condition determining code when the operation of the use condition determining code has been determined to have been confirmed; and
  determining whether or not the use of the content is permitted based on the executed use condition determining code, and playing back the content when the use of the content has been determined to be permitted,
  wherein the determination information includes version information indicating a version number of the use condition determining code included in the obtained license, and
  wherein, when the determining of whether or not the operation of the use condition determining code has been confirmed determines, based on the operation verification status flag included in the obtained license, that the operation of the use condition determining code has not been confirmed and when it is determined that the terminal apparatus has updated the operable version information, the determining of whether or not the operation of the use condition determining code has been confirmed, further includes (i) determining that the operation of the use condition determining code has been confirmed when the version number indicated by the version information is equal to or less than a version number indicated by the updated operable version information indicating the version number of the use condition determining code that is operable by a terminal apparatus, and (ii) determining that the operation of the use condition determining code has not been confirmed when the version number indicated by the version information is greater than the version number indicated by the updated operable version information.

7. A non-transitory computer-readable recording medium having a program recorded thereon, the program for using, based on a license, content that is a digital copyrighted work, and the program, when executed by a computer, causes the computer to perform a method comprising:
  obtaining the license which includes (i) a use condition determining code that is a program for determining whether or not use of the content is permitted, (ii) determination information for determining whether or not operation of the use condition determining code has been confirmed, and (iii) an operation verification status flag indicating whether or not the operation of the use condition determining code has been confirmed;
  determining, based on the determination information included in the obtained license, whether or not operation of the use condition determining code has been confirmed;
  executing the use condition determining code when the operation of the use condition determining code has been determined to have been confirmed; and
  determining whether or not the use of the content is permitted based on the executed use condition determining code, and playing back the content when the use of the content has been determined to be permitted,
  wherein the determination information includes version information indicating a version number of the use condition determining code included in the obtained license, and
  wherein, when the determining of whether or not the operation of the use condition determining code has been confirmed determines, based on the operation verification status flag included in the obtained license, that the operation of the use condition determining code has not been confirmed and when it is determined that the terminal apparatus has updated the operable version information, the determining of whether or not the operation of the use condition determining code has been confirmed, further includes (i) determining that the operation of the use condition determining code has been confirmed when the version number indicated by the version information is equal to or less than a version number indicated by the updated operable version information indicating the version number of the use condition determining code that is operable by a terminal apparatus, and (ii) determining that the operation of the use condition determining code has not been confirmed when the version number indicated by the version information is greater than the version number indicated by the updated operable version information.

* * * * *